(12) United States Patent
Jonker et al.

(10) Patent No.: US 12,579,765 B2
(45) Date of Patent: Mar. 17, 2026

(54) DEFINING AND MODIFYING CONTEXT AWARE POLICIES WITH AN EDITING TOOL IN EXTENDED REALITY SYSTEMS

(71) Applicant: Meta Platforms Technologies, LLC, Menlo Park, CA (US)

(72) Inventors: Tanya Renee Jonker, Seattle, WA (US); Ting Zhang, Santa Clara, CA (US); Frances Cin-Yee Lai, York (CA); Anna Camilla Martinez, Seattle, WA (US); Ruta Parimal Desai, Mountlake Terrace, WA (US); Yan Xu, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 391 days.

(21) Appl. No.: 18/458,303

(22) Filed: Aug. 30, 2023

(65) Prior Publication Data

US 2024/0071013 A1 Feb. 29, 2024

Related U.S. Application Data

(60) Provisional application No. 63/373,938, filed on Aug. 30, 2022.

(51) Int. Cl.
*G06F 3/04815* (2022.01)
*G02B 27/01* (2006.01)
*G06T 19/00* (2011.01)

(52) U.S. Cl.
CPC .......... *G06T 19/006* (2013.01); *G02B 27/017* (2013.01); *G06F 3/04815* (2013.01); *G02B 2027/0138* (2013.01)

(58) Field of Classification Search
CPC ................ G06T 19/006; G02B 27/017; G02B 2027/0138; G06F 3/04815; G06F 1/163; G06F 1/1684; G06F 3/011; G06F 3/014; G06F 3/016; G06F 3/017; G06F 3/0482; G06F 3/04842; G06F 3/0485; H04M 1/724097
See application file for complete search history.

(56) References Cited

U.S. PATENT DOCUMENTS

| | | | |
|---|---|---|---|
| 2019/0325080 A1 | 10/2019 | Natarajan et al. | |
| 2021/0076105 A1* | 3/2021 | Parmar | H04N 21/234336 |
| 2022/0231985 A1* | 7/2022 | Rapaport | H04L 67/306 |
| 2022/0253125 A1* | 8/2022 | Wallen | G06T 19/20 |

* cited by examiner

*Primary Examiner* — Jitesh Patel
(74) *Attorney, Agent, or Firm* — IMorgan, Lewis & Bockius LLP

(57) ABSTRACT

The present disclosure relates to systems and methods for defining and modifying behavior in an extended reality environment. The systems and methods include receiving a request to build or modify a rule or policy for a given user or activity, obtaining a template based on the user or the activity, displaying the template and tools for editing the template, receiving a modification to the template via the user interacting with the tools of the user interface, and modifying the template based on the modification to generate the rule or policy. The modification includes changing the initial value for the actions or the conditions of the template and saving the template as a separate instance representative of the rule or policy, and the rule or policy includes one or more conditional statements for executing one or more of the actions based on evaluation of one or more of the conditions.

20 Claims, 26 Drawing Sheets

350

360

355

365(A)

365(B)

460

465

470

Context-aware policy (CAP)

Detection:
- Vision (objects, gesture, ...)
- Sound
- Location (SLAM, GPS)
- IoT Sensor (temperature, humidity, ...)

Affordance:
- Smart home devices (TV, music, lights,....)
- AR applications (calendar, health tracker,....)
- Web services (posts, messages,....)

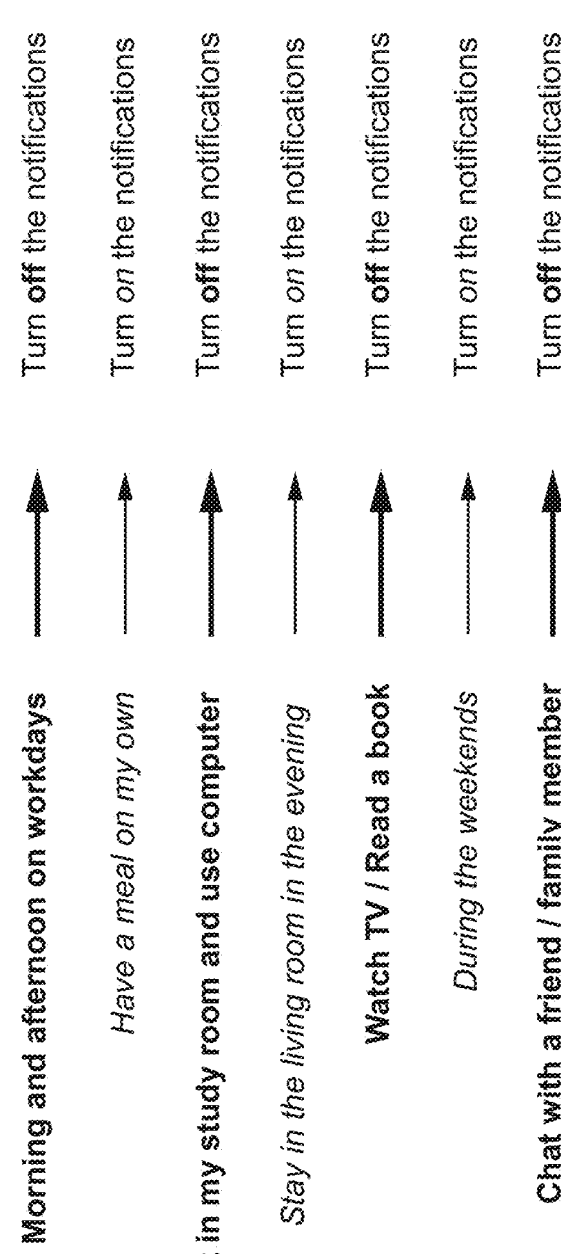

When I ...

Morning and afternoon on workdays → Turn off the notifications

*Have a meal on my own* → Turn *on* the notifications

Sit in my study room and use computer → Turn off the notifications

*Stay in the living room in the evening* → Turn *on* the notifications

Watch TV / Read a book → Turn off the notifications

*During the weekends* → Turn *on* the notifications

Chat with a friend / family member → Turn off the notifications

FIG. 5F

- If I am working in the office, play soft music.
- Otherwise if I am in the kitchen in the morning, play pop music while I am eating meal.
  - Otherwise if I am not eating and I am using the coffee machine, play jazz music

| Priority | Time | Location | Activity | Object | Action |
|----------|--------|----------|----------|----------------|-----------|
| 1 | ~ | Office | Working | ' | Soft music |
| 2 | Morning | Kitchen | Eating | ' | Pop music |
| 3 | Morning | Kitchen | ~ | Coffee machine | Jazz music |

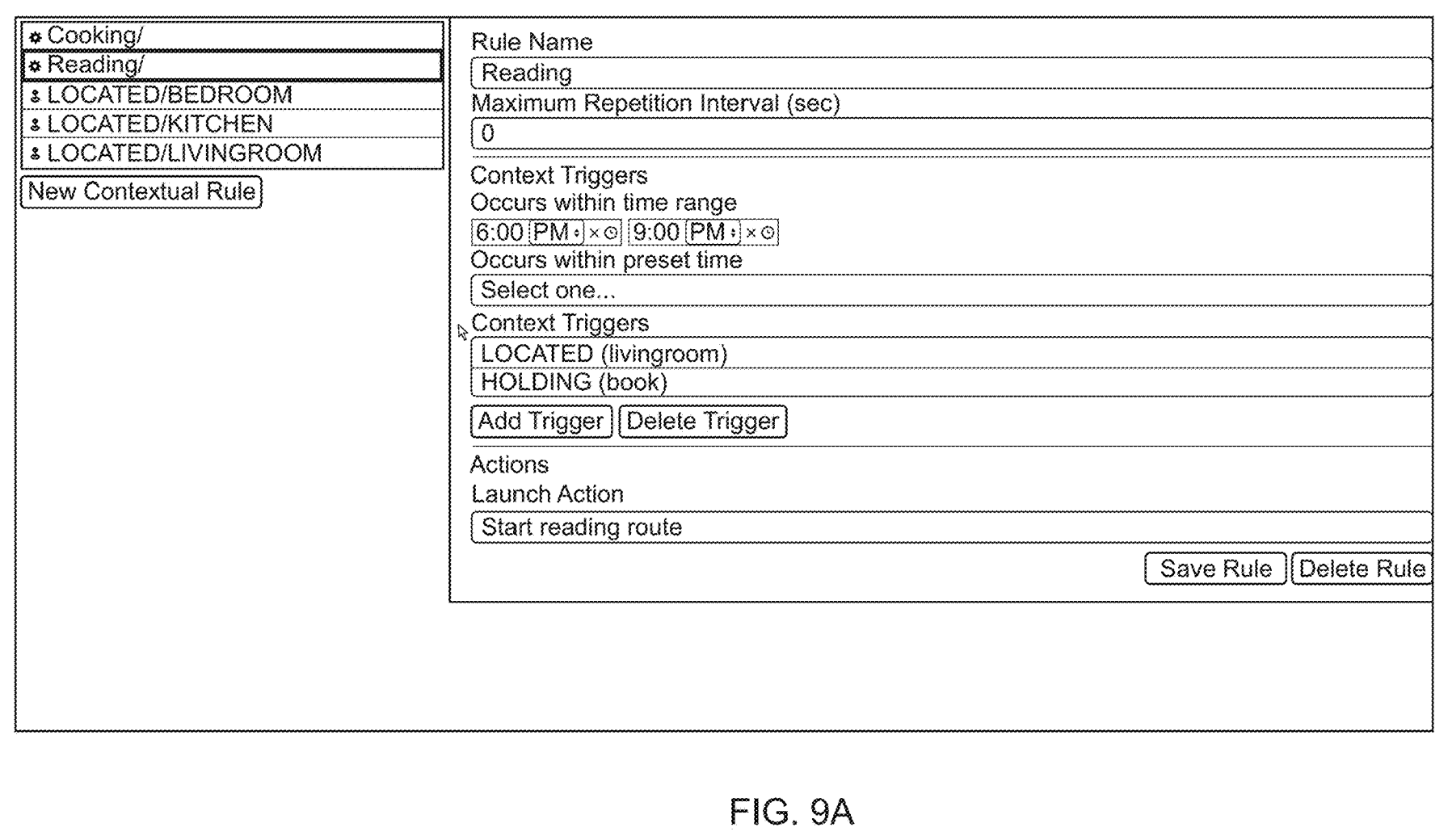

* Cooking/
* Reading/
  * LOCATED/BEDROOM
  * LOCATED/KITCHEN
  * LOCATED/LIVINGROOM New Contextual Rule Rule Name Reading Maximum Repetition Interval (sec)

0

Context Triggers
Occurs within time range
6:00 PM ▾ × ⊙   9:00 PM ▾ × ⊙
Occurs within preset time
Select one...

Context Triggers
LOCATED (livingroom)
HOLDING (book)

Add Trigger    Delete Trigger

Actions
Launch Action
Start reading route

Save Rule    Delete Rule

FIG. 9A

Figure 9B:
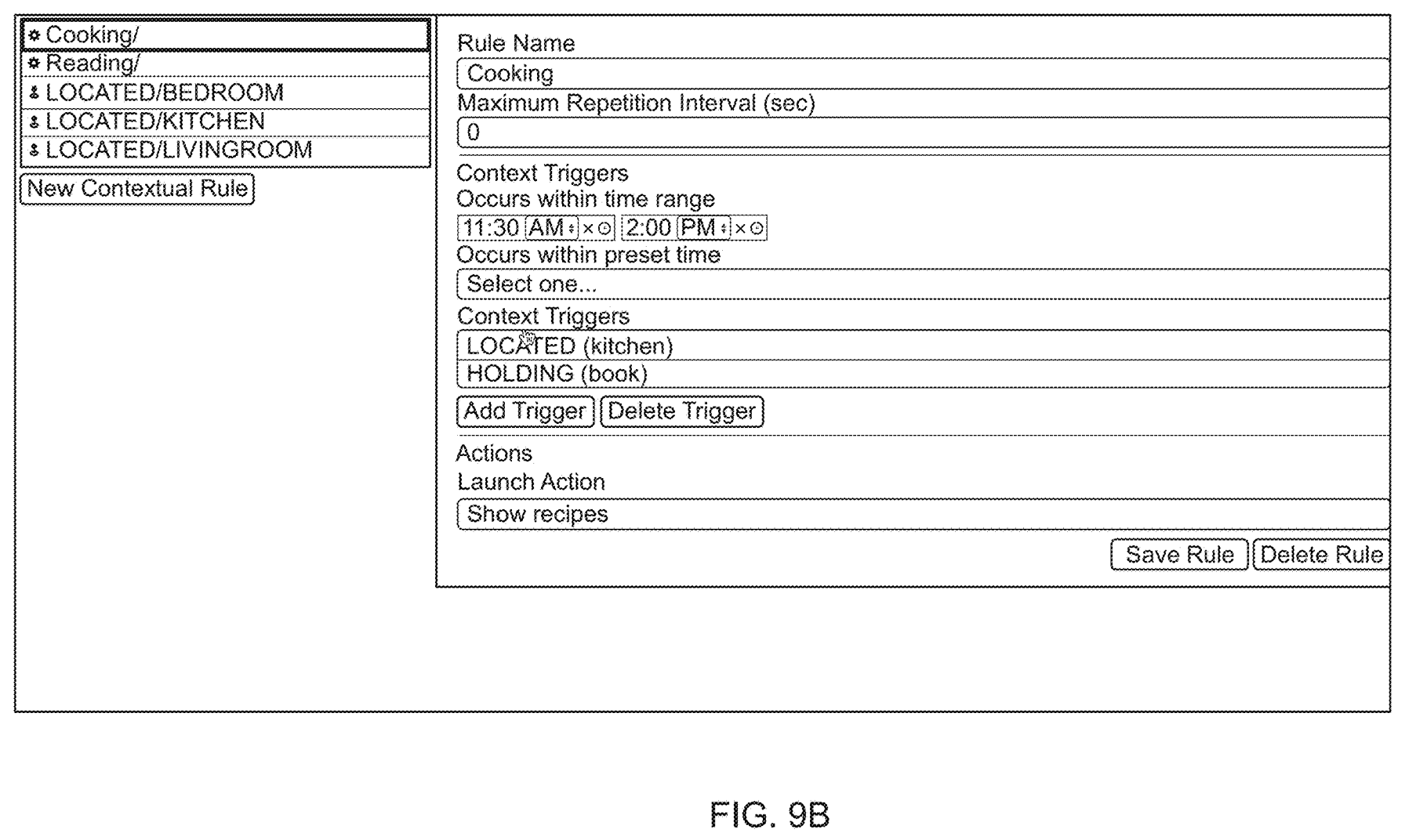

✿ Cooking/
✿ Reading/
⚹ LOCATED/BEDROOM
⚹ LOCATED/KITCHEN
⚹ LOCATED/LIVINGROOM

New Contextual Rule

Rule Name
Cooking
Maximum Repetition Interval (sec)
0

Context Triggers
Occurs within time range
11:30 [AM ⇕] [×⊙] [2:00] [PM ⇕] [×⊙]
Occurs within preset time
Select one...
Context Triggers
LOCATED (kitchen)
HOLDING (book)
[Add Trigger] [Delete Trigger]

Actions
Launch Action
Show recipes

[Save Rule] [Delete Rule]

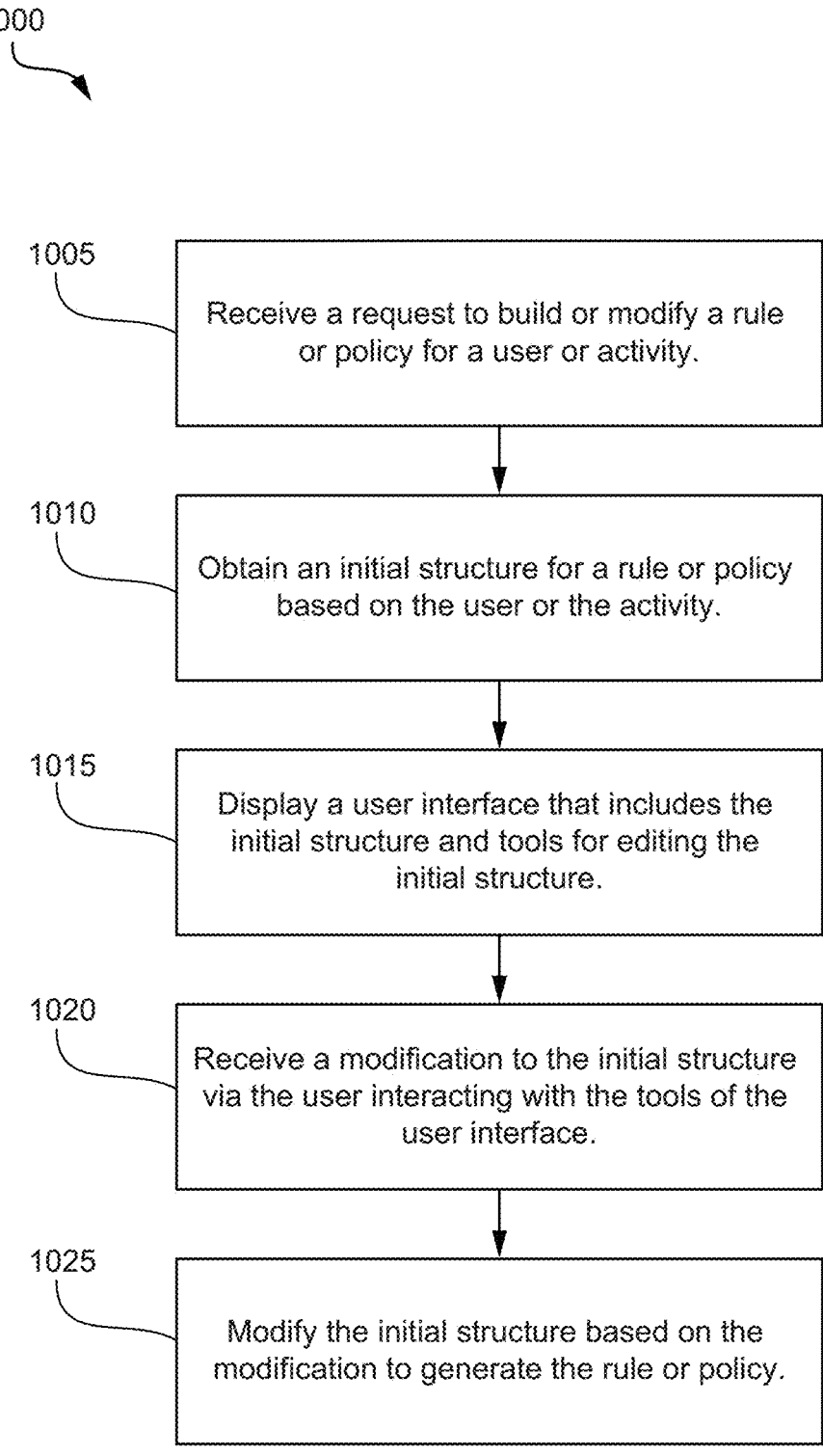

1005

Receive a request to build or modify a rule or policy for a user or activity.

1010

Obtain an initial structure for a rule or policy based on the user or the activity.

1015

Display a user interface that includes the initial structure and tools for editing the initial structure.

1020

Receive a modification to the initial structure via the user interacting with the tools of the user interface.

1025

Modify the initial structure based on the modification to generate the rule or policy.

FIG. 10

DEFINING AND MODIFYING CONTEXT AWARE POLICIES WITH AN EDITING TOOL IN EXTENDED REALITY SYSTEMS

CROSS-REFERENCE TO RELATED APPLICATIONS

The present application is a non-provisional application of and claims the benefit of and priority to under 35 U.S.C. § 119(e) of U.S. Provisional Application No. 63/373,938 having a filing date of Aug. 30, 2022, the entire contents of which is incorporated herein by reference for all purposes.

FIELD

The present disclosure generally relates to extended reality systems. Particularly, the present disclosure relates to techniques for defining and modifying context aware policies with an editing tool in an extended reality environment.

BACKGROUND

A virtual assistant is an artificial intelligence (AI) enabled software agent that can perform tasks or services including: answer questions, provide information, play media, and provide an intuitive interface for connected devices (e.g., smart home devices) for an individual based on voice or text utterances (e.g., commands or questions). Conventional virtual assistants process the words a user speaks or types and converts them into digital data that the software can analyze. The software uses a speech and/or text recognition-algorithm to find the most likely answer, solution to a problem, information, or command for a given task. As the number of utterances increase, the software learns over time what users want when they supply various utterances. This helps improve the reliability and speed of responses and services. In addition to their self-learning ability, their customizable features and scalability have led virtual assistants to gain popularity across various domain spaces including website chat, computing devices (e.g., smart phones and vehicles), and standalone passive listening devices (e.g., smart speakers).

Even though virtual assistants have proven to be a powerful tool, these domain spaces have also proven to be an inappropriate venue for such a tool. The virtual assistant will continue to be an integral part in these domain spaces but will always likely be viewed as a complementary feature or limited use case, but not a crucial must have feature. Recently, developers have been looking for a better suited domain space for deploying virtual assistants. That domain space is extended reality. Extended reality is a form of reality that has been adjusted in some manner before presentation to a user and generally includes virtual reality (VR), augmented reality (AR), mixed reality (MR), hybrid reality, some combination thereof, and/or derivatives thereof.

Extended reality content may include generated virtual content or generated virtual content that is combined with physical content (e.g., physical or real-world objects). The extended reality content may include digital images, animations, video, audio, haptic feedback, and/or some combination thereof, and any of which may be presented in a single channel or in multiple channels (e.g., stereo video that produces a three-dimensional effect to the viewer). Extended reality may be associated with applications, products, accessories, services, and the like that can be used to create extended reality content and/or used in (e.g., perform activities in) an extended reality. An extended reality system that provides such content may be implemented on various platforms, including a head-mounted display (HMD) connected to a host computer system, a standalone HMD, a mobile device or computing system, and/or any other hardware platform capable of providing extended reality content to one or more viewers.

However, extended reality headsets and devices are limited in the way users interact with applications. Some provide hand controllers, but controllers betray the point of freeing the user's hands and limit the use of extended reality headsets. Others have developed sophisticated hand gestures for interacting with the components of extended reality applications. Hand gestures are a good medium, but they have their limits. For example, given the limited field of view that extended reality headsets have, hand gestures require users to keep their arms extended so that they enter the active area of the headset's sensors. This can cause fatigue and again limit the use of the headset. This is why virtual assistants have become important as a new interface for extended reality devices such as headsets. Virtual assistants can easily blend in with all the other features that the extended reality devices provide to their users. Virtual assistants can help users accomplish tasks with their extended reality devices that previously required controller input or hand gestures on or in view of the extended reality devices. Users can use virtual assistants to open and close applications, activate features, or interact with virtual objects. When combined with other technologies such as eye tracking, virtual assistants can become even more useful. For instance, users can query for information about the object they are staring at, or ask the virtual assistant to revolve, move, or manipulate a virtual object without using gestures.

SUMMARY

Embodiments described herein pertain to techniques for defining and modifying context aware policies with an editing tool in an extended reality environment.

In various embodiments, an extended reality system is provided that includes a head-mounted device comprising a display that displays content to a user and one or more cameras that capture images of a visual field of the user wearing the head-mounted device; a processing system; and at least one memory storing instructions that, when executed by the processing system, cause the extended reality system to perform operations comprising: in response to the user launching an authoring session to generate a context aware policy, rendering a user interface in extended reality on the display; obtaining a template based on the user or data collected from user interactions in extended reality, wherein the template provides initial values for actions and context conditions to be used for building or modifying one or more context aware policies; rendering the template and tools for editing the template in the user interface, wherein the template is visualized as a collection of interconnectable building blocks comprising the actions and context conditions; receiving, via tools for editing the template in the user interface, a modification to the template, wherein the modification incudes a change to an initial value for the actions or the context conditions; and modifying the template based on the modification to generate the context aware policy, wherein the modification comprises changing the initial value for the actions or the context conditions of the template and saving the template as a separate instance representative of the context aware policy, and wherein the context aware policy defines an action to be triggered upon satisfaction of one or more context conditions within the extended reality.

In some embodiments, the operations further comprise executing the context aware policy, and wherein executing the context aware policy comprises: determining that the context conditions defined by the context aware policy have been satisfied and, in response to determining the context conditions have been satisfied, executing the action defined by the context aware policy.

In some embodiments, the initial value for the actions or the context conditions are configured by a developer or inferred by a model from historical rules or policies, historical behavior of the user, or a combination thereof.

In some embodiments, the operations further comprise: associating the context aware policy with one or more physical objects, virtual objects, or combinations thereof; identifying one or more additional context aware policies based on the association with the one or more physical objects, virtual objects, or combinations thereof, and grouping the one or more additional context aware policies with the rule or policy as a defined mood, theme, or style.

In some embodiments, the operations further comprise grouping the context aware policy with one or more additional context aware policies into a mood, theme, or style based on similarities between the actions and/or the context conditions.

In some embodiments, the operations further comprise receiving an association for the context aware policy via the user interacting with the tools, wherein the association incudes grouping the context aware policy with one or more additional context aware policies as a defined mood, theme, or style.

In some embodiments, the context aware policy is defined using object-oriented programming; the template is a class; the context aware policy is an object or instance of the class; the actions, the context conditions, characteristics, methods, and connections are attributes of the object; and one or more conditional statements define a procedure or behavior of the object based on the attributes.

In some embodiments, a computer-implemented method is provided that includes steps which, when executed, perform part or all of the one or more processes or operations disclosed herein.

In some embodiments, one or more non-transitory computer-readable media are provided for storing computer-readable instructions that, when executed by at least one processing system, cause a system to perform part or all of the one or more processes or operations disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIGS. 5A-5H illustrate various aspects of context aware policies in accordance with various embodiments.

FIGS. 9A and 9B are illustrations showing exemplary user interfaces for creating or modifying rules or policies in accordance with various embodiments.

FIG. 10 is a flow chart depicting a process for creating or modifying rules or policies in accordance with various embodiments.

DETAILED DESCRIPTION

Figure 1:
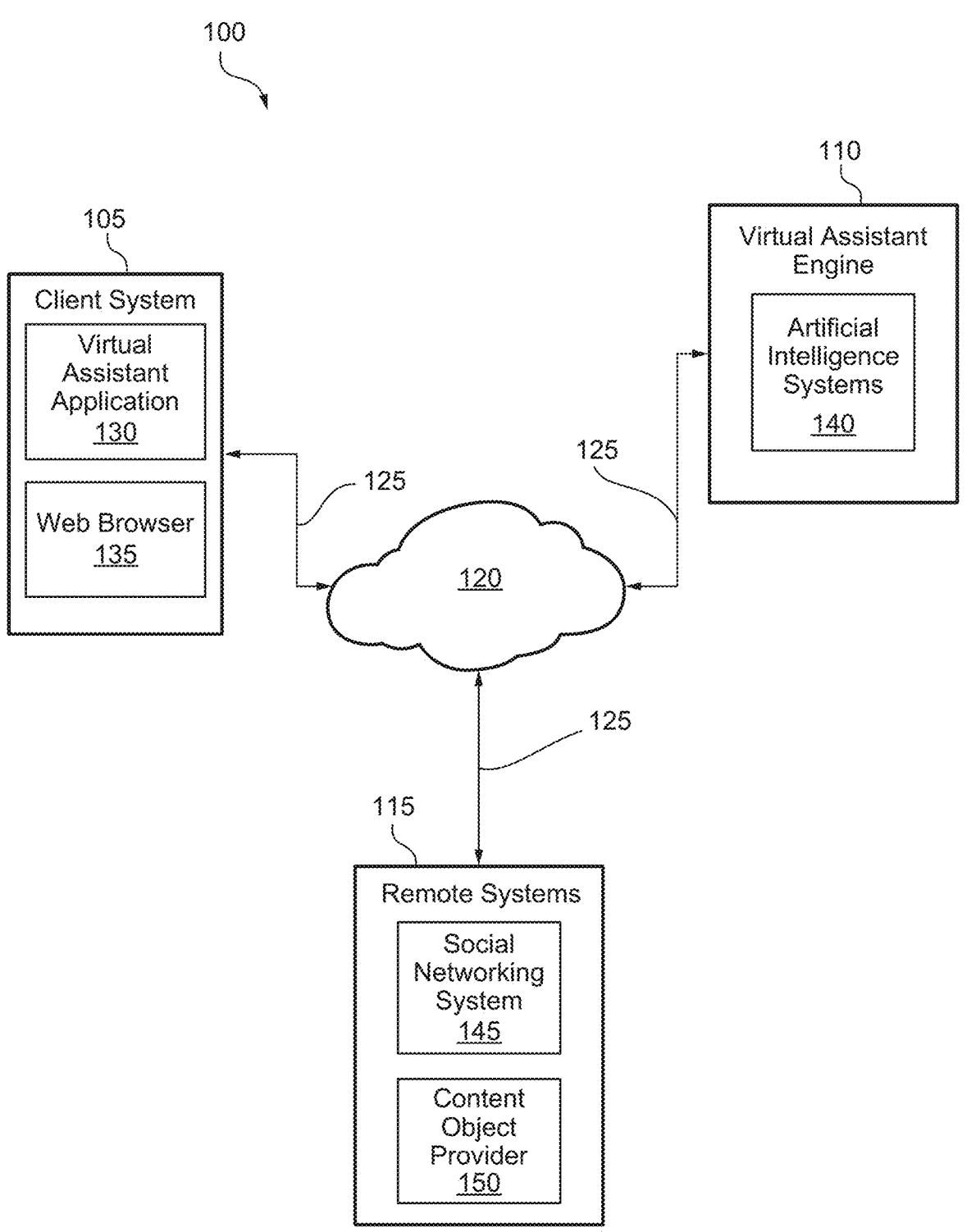
FIG. 1 is a simplified block diagram of a network environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Extended reality systems are becoming increasingly ubiquitous with applications in many fields, such as computer gaming, health and safety, industrial, and education. As a few examples, extended reality systems are being incorporated into mobile devices, gaming consoles, personal computers, movie theaters, and theme parks. Typical extended reality systems include one or more devices for rendering and displaying content to users. As one example, an extended reality system may incorporate a head-mounted device (TIMID) worn by a user and configured to output extended reality content to the user. The extended reality content may be generated in a wholly or partially simulated environment (extended reality environment) that people sense and/or interact with via an electronic system. The simulated environment may be a virtual reality (VR) environment, which is designed to be based entirely on computer-generated sensory inputs (e.g., virtual content) for one or more user senses, or a mixed reality (MR) environment, which is designed to incorporate sensory inputs (e.g., a view of the physical surroundings) from the physical environment, or a representation thereof, in addition to including computer-generated sensory inputs (e.g., virtual content). Examples of MR include augmented reality (AR) and augmented virtuality (AV). An AR environment is a simulated environment in which one or more virtual objects are superimposed over a physical environment, or a representation thereof, or a simulated environment in which a representation of a physical environment is transformed by computer-generated sensory information. An AV environment is a simulated environment in which a virtual or computer-generated environment incorporates one or more sensory inputs from the physical environment. In any instance, during operation in a VR, MR, AR, or AV environment, the user typically interacts within the extended reality system to interact with extended reality content.

In many activities undertaken via VR, MR, AR, or AV, users freely roam through simulated and physical environments and are provided with content that contains information that can be important and/or relevant to a user's experience within the simulated and physical environments. For example, an extended reality system can assist a user with performance of tasks in the simulated and physical environments by providing the user with content such as information about the environments and instructions for performing the task. In another example, an extended reality system can also assist the user by providing content and/or performing tasks or services for the user based on policies and contextual features within the environments. In many cases, the policies and rules therein are generally created prior to the content being provided and the tasks being performed. However, the simulated and physical environments are dynamic, user preferences frequently change, and unforeseen circumstances often arise. Additionally, while some extended reality systems provide users with interfaces for guiding and/or informing generic policies, these extended reality systems do not typically provide users with a means to intuitively create and modify custom polices. As a result, the content provided and tasks performed may not always align with the user's current environment, activities, or preferences, which reduces performance and limits broader applicability of these extended reality systems.

The techniques disclosed herein overcome these challenges and others by providing users of extended reality systems with an editing tool user interface for defining and modifying context aware artificial intelligence policies. A context aware artificial intelligence policy (described herein as a context aware policy or CAP for short) is an important component of a goal oriented interface such as that provided by the virtual assistant. The CAP automates the extended reality interfaces by referring to the user's activities and surrounding contexts. To that end, CAPs handle dynamic environments, unexpected corner cases and changing user preferences, which cannot be foreseen at the time when they are created. The present disclosure describes systems and processes to assist the users to define and modify the CAPs when necessary. Thus, the accuracy and performance of the CAPs can be maintained and improved over time.

These systems and processes provide the editing tool user interface for defining and modifying rules and policies using an object based programing language visualized as interconnected elements ("building blocks"). The elements represent subjects, objects, and relationships between the subjects and objects allowing for contextual triggers to be better understood and defined. The interconnected elements can be preconfigured by a developer as a collection of various rules and policies. The preconfiguration is displayable to the user via the editing tool user interface. Rules, policies, and/or elements can be associated with physical or virtual objects (e.g., a piece of furniture) or grouped or clustered together into moods, personality, or recipes for facilitating a defined style of living (including the control of multiple devices by artificial intelligence). The associating and clustering can be manual by the user using the editing tool user interface or suggested by artificial intelligence based on user preference/learned behavior. The interconnected elements can be reconfigured by the artificial intelligence based on its interaction with the user and learning of their preferences for the rules and policies. The reconfiguration is displayable to the user via the editing tool user interface.

In exemplary embodiments, an extended reality system is provided that includes a head-mounted device comprising a display that displays content to a user and one or more cameras that capture images of a visual field of the user wearing the head-mounted device; a processing system; and at least one memory storing instructions that, when executed by the processing system, cause the extended reality system to perform operations comprising: in response to the user launching an authoring session to generate a context aware policy, rendering a user interface in extended reality on the display; obtaining a template based on the user or data collected from user interactions in extended reality, wherein the template provides initial values for actions and context conditions to be used for building or modifying one or more context aware policies; rendering the template and tools for editing the template in the user interface, wherein the template is visualized as a collection of interconnectable building blocks comprising the actions and context conditions; receiving, via tools for editing the template in the user interface, a modification to the template, wherein the modification incudes a change to an initial value for the actions or the context conditions; and modifying the template based on the modification to generate the context aware policy, wherein the modification comprises changing the initial value for the actions or the context conditions of the template and saving the template as a separate instance representative of the context aware policy, and wherein the context aware policy defines an action to be triggered upon satisfaction of one or more context conditions within the extended reality.

Extended Reality System Overview

FIG. 1 illustrates an example network environment 100 associated with an extended reality system in accordance with aspects of the present disclosure. Network environment 100 includes a client system 105, a virtual assistant engine 110, and remote systems 115 connected to each other by a network 120. Although FIG. 1 illustrates a particular arrangement of the client system 105, the virtual assistant engine 110, the remote systems 115, and the network 120, this disclosure contemplates any suitable arrangement. As an example, and not by way of limitation, two or more of the client system 105, the virtual assistant engine 110, and the remote systems 115 may be connected to each other directly, bypassing the network 120. As another example, two or more of the client system 105, the virtual assistant engine 110, and the remote systems 115 may be physically or logically co-located with each other in whole or in part. Moreover, although FIG. 1 illustrates a particular number of the client system 105, the virtual assistant engine 110, the remote systems 115, and the network 120, this disclosure contemplates any suitable number of client systems 105, virtual assistant engine 110, remote systems 115, and networks 120. As an example, and not by way of limitation, network environment 100 may include multiple client systems, such as client system 105; virtual assistant engines, such as virtual assistant engine 110; remote systems, such as remote systems 115; and networks, such as network 120.

This disclosure contemplates that network 120 may be any suitable network. As an example, and not by way of limitation, one or more portions of a network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Additionally, the network 120 may include one or more networks.

Links 125 may connect the client system 105, the virtual assistant engine 110, and the remote systems 115 to the network 120, to another communication network (not shown), or to each other. This disclosure contemplates links 125 may include any number and type of suitable links. In particular embodiments, one or more of the links 125 include one or more wireline links (e.g., Digital Subscriber Line or Data Over Cable Service Interface Specification), wireless links (e.g., Wi-Fi or Worldwide Interoperability for Microwave Access), or optical links (e.g., Synchronous Optical Network or Synchronous Digital Hierarchy). In particular embodiments, each link of the links 125 includes an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 125, or a combination of two or more such links. Links 125 need not necessarily be the same throughout a network environment 100. For example, some links of the links 125 may differ in one or more respects from some other links of the links 125.

In various embodiments, the client system 105 is an electronic device including hardware, software, or embedded logic components or a combination of two or more such components and capable of carrying out the appropriate extended reality functionalities in accordance with techniques of the disclosure. As an example, and not by way of limitation, the client system 105 may include a desktop computer, notebook or laptop computer, netbook, a tablet computer, e-book reader, global positioning system (GPS) device, camera, personal digital assistant, handheld electronic device, cellular telephone, smartphone, a VR, MR, AR, or AV headset or HMD, any suitable electronic device capable of displaying extended reality content, or any suitable combination thereof. In particular embodiments, the client system 105 is a VR/AR HMD, such as described in detail with respect to FIG. 2. This disclosure contemplates any suitable client system 105 that is configured to generate and output extended reality content to the user. The client system 105 may enable its user to communicate with other users at other client systems.

In various embodiments, the client system 105 includes a virtual assistant application 130. The virtual assistant application 130 instantiates at least a portion of a virtual assistant, which can provide information or services to a user based on user input, contextual awareness (such as clues from the physical environment or clues from user behavior), and the capability to access information from a variety of online sources (such as weather conditions, traffic information, news, stock prices, user schedules, and/or retail prices). As used herein, when an action is "based on" something, this means the action is based at least in part on at least a part of the something. The user input may include text (e.g., online chat), especially in an instant messaging application or other applications, voice, eye-tracking, user motion, such as gestures or running, or a combination of them. The virtual assistant may perform concierge-type services (e.g., making dinner reservations, purchasing event tickets, making travel arrangements, and the like), provide information (e.g., reminders, information concerning an object in an environment, information concerning a task or interaction, answers to questions, training regarding a task or activity, and the like), provide goal assisted services (e.g., generating and implementing a recipe to cook a meal in a certain amount of time, implementing tasks to clean in a most efficient manner, generating and executing a construction plan including allocation of tasks to two or more workers, and the like), execute policies in accordance with context aware policies (CAPs), and similar types of extended reality services. The virtual assistant may also perform management or data-handling tasks based on online information and events without user initiation or interaction. Examples of those tasks that may be performed by the virtual assistant may include schedule management (e.g., sending an alert to a dinner date to which a user is running late due to traffic conditions, updating schedules for both parties, and changing the restaurant reservation time). The virtual assistant may be enabled in an extended reality environment by a combination of the client system 105, the virtual assistant engine 110, application programming interfaces (APIs), and the proliferation of applications on user devices, such as the remote systems 115.

A user at the client system 105 may use the virtual assistant application 130 to interact with the virtual assistant engine 110. In some instances, the virtual assistant application 130 is a stand-alone application or integrated into another application, such as a social-networking application or another suitable application (e.g., an artificial simulation application). In some instances, the virtual assistant application 130 is integrated into the client system 105 (e.g., part of the operating system of the client system 105), an assistant hardware device, or any other suitable hardware devices. In some instances, the virtual assistant application 130 may be accessed via a web browser 135. In some instances, the virtual assistant application 130 passively listens to and observes interactions of the user in the real-world, and processes what it hears and sees (e.g., explicit input, such as audio commands or interface commands, contextual awareness derived from audio or physical actions of the user, objects in the real-world, environmental triggers such as weather or time, and the like) in order to interact with the user in an intuitive manner.

In particular embodiments, the virtual assistant application 130 receives or obtains input from a user, the physical environment, a virtual reality environment, or a combination thereof via different modalities. As an example, and not by way of limitation, the modalities may include audio, text, image, video, motion, graphical or virtual user interfaces, orientation, and/or sensors. The virtual assistant application 130 communicates the input to the virtual assistant engine 110. Based on the input, the virtual assistant engine 110 analyzes the input and generates responses (e.g., text or audio responses, device commands, such as a signal to turn on a television, virtual content such as a virtual object, or the like) as output. The virtual assistant engine 110 may send the generated responses to the virtual assistant application 130, the client system 105, the remote systems 115, or a combination thereof. The virtual assistant application 130 may present the response to the user at the client system 105 (e.g., rendering virtual content overlaid on a real-world object within the display). The presented responses may be based on different modalities, such as audio, text, image, and video. As an example, and not by way of limitation, context concerning activity of a user in the physical world may be analyzed and determined to initiate an interaction for completing an immediate task or goal, which may include the virtual assistant application 130 retrieving traffic information (e.g., via remote systems 115). The virtual assistant application 130 may communicate the request for traffic information to virtual assistant engine 110. The virtual assistant engine 110 may accordingly contact a third-party system and retrieve traffic information as a result of the request and send the traffic information back to the virtual assistant application 110. The virtual assistant application 110 may then present the traffic information to the user as text (e.g., as virtual content overlaid on the physical environment, such as real-world object) or audio (e.g., spoken to the user in natural language through a speaker associated with the client system 105).

In some embodiments, the client system 105 may collect or otherwise be associated with data. In some embodiments, the data may be collected from or pertain to any suitable computing system or application (e.g., a social-networking system, other client systems, a third-party system, a messaging application, a photo-sharing application, a biometric data acquisition application, an artificial-reality application, a virtual assistant application).

In some embodiments, privacy settings (or "access settings") may be provided for the data. The privacy settings may be stored in any suitable manner (e.g., stored in an index on an authorization server). A privacy setting for the data may specify how the data or particular information associated with the data can be accessed, stored, or otherwise used (e.g., viewed, shared, modified, copied, executed, surfaced, or identified) within an application (e.g., an extended reality application). When the privacy settings for the data allow a particular user or other entity to access that the data, the data may be described as being "visible" with respect to that user or other entity. For example, a user of an extended reality application or virtual assistant application may specify privacy settings for a user profile page that identifies a set of users that may access the extended reality application or virtual assistant application information on the user profile page and excludes other users from accessing that information. As another example, an extended reality application or virtual assistant application may store privacy policies/guidelines. The privacy policies/guidelines may specify what information of users may be accessible by which entities and/or by which processes (e.g., internal research, advertising algorithms, machine-learning algorithms) to ensure only certain information of the user may be accessed by certain entities or processes.

In some embodiments, privacy settings for the data may specify a "blocked list" of users or other entities that should not be allowed to access certain information associated with the data. In some cases, the blocked list may include third-party entities. The blocked list may specify one or more users or entities for which the data is not visible.

In some embodiments, privacy settings associated with the data may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different pieces of the data of the same type associated with a user may have different privacy settings. In addition, one or more default privacy settings may be set for each piece of data of a particular data type.

In various embodiments, the virtual assistant engine 110 assists users to retrieve information from different sources, request services from different service providers, assist users to learn or complete goals and tasks using different sources and/or service providers, execute policies or services, and combinations thereof. In some instances, the virtual assistant engine 110 receives input data from the virtual assistant application 130 and determines one or more interactions based on the input data that could be executed to request information, services, and/or complete a goal or task of the user. The interactions are actions that could be presented to a user for execution in an extended reality environment. In some instances, the interactions are influenced by other actions associated with the user. The interactions are aligned with affordances, goals, or tasks associated with the user. Affordances may include actions or services associated with smart home devices, extended reality applications, web services, and the like. Goals may include things that a user wants to occur or desires (e.g., as a meal, a piece of furniture, a repaired automobile, a house, a garden, a clean apartment, and the like). Tasks may include things that need to be done or activities that should be carried out in order to accomplish a goal or carry out an aim (e.g., cooking a meal using one or more recipes, building a piece of furniture, repairing a vehicle, building a house, planting a garden, cleaning one or more rooms of an apartment, and the like). Each goal and task may be associated with a workflow of actions or sub-tasks for performing the task and achieving the goal. For example, for preparing a salad, a workflow of actions or sub-tasks may include the ingredients needed, equipment needed for the steps (e.g., a knife, a stove top, a pan, a salad spinner), sub-tasks for preparing ingredients (e.g., chopping onions, cleaning lettuce, cooking chicken), and sub-tasks for combining ingredients into subcomponents (e.g., cooking chicken with olive oil and Italian seasonings).

The virtual assistant engine 110 may use artificial intelligence (AI) systems 140 (e.g., rule-based systems and/or machine-learning based systems) to analyze the input based on a user's profile and other relevant information. The result of the analysis may include different interactions associated with an affordance, task, or goal of the user. The virtual assistant engine 110 may then retrieve information, request services, and/or generate instructions, recommendations, or virtual content associated with one or more of the different interactions for executing the actions associated with the affordances and/or completing tasks or goals. In some instances, the virtual assistant engine 110 interacts with remote systems 115, such as a social-networking system 145 when retrieving information, requesting service, and/or generating instructions or recommendations for the user. The virtual assistant engine 110 may generate virtual content for the user using various techniques, such as natural language generating, virtual object rendering, and the like. The virtual content may include, for example, the retrieved information; the status of the requested services; a virtual object, such as a glimmer overlaid on a physical object such as an appliance, light, or piece of exercise equipment; a demonstration for a task, and the like. In particular embodiments, the virtual assistant engine 110 enables the user to interact with it regarding the information, services, or goals using a graphical or virtual interface, a stateful and multi-turn conversation using dialog-management techniques, and/or a stateful and multi-action interaction using task-management techniques.

In various embodiments, remote systems 115 may include one or more types of servers, one or more data stores, one or more interfaces, including but not limited to APIs, one or more web services, one or more content sources, one or more networks, or any other suitable components, e.g., that servers may communicate with. A remote system 115 may be operated by a same entity or a different entity from an entity operating the virtual assistant engine 110. In particular embodiments, however, the virtual assistant engine 110 and third-party systems may operate in conjunction with each other to provide virtual content to users of the client system 105. For example, a social-networking system 145 may provide a platform, or backbone, which other systems, such as third-party systems, may use to provide social-networking services and functionality to users across the Internet, and the virtual assistant engine 110 may access these systems to provide virtual content on the client system 105.

In particular embodiments, the social-networking system 145 may be a network-addressable computing system that can host an online social network. The social-networking system 145 may generate, store, receive, and send social-networking data, such as user-profile data, concept-profile data, social-graph information, or other suitable data related to the online social network. The social-networking system 145 may be accessed by the other components of network environment 100 either directly or via a network 120. As an example, and not by way of limitation, the client system 105 may access the social-networking system 145 using a web browser 135, or a native application associated with the social-networking system 145 (e.g., a mobile social-networking application, a messaging application, another suitable application, or any combination thereof) either directly or via a network 120. The social-networking system 145 may provide users with the ability to take actions on various types of items or objects, supported by the social-networking system 145. As an example, and not by way of limitation, the items and objects may include groups or social networks to which users of the social-networking system 145 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 145 or by an external system of the remote systems 115, which is separate from the social-networking system 145 and coupled to the social-networking system via the network 120.

Remote systems 115 may include a content object provider 150. A content object provider 150 includes one or more sources of virtual content objects, which may be communicated to the client system 105. As an example, and not by way of limitation, virtual content objects may include information regarding things or activities of interest to the user, such as movie show times, movie reviews, restaurant reviews, restaurant menus, product information and reviews, instructions on how to perform various tasks, exercise regimens, cooking recipes, or other suitable information. As another example and not by way of limitation, content objects may include incentive content objects, such as coupons, discount tickets, gift certificates, or other suitable incentive objects. As another example and not by way of limitation, content objects may include virtual objects, such as virtual interfaces, two-dimensional (2D) or three-dimensional (3D) graphics, media content, or other suitable virtual objects.

Figure 2A:
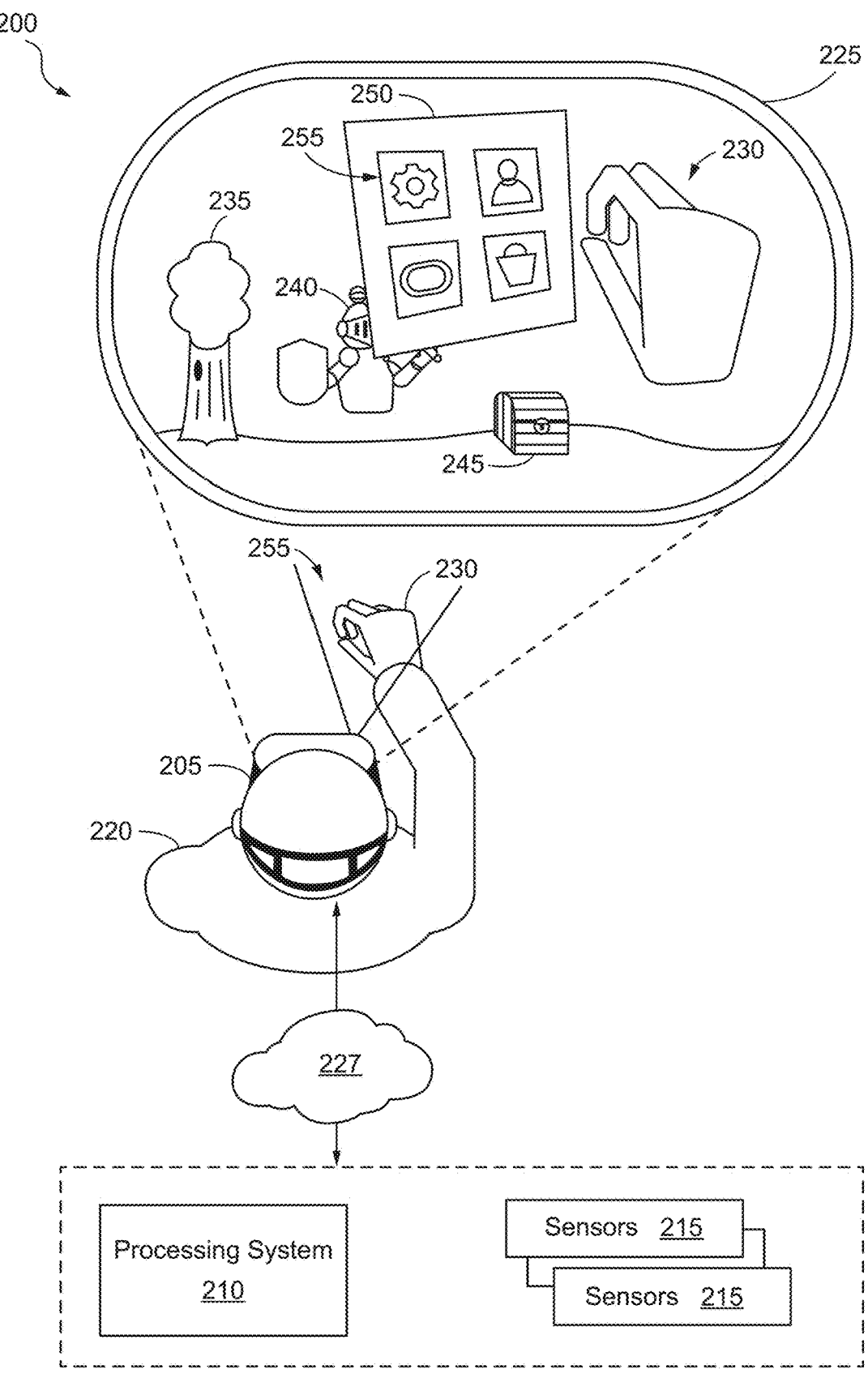
FIG. 2A is an illustration depicting an example extended reality system that presents and controls user interface elements within an extended reality environment in accordance with various embodiments.

FIG. 2A illustrates an example client system 200 (e.g., client system 105 described with respect to FIG. 1) in accordance with aspects of the present disclosure. Client system 200 includes an extended reality system 205 (e.g., an HMD), a processing system 210, and one or more sensors 215. As shown, extended reality system 205 is typically worn by user 220 and includes an electronic display (e.g., a transparent, translucent, or solid display), optional controllers, and optical assembly for presenting extended reality content 225 to the user 220. The one or more sensors 215 may include motion sensors (e.g., accelerometers) for tracking motion of the extended reality system 205 and may include one or more image capturing devices (e.g., cameras, line scanners) for capturing images and other information of the surrounding physical environment. In this example, processing system 210 is shown as a single computing device, such as a gaming console, workstation, a desktop computer, or a laptop. In other examples, processing system 210 may be distributed across a plurality of computing devices, such as a distributed computing network, a data center, or a cloud computing system. In other examples, processing system 210 may be integrated with the HMD. Extended reality system 205, processing system 210, and the one or more sensors 215 are communicatively coupled via a network 227, which may be a wired or wireless network, such as Wi-Fi, a mesh network, or a short-range wireless communication medium, such as Bluetooth wireless technology, or a combination thereof. Although extended reality system 205 is shown in this example as in communication with, e.g., tethered to or in wireless communication with, the processing system 210, in some implementations, extended reality system 205 operates as a stand-alone, mobile extended reality system.

In general, client system 200 uses information captured from a real-world, physical environment to render extended reality content 225 for display to the user 220. In the example of FIG. 2A, the user 220 views the extended reality content 225 constructed and rendered by an extended reality application executing on processing system 210 and/or extended reality system 205. In some examples, the extended reality content 225 viewed through the extended reality system 205 includes a mixture of real-world imagery (e.g., the user's hand 230 and physical objects 235) and virtual imagery (e.g., virtual content, such as information or objects 240, 245 and virtual user interface 250) to produce mixed reality and/or augmented reality. In some examples, virtual information or objects 240, 245 may be mapped (e.g., pinned, locked, placed) to a particular position within extended reality content 225. For example, a position for virtual information or objects 240, 245 may be fixed, as relative to one of walls of a residence or surface of the earth, for instance. A position for virtual information or objects 240, 245 may be variable, as relative to a physical object 235 or the user 220, for instance. In some examples, the particular position of virtual information or objects 240, 245 within the extended reality content 225 is associated with a position within the real world, physical environment (e.g., on a surface of a physical object 235).

In the example shown in FIG. 2A, virtual information or objects 240, 245 are mapped at a position relative to a physical object 235. As should be understood, the virtual imagery (e.g., virtual content, such as information or objects 240, 245 and virtual user interface 250) does not exist in the real-world, physical environment. Virtual user interface 250 may be fixed, as relative to the user 220, the user's hand 230, physical objects 235, or other virtual content, such as virtual information or objects 240, 245, for instance. As a result, client system 200 renders, at a user interface position that is locked relative to a position of the user 220, the user's hand 230, physical objects 235, or other virtual content in the extended reality environment, virtual user interface 250 for display at extended reality system 205 as part of extended reality content 225. As used herein, a virtual element 'locked' to a position of virtual content or a physical object is rendered at a position relative to the position of the virtual content or physical object so as to appear to be part of or otherwise tied in the extended reality environment to the virtual content or physical object.

In some implementations, the client system 200 generates and renders virtual content (e.g., GIFs, photos, applications, live-streams, videos, text, a web-browser, drawings, animations, representations of data files, or any other visible media) on a virtual surface. A virtual surface may be associated with a planar or other real-world surface (e.g., the virtual surface corresponds to and is locked to a physical surface, such as a wall, table, or ceiling). In the example shown in FIG. 2A, the virtual surface is associated with the sky and ground of the physical environment. In other examples, a virtual surface can be associated with a portion of a surface (e.g., a portion of the wall). In some examples, only the virtual content items contained within a virtual surface are rendered. In other examples, the virtual surface is generated and rendered (e.g., as a virtual plane or as a border corresponding to the virtual surface). In some examples, a virtual surface can be rendered as floating in a virtual or real-world physical environment (e.g., not associated with a particular real-world surface). The client system 200 may render one or more virtual content items in response to a determination that at least a portion of the location of virtual content items is in a field of view of the user 220. For example, client system 200 may render virtual user interface 250 only if a given physical object (e.g., a lamp) is within the field of view of the user 220.

During operation, the extended reality application constructs extended reality content 225 for display to user 220 by tracking and computing interaction information (e.g., tasks for completion) for a frame of reference, typically a viewing perspective of extended reality system 205. Using extended reality system 205 as a frame of reference and based on a current field of view as determined by a current estimated interaction of extended reality system 205, the extended reality application renders extended reality content 225 which, in some examples, may be overlaid, at least in part, upon the real-world, physical environment of the user 220. During this process, the extended reality application uses sensed data received from extended reality system 205 and sensors 215, such as movement information, contextual awareness, and/or user commands, and, in some examples, data from any external sensors, such as third-party information or device, to capture information within the real world, physical environment, such as motion by user 220 and/or feature tracking information with respect to user 220. Based on the sensed data, the extended reality application determines interaction information to be presented for the frame of reference of extended reality system 205 and, in accordance with the current context of the user 220, renders the extended reality content 225.

Client system 200 may trigger generation and rendering of virtual content based on a current field of view of user 220, as may be determined by real-time gaze 265 tracking of the user, or other conditions. More specifically, image capture devices of the sensors 215 capture image data representative of objects in the real-world, physical environment that are within a field of view of image capture devices. During operation, the client system 200 performs object recognition within images captured by the image capturing devices of extended reality system 205 to identify objects in the physical environment, such as the user 220, the user's hand 230, and/or physical objects 235. Further, the client system 200 tracks the position, orientation, and configuration of the objects in the physical environment over a sliding window of time. Field of view typically corresponds with the viewing perspective of the extended reality system 205. In some examples, the extended reality application presents extended reality content 225 that includes mixed reality and/or augmented reality.

As illustrated in FIG. 2A, the extended reality application may render virtual content, such as virtual information or objects 240, 245 on a transparent display such that the virtual content is overlaid on real-world objects, such as the portions of the user 220, the user's hand 230, or physical objects 235, that are within a field of view of the user 220. In other examples, the extended reality application may render images of real-world objects, such as the portions of the user 220, the user's hand 230, or physical objects 235, that are within a field of view along with virtual objects, such as virtual information or objects 240, 245 within extended reality content 225. In other examples, the extended reality application may render virtual representations of the portions of the user 220, the user's hand 230, and physical objects 235 that are within a field of view (e.g., render real-world objects as virtual objects) within extended reality content 225. In either example, user 220 is able to view the portions of the user 220, the user's hand 230, physical objects 235 and/or any other real-world objects or virtual content that are within a field of view within extended reality content 225. In other examples, the extended reality application may not render representations of the user 220 and the user's hand 230; the extended reality application may instead only render the physical objects 235 and/or virtual information or objects 240, 245.

In various embodiments, the client system 200 renders to extended reality system 205 extended reality content 225 in which virtual user interface 250 is locked relative to a position of the user 220, the user's hand 230, physical objects 235, or other virtual content in the extended reality environment. That is, the client system 205 may render a virtual user interface 250 having one or more virtual user interface elements at a position and orientation that are based on and correspond to the position and orientation of the user 220, the user's hand 230, physical objects 235, or other virtual content in the extended reality environment. For example, if a physical object is positioned in a vertical position on a table, the client system 205 may render the virtual user interface 250 at a location corresponding to the position and orientation of the physical object in the extended reality environment. Alternatively, if the user's hand 230 is within the field of view, the client system 200 may render the virtual user interface at a location corresponding to the position and orientation of the user's hand 230 in the extended reality environment. Alternatively, if other virtual content is within the field of view, the client system 200 may render the virtual user interface at a location corresponding to a general predetermined position of the field of view (e.g., a bottom of the field of view) in the extended reality environment. Alternatively, if other virtual content is within the field of view, the client system 200 may render the virtual user interface at a location corresponding to the position and orientation of the other virtual content in the extended reality environment. In this way, the virtual user interface 250 being rendered in the virtual environment may track the user 220, the user's hand 230, physical objects 235, or other virtual content such that the user interface appears, to the user, to be associated with the user 220, the user's hand 230, physical objects 235, or other virtual content in the extended reality environment.

Figure 2B:
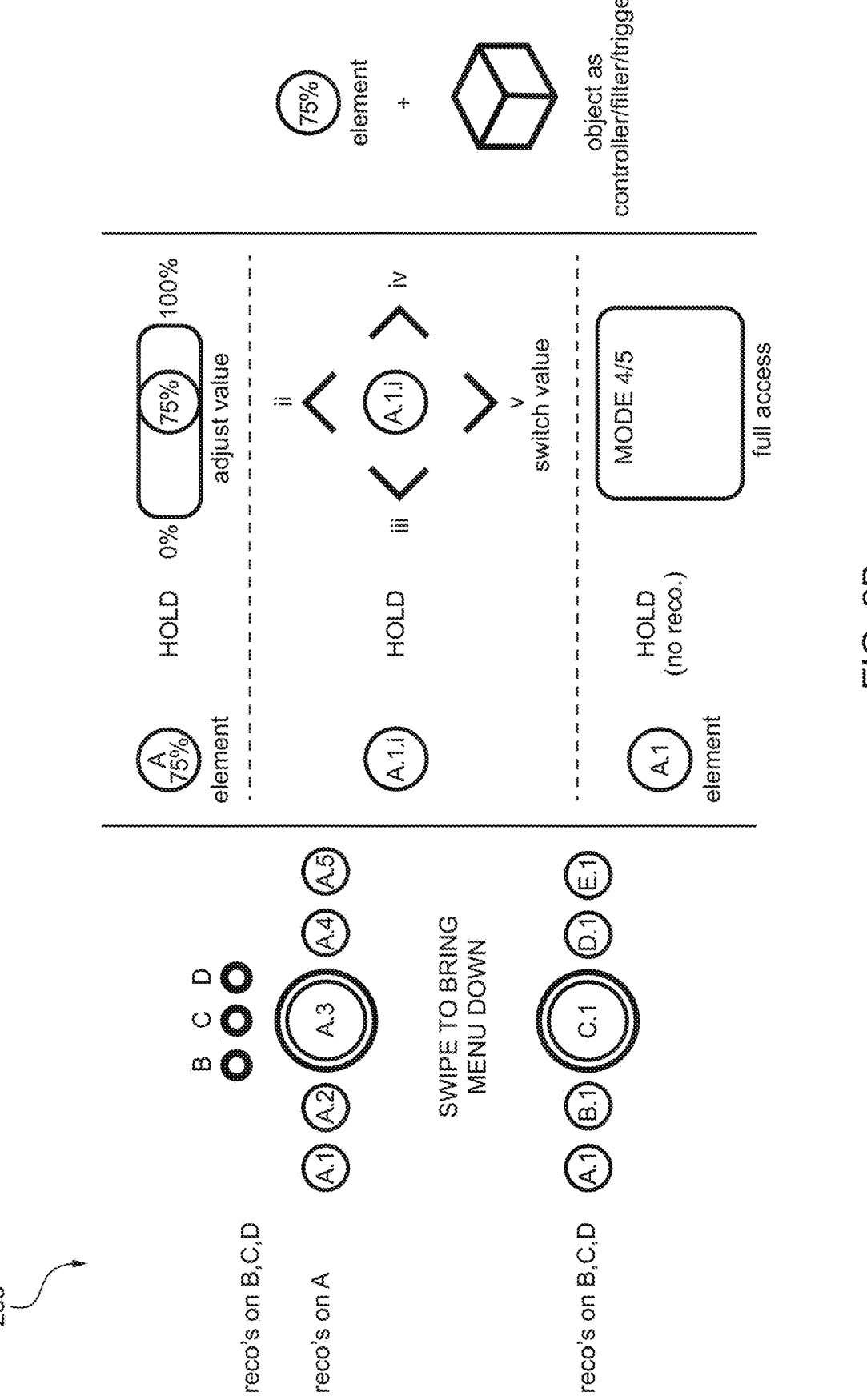
FIG. 2B is an illustration depicting user interface elements in accordance with various embodiments.

As shown in FIGS. 2A and 2B, virtual user interface 250 includes one or more virtual user interface elements. Virtual user interface elements may include, for instance, a virtual drawing interface; a selectable menu (e.g., a drop-down menu); virtual buttons, such as button element 255; a virtual slider or scroll bar; a directional pad; a keyboard; other user-selectable user interface elements including glyphs, display elements, content, user interface controls, and so forth. The particular virtual user interface elements for virtual user interface 250 may be context-driven based on the current extended reality applications engaged by the user 220 or real-world actions/tasks being performed by the user 220. When a user performs a user interface gesture in the extended reality environment at a location that corresponds to one of the virtual user interface elements of virtual user interface 250, the client system 200 detects the gesture relative to the virtual user interface elements and performs an action associated with the gesture and the virtual user interface elements. For example, the user 220 may press their finger at a button element 255 location on the virtual user interface 250. The button element 255 and/or virtual user interface 250 location may or may not be overlaid on the user 220, the user's hand 230, physical objects 235, or other virtual content, e.g., correspond to a position in the physical environment, such as on a light switch or controller at which the client system 200 renders the virtual user interface button. In this example, the client system 200 detects this virtual button press gesture and performs an action corresponding to the detected press of a virtual user interface button (e.g., turns the light on). The client system 205 may also, for instance, animate a press of the virtual user interface button along with the button press gesture.

The client system 200 may detect user interface gestures and other gestures using an inside-out or outside-in tracking system of image capture devices and or external cameras. The client system 200 may alternatively, or in addition, detect user interface gestures and other gestures using a presence-sensitive surface. That is, a presence-sensitive interface of the extended reality system 205 and/or controller may receive user inputs that make up a user interface gesture. The extended reality system 205 and/or controller may provide haptic feedback to touch-based user interaction by having a physical surface with which the user can interact (e.g., touch, drag a finger across, grab, and so forth). In addition, peripheral extended reality system 205 and/or controller may output other indications of user interaction using an output device. For example, in response to a detected press of a virtual user interface button, extended reality system 205 and/or controller may output a vibration or "click" noise, or extended reality system 205 and/or controller may generate and output content to a display. In some examples, the user 220 may press and drag their finger along physical locations on the extended reality system 205 and/or controller corresponding to positions in the virtual environment at which the client system 205 renders virtual user interface elements of virtual user interface 250. In this example, the client system 205 detects this gesture and performs an action according to the detected press and drag of virtual user interface elements, such as by moving a slider bar in the virtual environment. In this way, client system 200 simulates movement of virtual content using virtual user interface elements and gestures.

Various embodiments disclosed herein may include or be implemented in conjunction with various types of extended reality systems. Extended reality content generated by the extended reality systems may include completely computer-generated content or computer-generated content combined with captured (e.g., real-world) content. The extended reality content may include video, audio, haptic feedback, or some combination thereof, any of which may be presented in a single channel or in multiple channels (e.g., stereo video that produces a 3D effect to the viewer). Additionally, in some embodiments, extended reality may also be associated with applications, products, accessories, services, or some combination thereof, that are used to, for example, create content in an extended reality and/or are otherwise used in (e.g., to perform activities in) an extended reality.

The extended reality systems may be implemented in a variety of different form factors and configurations. Some extended reality systems may be designed to work without near-eye displays (NEDs). Other extended reality systems may include an NED that also provides visibility into the real world (e.g., augmented reality system 300 in FIG. 3A) or that visually immerses a user in an extended reality (e.g., virtual reality system 350 in FIG. 3B). While some extended reality devices may be self-contained systems, other extended reality devices may communicate and/or coordinate with external devices to provide an extended reality experience to a user. Examples of such external devices include handheld controllers, mobile devices, desktop computers, devices worn by a user, devices worn by one or more other users, and/or any other suitable external system.

Figure 3A:
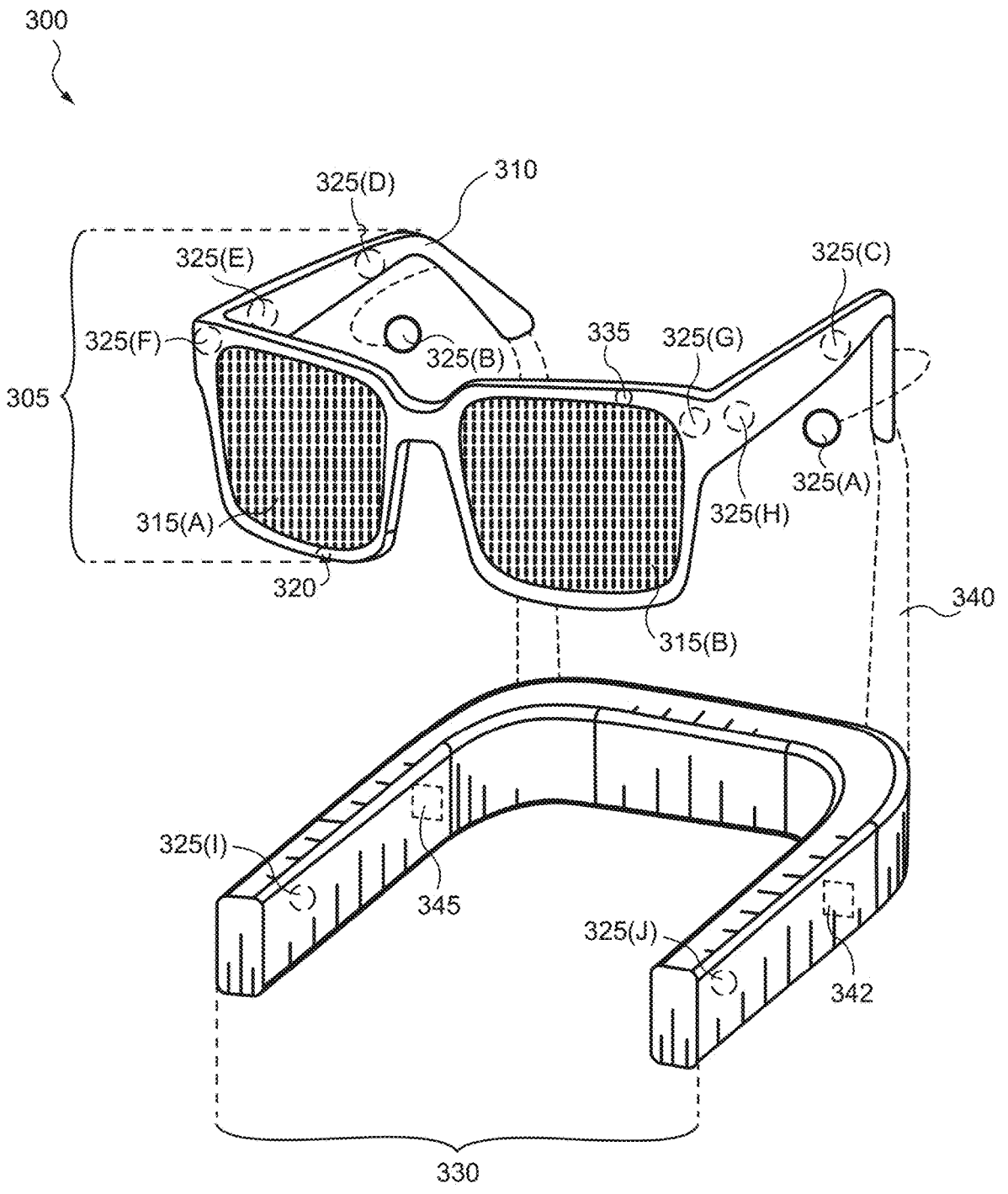
FIG. 3A is an illustration of an augmented reality system in accordance with various embodiments.

As shown in FIG. 3A, augmented reality system 300 may include an eyewear device 305 with a frame 310 configured to hold a left display device 315(A) and a right display device 315(B) in front of a user's eyes. Display devices 315(A) and 315(B) may act together or independently to present an image or series of images to a user. While augmented reality system 300 includes two displays, embodiments of this disclosure may be implemented in augmented reality systems with a single NED or more than two NEDs.

In some embodiments, augmented reality system 300 may include one or more sensors, such as sensor 320. Sensor 320 may generate measurement signals in response to motion of augmented reality system 300 and may be located on substantially any portion of frame 310. Sensor 320 may represent one or more of a variety of different sensing mechanisms, such as a position sensor, an inertial measurement unit (IMU), a depth camera assembly, a structured light emitter and/or detector, or any combination thereof. In some embodiments, augmented reality system 300 may or may not include sensor 320 or may include more than one sensor. In embodiments in which sensor 320 includes an IMU, the IMU may generate calibration data based on measurement signals from sensor 320. Examples of sensor 320 may include, without limitation, accelerometers, gyroscopes, magnetometers, other suitable types of sensors that detect motion, sensors used for error correction of the IMU, or some combination thereof.

In some examples, augmented reality system 300 may also include a microphone array with a plurality of acoustic transducers 325(A)-325(J), referred to collectively as acoustic transducers 325. Acoustic transducers 325 may represent transducers that detect air pressure variations induced by sound waves. Each acoustic transducer 325 may be configured to detect sound and convert the detected sound into an electronic format (e.g., an analog or digital format). The microphone array in FIG. 3A may include, for example, ten acoustic transducers: 325(A) and 325(B), which may be designed to be placed inside a corresponding ear of the user, acoustic transducers 325(C), 325(D), 325(E), 325(F), 325 (G), and 325(H), which may be positioned at various locations on frame 310, and/or acoustic transducers 325(I) and 325(J), which may be positioned on a corresponding neckband 330.

In some embodiments, one or more of acoustic transducers 325(A)-(J) may be used as output transducers (e.g., speakers). For example, acoustic transducers 325(A) and/or 325(B) may be earbuds or any other suitable type of headphone or speaker. The configuration of acoustic transducers 325 of the microphone array may vary. While augmented reality system 300 is shown in FIG. 3A as having ten acoustic transducers, the number of acoustic transducers 325 may be greater or less than ten. In some embodiments, using higher numbers of acoustic transducers 325 may increase the amount of audio information collected and/or the sensitivity and accuracy of the audio information. In contrast, using a lower number of acoustic transducers 325 may decrease the computing power required by an associated controller 335 to process the collected audio information. In addition, the position of each acoustic transducer 325 of the microphone array may vary. For example, the position of an acoustic transducer 325 may include a defined position on the user, a defined coordinate on frame 310, an orientation associated with each acoustic transducer 325, or some combination thereof.

Acoustic transducers 325(A) and 325(B) may be positioned on different parts of the user's ear, such as behind the pinna, behind the tragus, and/or within the auricle or fossa. Alternatively, or additionally, there may be additional acoustic transducers 325 on or surrounding the ear in addition to acoustic transducers 325 inside the ear canal. Having an acoustic transducer 325 positioned next to an ear canal of a user may enable the microphone array to collect information on how sounds arrive at the ear canal. By positioning at least two of acoustic transducers 325 on either side of a user's head (e.g., as binaural microphones), augmented reality system 300 may simulate binaural hearing and capture a 3D stereo sound field around a user's head. In some embodiments, acoustic transducers 325(A) and 325(B) may be connected to augmented reality system 300 via a wired connection 340, and in other embodiments acoustic transducers 325(A) and 325(B) may be connected to augmented reality system 300 via a wireless connection (e.g., a Bluetooth connection). In still other embodiments, acoustic transducers 325(A) and 325(B) may not be used at all in conjunction with augmented reality system 300.

Acoustic transducers 325 on frame 310 may be positioned in a variety of different ways, including along the length of the temples, across the bridge, above or below display devices 315(A) and 315(B), or some combination thereof. Acoustic transducers 325 may also be oriented such that the microphone array is able to detect sounds in a wide range of directions surrounding the user wearing the augmented reality system 300. In some embodiments, an optimization process may be performed during manufacturing of augmented reality system 300 to determine relative positioning of each acoustic transducer 325 in the microphone array.

In some examples, augmented reality system 300 may include or be connected to an external device (e.g., a paired device), such as neckband 330. Neckband 330 generally represents any type or form of paired device. Thus, the following discussion of neckband 330 may also apply to various other paired devices, such as charging cases, smart watches, smart phones, wrist bands, other wearable devices, hand-held controllers, tablet computers, laptop computers, and/or other external computing devices.

As shown, neckband 330 may be coupled to eyewear device 305 via one or more connectors. The connectors may be wired or wireless and may include electrical and/or non-electrical (e.g., structural) components. In some cases, eyewear device 305 and neckband 330 may operate independently without any wired or wireless connection between them. While FIG. 3A illustrates the components of eyewear device 305 and neckband 330 in example locations on eyewear device 305 and neckband 330, the components may be located elsewhere and/or distributed differently on eyewear device 305 and/or neckband 330. In some embodiments, the components of eyewear device 305 and neckband 330 may be located on one or more additional peripheral devices paired with eyewear device 305, neckband 330, or some combination thereof.

Pairing external devices, such as neckband 330, with augmented reality eyewear devices may enable the eyewear devices to achieve the form factor of a pair of glasses while still providing sufficient battery and computation power for expanded capabilities. Some or all of the battery power, computational resources, and/or additional features of augmented reality system 300 may be provided by a paired device or shared between a paired device and an eyewear device, thus reducing the weight, heat profile, and form factor of the eyewear device overall while still retaining desired functionality. For example, neckband 330 may allow components that would otherwise be included on an eyewear device to be included in neckband 330 since users may tolerate a heavier weight load on their shoulders than they would tolerate on their heads. Neckband 330 may also have a larger surface area over which to diffuse and disperse heat to the ambient environment. Thus, neckband 330 may allow for greater battery and computation capacity than might otherwise have been possible on a stand-alone eyewear device. Since weight carried in neckband 330 may be less invasive to a user than weight carried in eyewear device 305, a user may tolerate wearing a lighter eyewear device and carrying or wearing the paired device for greater lengths of time than a user would tolerate wearing a heavy standalone eyewear device, thereby enabling users to incorporate extended reality environments more fully into their day-to-day activities.

Neckband 330 may be communicatively coupled with eyewear device 305 and/or to other devices. These other devices may provide certain functions (e.g., tracking, localizing, depth mapping, processing, storage) to augmented reality system 300. In the embodiment of FIG. 3A, neckband 330 may include two acoustic transducers (e.g., 325(I) and 325(J)) that are part of the microphone array (or potentially form their own microphone subarray). Neckband 330 may also include a controller 342 and a power source 345.

Acoustic transducers 325(I) and 325(J) of neckband 330 may be configured to detect sound and convert the detected sound into an electronic format (analog or digital). In the embodiment of FIG. 3A, acoustic transducers 325(I) and 325(J) may be positioned on neckband 330, thereby increasing the distance between the neckband acoustic transducers 325(I) and 325(J) and other acoustic transducers 325 positioned on eyewear device 305. In some cases, increasing the distance between acoustic transducers 325 of the microphone array may improve the accuracy of beamforming performed via the microphone array. For example, if a sound is detected by acoustic transducers 325(C) and 325(D) and the distance between acoustic transducers 325(C) and 325 (D) is greater than, e.g., the distance between acoustic transducers 325(D) and 325(E), the determined source location of the detected sound may be more accurate than if the sound had been detected by acoustic transducers 325(D) and 325(E).

Controller 342 of neckband 330 may process information generated by the sensors on neckband 330 and/or augmented reality system 300. For example, controller 342 may process information from the microphone array that describes sounds detected by the microphone array. For each detected sound, controller 342 may perform a direction-of-arrival (DOA) estimation to estimate a direction from which the detected sound arrived at the microphone array. As the microphone array detects sounds, controller 342 may populate an audio data set with the information. In embodiments in which augmented reality system 300 includes an inertial measurement unit, controller 342 may compute all inertial and spatial calculations from the IMU located on eyewear device 305. A connector may convey information between augmented reality system 300 and neckband 330 and between augmented reality system 300 and controller 342. The information may be in the form of optical data, electrical data, wireless data, or any other transmittable data form. Moving the processing of information generated by augmented reality system 300 to neckband 330 may reduce weight and heat in eyewear device 305, making it more comfortable to the user.

Power source 345 in neckband 330 may provide power to eyewear device 305 and/or to neckband 330. Power source 345 may include, without limitation, lithium-ion batteries, lithium-polymer batteries, primary lithium batteries, alkaline batteries, or any other form of power storage. In some cases, power source 345 may be a wired power source. Including power source 345 on neckband 330 instead of on eyewear device 305 may help better distribute the weight and heat generated by power source 345.

As noted, some extended reality systems may, instead of blending an extended reality with actual reality, substantially replace one or more of a user's sensory perceptions of the real world with a virtual experience. One example of this type of system is a head-worn display system, such as virtual reality system 350 in FIG. 3B, that mostly or completely covers a user's field of view. Virtual reality system 350 may include a front rigid body 355 and a band 360 shaped to fit around a user's head. Virtual reality system 350 may also include output audio transducers 365(A) and 365(B). Furthermore, while not shown in FIG. 3B, front rigid body 355 may include one or more electronic elements, including one or more electronic displays, one or more inertial measurement units (IMUs), one or more tracking emitters or detectors, and/or any other suitable device or system for creating an extended reality experience.

Extended reality systems may include a variety of types of visual feedback mechanisms. For example, display devices in augmented reality system 300 and/or virtual reality system 350 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These extended reality systems may include a single display screen for both eyes or may provide a display screen for each eye, which may allow for additional flexibility for varifocal adjustments or for correcting a user's refractive error. Some of these extended reality systems may also include optical subsystems having one or more lenses (e.g., conventional concave or convex lenses, Fresnel lenses, adjustable liquid lenses) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (e.g., a single lens configuration that directly collimates light but results in so-called pincushion distortion) and/or a pupil-forming architecture (e.g., a multi-lens configuration that produces so-called barrel distortion to nullify pincushion distortion).

In addition to or instead of using display screens, some of the extended reality systems described herein may include one or more projection systems. For example, display devices in augmented reality system 300 and/or virtual reality system 350 may include micro-LED projectors that project light (using, e.g., a waveguide) into display devices, such as clear combiner lenses that allow ambient light to pass through. The display devices may refract the projected light toward a user's pupil and may enable a user to simultaneously view both extended reality content and the real world. The display devices may accomplish this using any of a variety of different optical components, including waveguide components (e.g., holographic, planar, diffractive, polarized, and/or reflective waveguide elements), light-manipulation surfaces and elements (e.g., diffractive, reflective, and refractive elements and gratings), and/or coupling elements. Extended reality systems may also be configured with any other suitable type or form of image projection system, such as retinal projectors used in virtual retina displays.

The extended reality systems described herein may also include various types of computer vision components and subsystems. For example, augmented reality system 300 and/or virtual reality system 350 may include one or more optical sensors, such as 2D or 3D cameras, structured light transmitters and detectors, time-of-flight depth sensors, single-beam or sweeping laser rangefinders, 3D LiDAR sensors, and/or any other suitable type or form of optical sensor. An extended reality system may process data from one or more of these sensors to identify a location of a user, to map the real world, to provide a user with context about real-world surroundings, and/or to perform a variety of other functions.

The extended reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the extended reality systems described herein may also include tactile (e.g., haptic) feedback systems, which may be incorporated into head-wear, gloves, body suits, handheld controllers, environmental devices (e.g., chairs, floormats), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other extended reality devices, within other extended reality devices, and/or in conjunction with other extended reality devices.

By providing haptic sensations, audible content, and/or visual content, extended reality systems may create an entire virtual experience or enhance a user's real-world experience in a variety of contexts and environments. For instance, extended reality systems may assist or extend a user's perception, memory, or cognition within a particular environment. Some systems may enhance a user's interactions with other people in the real world or may enable more immersive interactions with other people in a virtual world. Extended reality systems may also be used for educational purposes (e.g., for teaching or training in schools, hospitals, government organizations, military organizations, business enterprises), entertainment purposes (e.g., for playing video games, listening to music, watching video content), and/or for accessibility purposes (e.g., as hearing aids, visual aids). The embodiments disclosed herein may enable or enhance a user's extended reality experience in one or more of these contexts and environments and/or in other contexts and environments.

As noted, extended reality systems 300 and 350 may be used with a variety of other types of devices to provide a more compelling extended reality experience. These devices may be haptic interfaces with transducers that provide haptic feedback and/or that collect haptic information about a user's interaction with an environment. The extended reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4A:
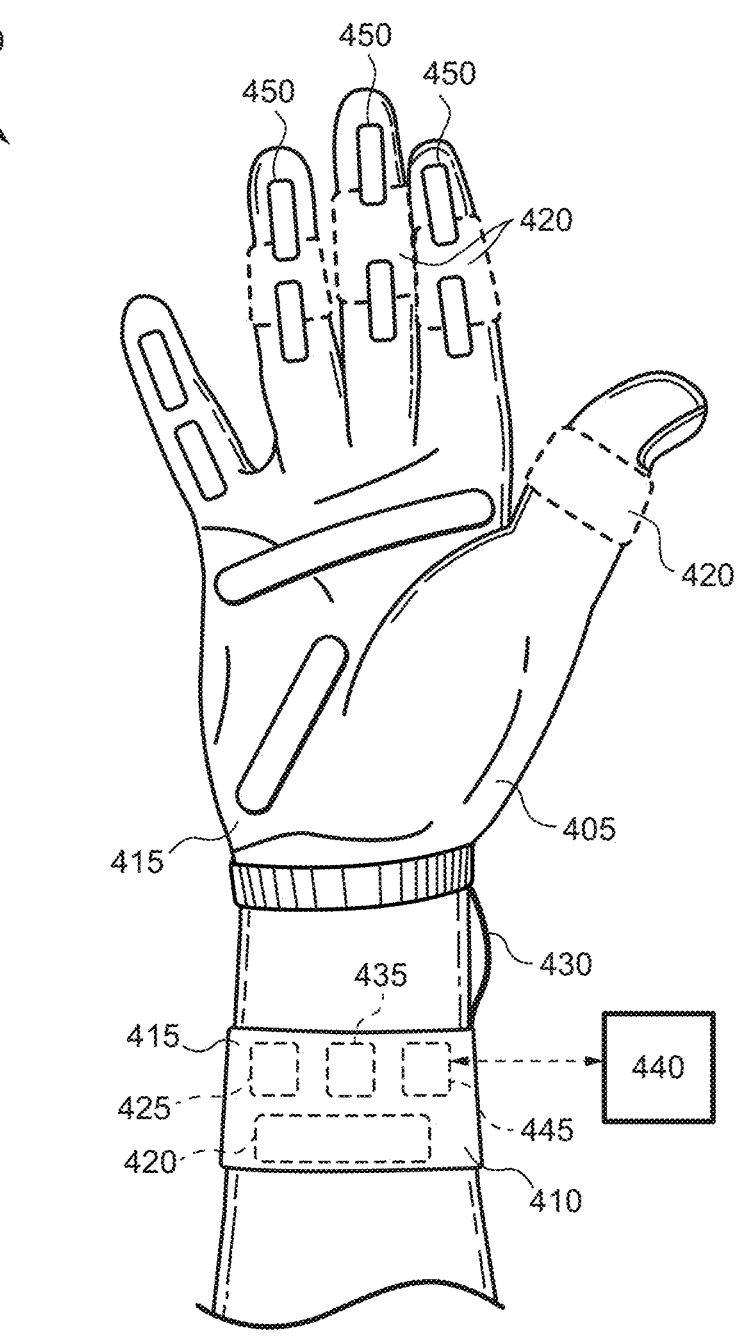
FIG. 4A is an illustration of haptic devices in accordance with various embodiments.

Haptic feedback may be provided by interfaces positioned within a user's environment (e.g., chairs, tables, floors) and/or interfaces on articles that may be worn or carried by a user (e.g., gloves, wristbands). As an example, FIG. 4A illustrates a vibrotactile system 400 in the form of a wearable glove (haptic device 405) and wristband (haptic device 410). Haptic device 405 and haptic device 410 are shown as examples of wearable devices that include a flexible, wearable textile material 415 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 420 may be positioned at least partially within one or more corresponding pockets formed in textile material 415 of vibrotactile system 400. Vibrotactile devices 420 may be positioned in locations to provide a vibrating sensation (e.g., haptic feedback) to a user of vibrotactile system 400. For example, vibrotactile devices 420 may be positioned against the user's finger(s), thumb, or wrist, as shown in FIG. 4A. Vibrotactile devices 420 may, in some examples, be sufficiently flexible to conform to or bend with the user's corresponding body part(s).

A power source 425 (e.g., a battery) for applying a voltage to the vibrotactile devices 420 for activation thereof may be electrically coupled to vibrotactile devices 420, such as via conductive wiring 430. In some examples, each of vibrotactile devices 420 may be independently electrically coupled to power source 425 for individual activation. In some embodiments, a processor 435 may be operatively coupled to power source 425 and configured (e.g., programmed) to control activation of vibrotactile devices 420.

Vibrotactile system 400 may be implemented in a variety of ways. In some examples, vibrotactile system 400 may be a standalone system with integral subsystems and components for operation independent of other devices and systems. As another example, vibrotactile system 400 may be configured for interaction with another device or system 440. For example, vibrotactile system 400 may, in some examples, include a communications interface 445 for receiving and/or sending signals to the other device or system 440. The other device or system 440 may be a mobile device, a gaming console, an extended reality (e.g., virtual reality, augmented reality, mixed reality) device, a personal computer, a tablet computer, a network device (e.g., a modem, a router), and a handheld controller. Communications interface 445 may enable communications between vibrotactile system 400 and the other device or system 440 via a wireless (e.g., Wi-Fi, Bluetooth, cellular, radio) link or a wired link. If present, communications interface 445 may be in communication with processor 435, such as to provide a signal to processor 435 to activate or deactivate one or more of the vibrotactile devices 420.

Vibrotactile system 400 may optionally include other subsystems and components, such as touch-sensitive pads 450, pressure sensors, motion sensors, position sensors, lighting elements, and/or user interface elements (e.g., an on/off button, a vibration control element). During use, vibrotactile devices 420 may be configured to be activated for a variety of different reasons, such as in response to the user's interaction with user interface elements, a signal from the motion or position sensors, a signal from the touch-sensitive pads 450, a signal from the pressure sensors, and a signal from the other device or system 440

Although power source 425, processor 435, and communications interface 445 are illustrated in FIG. 4A as being positioned in haptic device 410, the present disclosure is not so limited. For example, one or more of power source 425, processor 435, or communications interface 445 may be positioned within haptic device 405 or within another wearable textile.

Figure 4B:
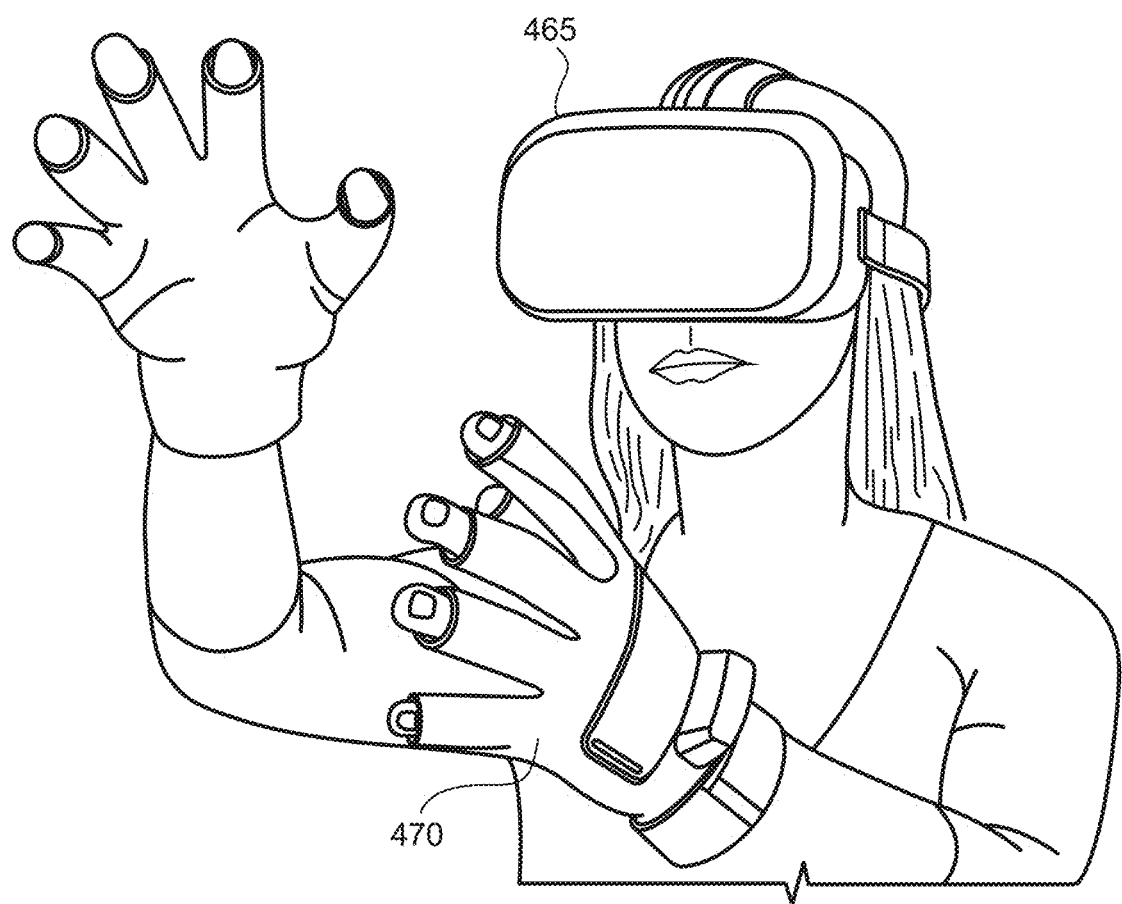
FIG. 4B is an illustration of an exemplary virtual reality environment in accordance with various embodiments.

Haptic wearables, such as those shown in and described in connection with FIG. 4A, may be implemented in a variety of types of extended reality systems and environments. FIG. 4B shows an example extended reality environment 460 including one head-mounted virtual reality display and two haptic devices (e.g., gloves), and in other embodiments any number and/or combination of these components and other components may be included in an extended reality system. For example, in some embodiments, there may be multiple head-mounted displays each having an associated haptic device, with each head-mounted display, and each haptic device communicating with the same console, portable computing device, or other computing system.

Figure 3B:
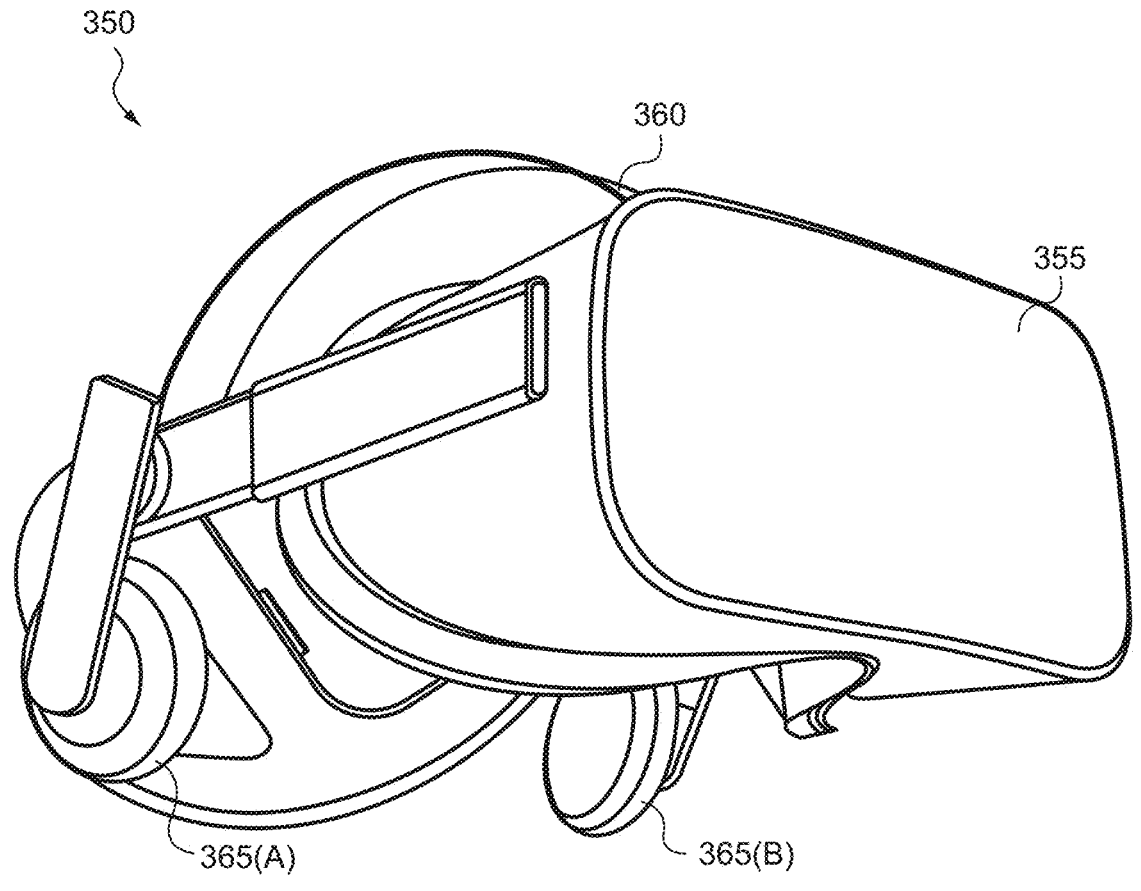
FIG. 3B is an illustration of a virtual reality system in accordance with various embodiments.

HMD 465 generally represents any type or form of virtual reality system, such as virtual reality system 350 in FIG. 3B. Haptic device 470 generally represents any type or form of wearable device, worn by a user of an extended reality system, that provides haptic feedback to the user to give the user the perception that he or she is physically engaging with a virtual object. In some embodiments, haptic device 470 may provide haptic feedback by applying vibration, motion, and/or force to the user. For example, haptic device 470 may limit or augment a user's movement. To give a specific example, haptic device 470 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 470 to send action requests to a console. Examples of action requests include, without limitation, requests to start an application and/or end the application and/or requests to perform a particular action within the application.

Figure 4C:
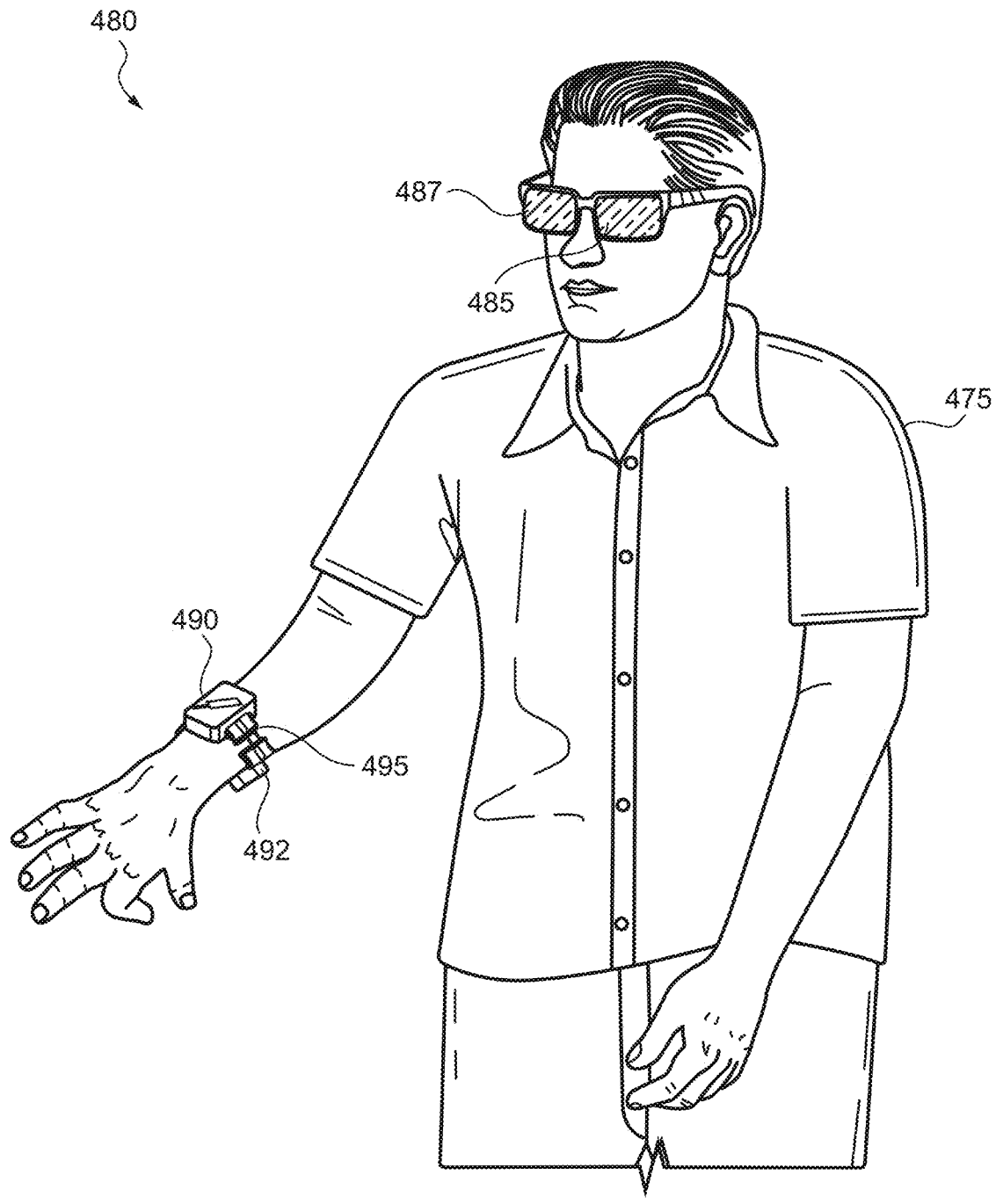
FIG. 4C is an illustration of an exemplary augmented reality environment in accordance with various embodiments.

While haptic interfaces may be used with virtual reality systems, as shown in FIG. 4B, haptic interfaces may also be used with augmented reality systems, as shown in FIG. 4C. FIG. 4C is a perspective view of a user 475 interacting with an augmented reality system 480. In this example, user 475 may wear a pair of augmented reality glasses 485 that may have one or more displays 487 and that are paired with a haptic device 490. In this example, haptic device 490 may be a wristband that includes a plurality of band elements 492 and a tensioning mechanism 495 that connects band elements 492 to one another.

One or more of band elements 492 may include any type or form of actuator suitable for providing haptic feedback. For example, one or more of band elements 492 may be configured to provide one or more of various types of cutaneous feedback, including vibration, force, traction, texture, and/or temperature. To provide such feedback, band elements 492 may include one or more of various types of actuators. In one example, each of band elements 492 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 405, 410, 470, and 490 may include any suitable number and/or type of haptic transducer, sensor, and/or feedback mechanism. For example, haptic devices 405, 410, 470, and 490 may include one or more mechanical transducers, piezoelectric transducers, and/or fluidic transducers. Haptic devices 405, 410, 470, and 490 may also include various combinations of different types and forms of transducers that work together or independently to enhance a user's extended reality experience. In one example, each of band elements 492 of haptic device 490 may include a vibrotactor (e.g., a vibrotactile actuator) configured to vibrate in unison or independently to provide one or more various types of haptic sensations to a user.

CAPs and Authoring of CAPs in General

Extended reality systems can assist users with performance of tasks in simulated and physical environments by providing these users with content such as information about the environments and instructions for performing the tasks. Extended reality systems can also assist users by providing content and/or performing tasks or services for users based on policies and contextual features within the environments. The rules and policies are generally created prior to the content being provided and the tasks being performed. Simulated and physical environments are often dynamic. Additionally, user preferences frequently change, and unforeseen circumstances often arise. While some extended reality systems provide users with interfaces for guiding and/or informing policies, these extended reality systems do not provide users with a means to refine polices after they have been created. As a result, the content provided and tasks performed may not always align with users' current environments or their current activities, which reduces performance and limits broader applicability of extended reality systems. The techniques disclosed herein overcome these challenges and others by providing users of extended reality systems with a means to intuitively author, i.e., create and modify, policies such as CAPs.

Figure 5A:
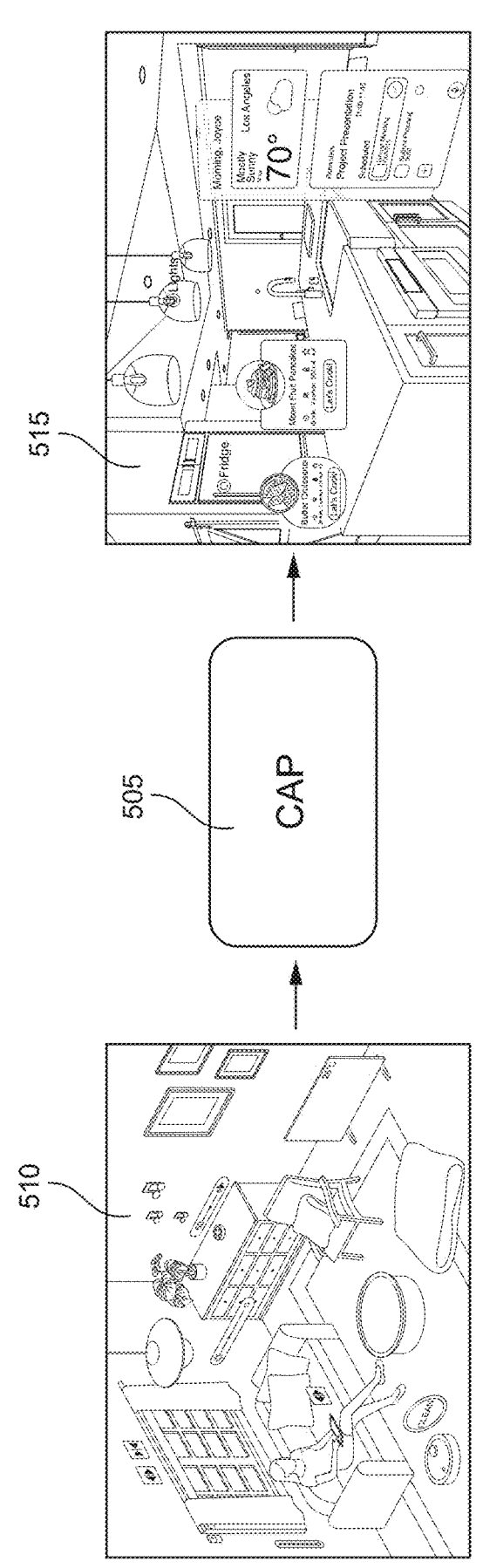

A policy such as a CAP is a core part of a contextually predictive extended reality user interface. As shown in FIG. 5A, a CAP 505 maps the context information 510 (e.g., vision, sounds, location, sensor data, etc.) detected or obtained by the client system (e.g., sensors associated with HMD that is part of client system 105 described with respect to FIG. 1) to the affordances 515 of the client system (e.g., IoT or smart home devices, extended reality applications, or web-based services associated with the client system 105 described with respect to FIG. 1). The CAP 505 is highly personalized and thus each end user should have the ability to author their own policies.

Figure 5B:
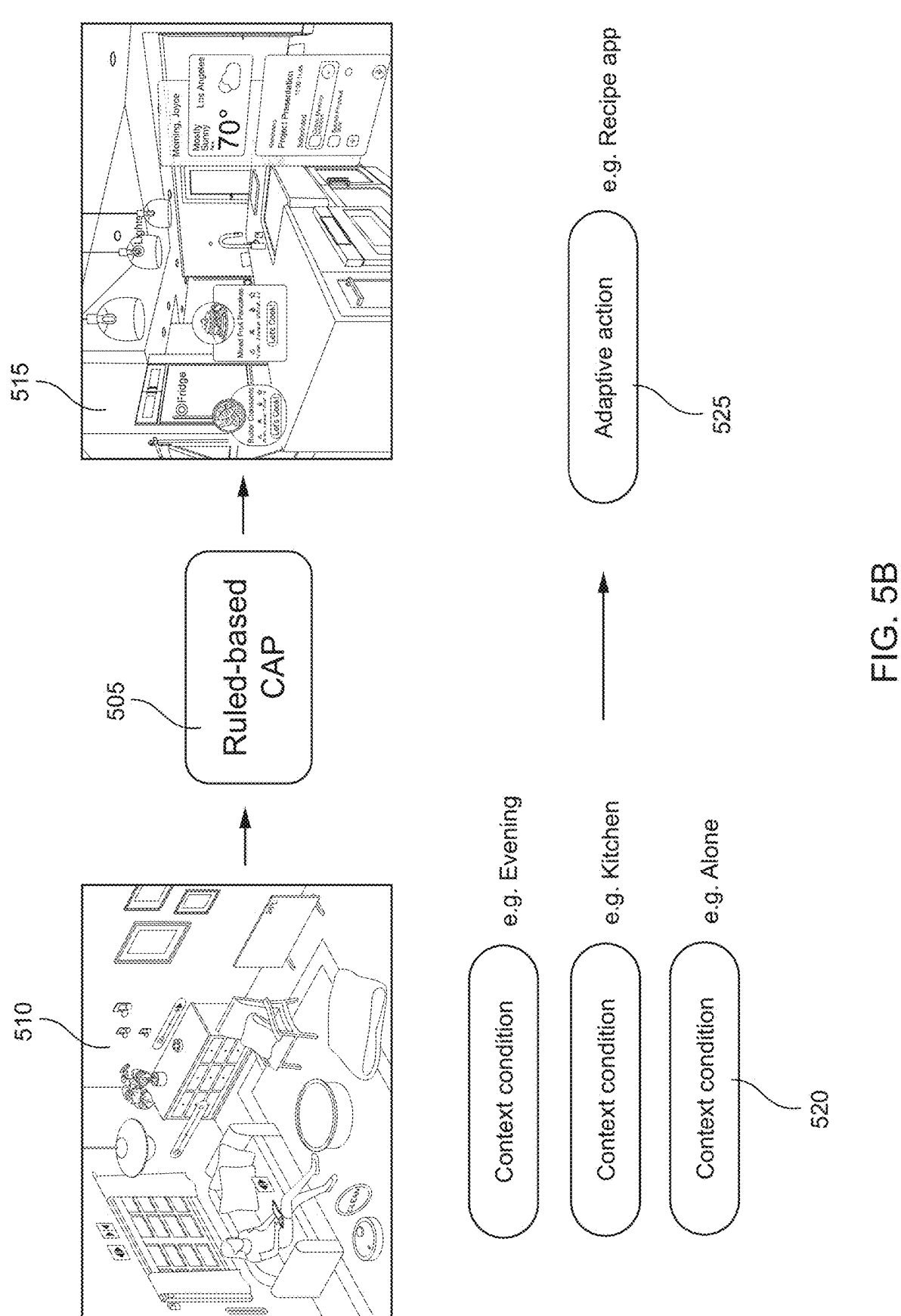
Figure 5C:
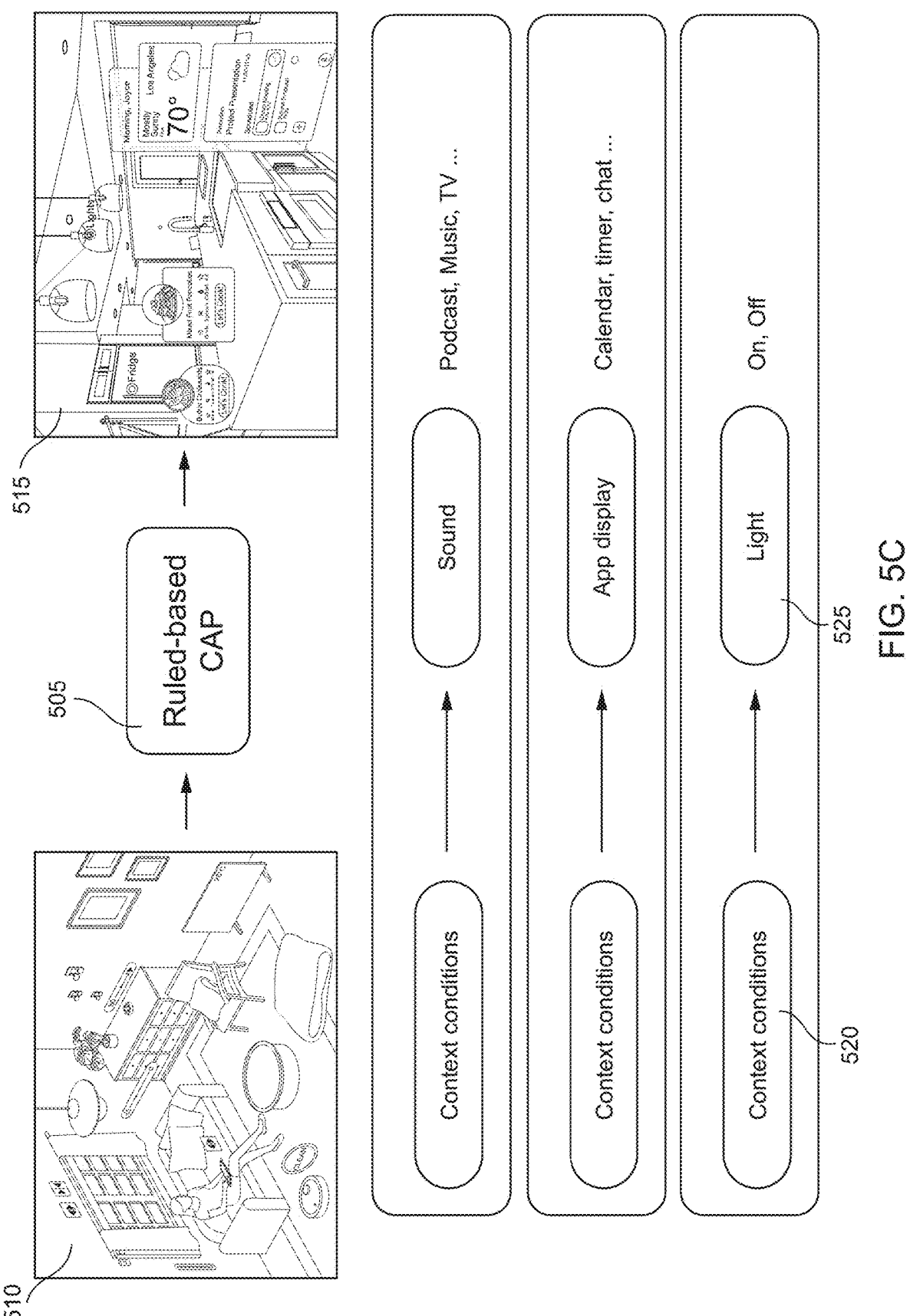

A rule-based CAP is a straightforward choice when considered in the context of end user authoring. As shown in FIG. 5B, a rule for a CAP 505 comprises one or more conditions 520 and one action 525. Once the once or more conditions 520 are met, the one action 525 is triggered. FIG. 5C shows an exemplary CAP scheme whereby each CAP 505 is configured to only control one broad action 525 at a time for affordances 515 (e.g., application display, generation of sound, control of IoT device, etc.). Each CAP 505 controls a set of actions that fall under the broader action 525 and are incompatible with each other. To control multiple things or execute multiple actions together, multiple CAPs 505 can be used. For example, a user can listen to music while checking the email and turning on a light. But the user cannot listen to music and a podcast at the same time. So, for podcast and music, one CAP 505 is configured for the broader action 525 (sound) to control them.

Figure 5D:
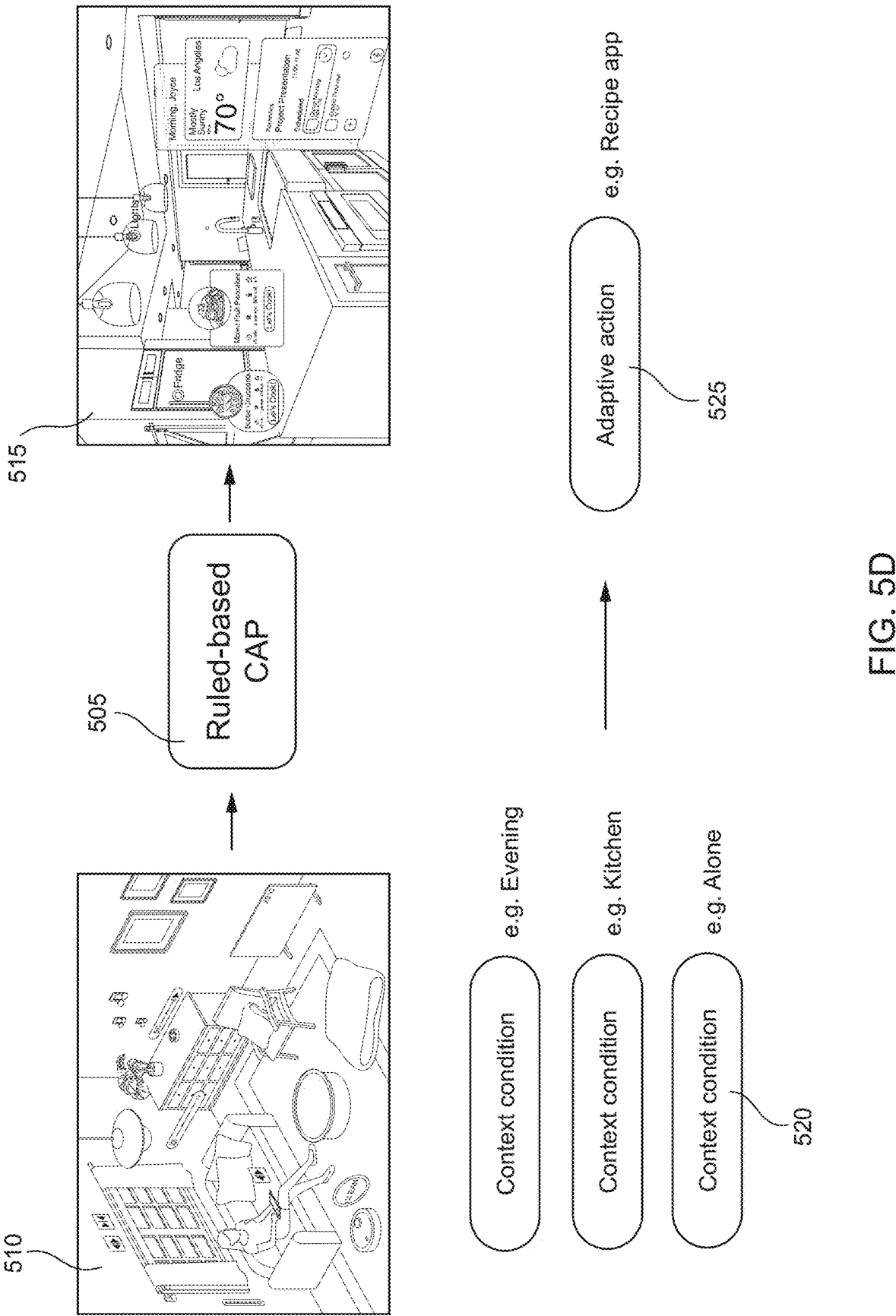
Figure 5E:
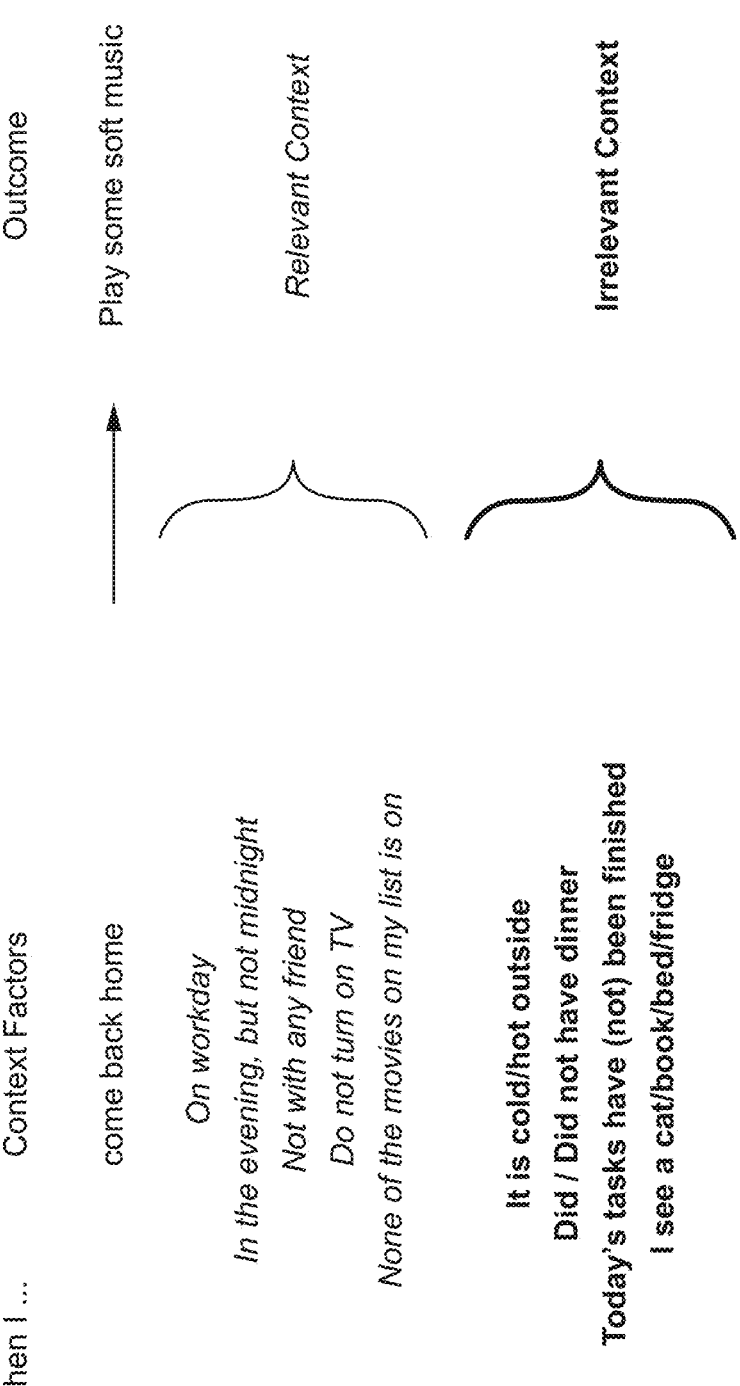

The rule-based CAP is a fairly simple construct readily understood by the users, and the users can create them by selecting some conditions and actions (e.g., via an extended reality or web-based interface). However, as shown in FIGS. 5D, 5E, and 5F, it can be a challenge for users to create good rules that can cover all the relevant context accurately because there may be a lot of conditions that are involved, and the user's preference may change overtime. FIG. 5E shows some examples that demonstrate the complexity of the CAP. For example, when a user wants to create a rule of playing music when arriving back home, but the user did not realize that there are many other relevant contexts like workday, evening, not occupied with others, etc. that needed to be considered when authoring the CAP. Meanwhile there are also many irrelevant contexts like the weather that should not be considered in authoring the CAP.

FIG. 5F shows another example that demonstrates an instance where many rules may be needed for controlling one action such as a social media notification based on various relevant contexts. Some rules override others. The user usually wants to turn off the notifications during the workdays, but the user probably wants to get some social media push when they are having a meal and not meeting with others. Consequently, in some instances a CAP mis authored to comprise multiple rules, and the rules may conflict with each other. As shown in FIG. 5G, in order to address these instances, the rules 530 for a CAP 505 can be placed in a priority queue or list 535. The CAP 505 can be configured such that the extended reality system first checks the rule 530 (1) in the priority queue or list 535 with the highest priority, if that rule fits the current context, the action can be triggered. If not, the extended reality system continues to refer to the rules 530 (2)-(3) in the priority queue or list 535 with lower priority. All the rules 530 together form a decision tree that can handle the complex situations. Meanwhile, any single rule can be added, deleted or changed without influencing others significantly. To author such a CAP 505, the user needs to figure out what rules should be include in the CAP 505, then, the user should maintain the accuracy of the CAP 505 by adjusting the conditions in some rules and adjust the priority of the rules.

Figure 5H:
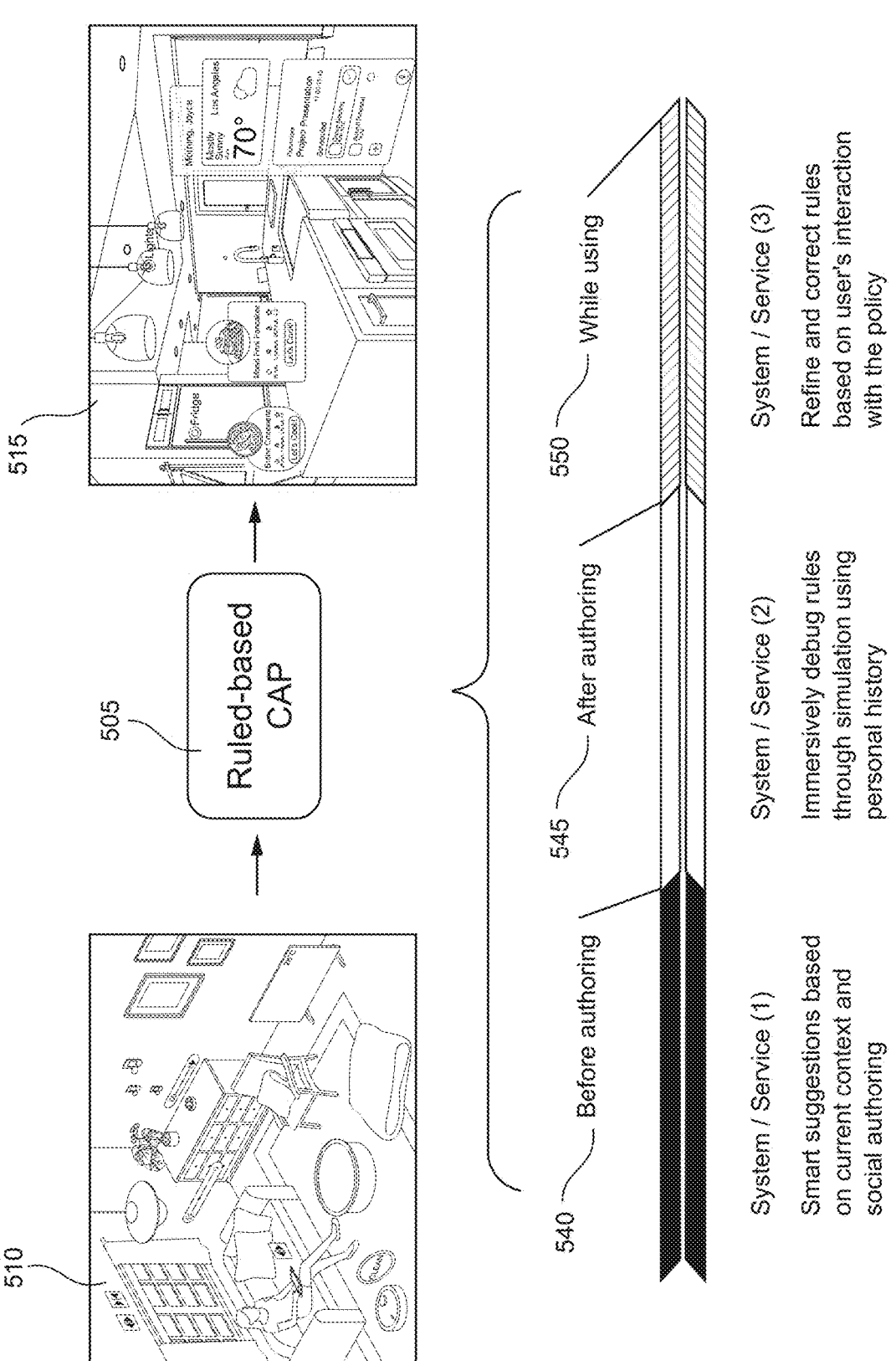

As shown in FIG. 5H, multiple efforts have been developed to assist users to create CAPs. Before the users start authoring, the virtual assistant uses an artificial intelligence-based subsystem/service 540 that provides users suggestions about the rules they can author based on a current context. Thereafter, another artificial intelligence-based subsystem/service 545 simulates different context so that users can debug their CAPs immersively. Based on user's interaction, another artificial intelligence-based subsystem/service 550 gives users hints and suggestions to update and refine the CAP. Advantageously, this allows the users create and maintain the CAP model without creating new rules from scratch or paying attention to the complex multi-context/multi-rule CAP.

System for Executing and Authoring CAPs

Figure 6:
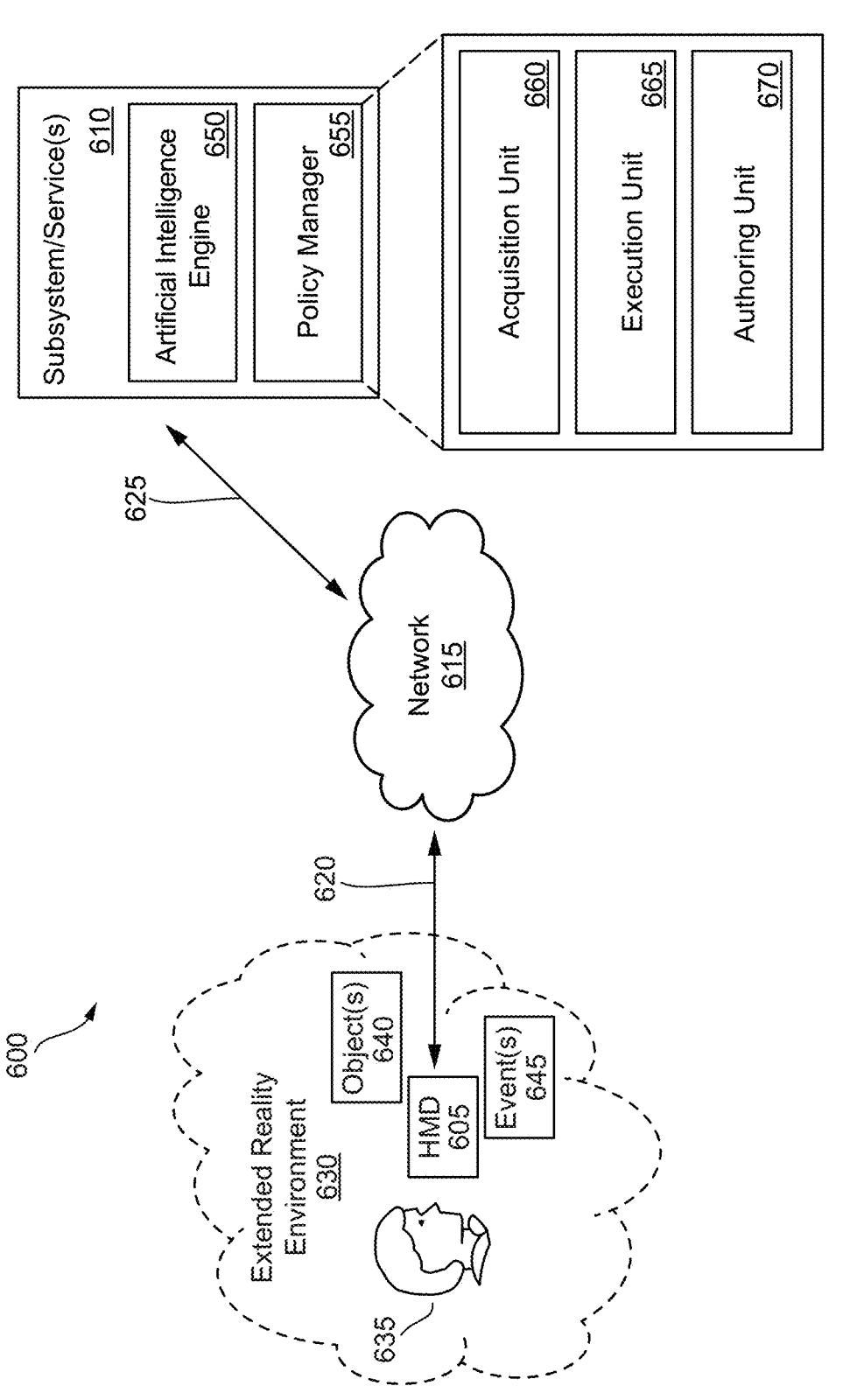
FIG. 6 is a simplified block diagram of a system for executing and authoring policies in accordance with various embodiments.

FIG. 6 is a simplified block diagram of a policy authoring and execution system 600 for authoring policies in accordance with various embodiments. The policy authoring and execution system 600 includes an HMD 605 (e.g., an HMD that is part of client system 105 described with respect to FIG. 1) and one or more extended reality subsystems/services 610 (e.g., a subsystem or service that is part of client system 105, virtual assistant engine 110, and/or remote systems 115 described with respect to FIG. 1). The HMD 605 and subsystems/services 610 are in communication with each via a network 615. The network 615 can be any kind of wired or wireless network that can facilitate communication among components of the policy authoring and execution system 600, as described in detail herein with respect to FIG. 1. For example, the network 615 can facilitate communication between and among the HMD 605 and the subsystems/services 610 using communication links such as communication channels 620, 625. The network 615 can include one or more public networks, one or more private networks, or any combination thereof. For example, the network 615 can be a local area network, a wide area network, the Internet, a Wi-Fi network, a Bluetooth® network, and the like.

The HMD 605 is configured to be operable in an extended reality environment 630 ("environment 630"). The environment 630 can include a user 635 wearing HMD 605, one or more objects 640, and one or more events 645 that can exist and/or occur in the environment 630. The user 635 wearing the HMD 605 can perform one or more activities in the environment 630 such as performing a sequence of actions, interacting with the one or more objects 640, interacting with, initiating, or reacting to the one or more events 645 in the environment 630, interacting with one or more other users, and the like.

The HMD 605 is configured to acquire information about the user 635, one or more objects 640, one or more events 645, and environment 630 and send the information through the communication channel 620, 625 to the subsystems/services 610. In response, the subsystems/services 610 can generate a virtual environment and send the virtual environment to the HMD 605 through the communication channel 620, 625. The HMD 605 is configured to present the virtual environment to the user 635 using one or more displays and/or interfaces of the HMD 605. Content and information associated with the virtual environment can be presented to the user 635 as part of the environment 630. Examples of content include audio, images, video, graphics, Internet-based content (e.g., webpages and application data), user interfaces, and the like.

The HMD 605 is configured with hardware and software to provide an interface that enables the user 635 to view and interact with the content within the environment 630 and author CAPs using a part of or all the techniques disclosed herein. In some embodiments, the HMD 605 can be implemented as the HMD described above with respect to FIG. 2A. Additionally, or alternatively, the HMD 605 can be implemented as an electronic device such as the electronic device 1100 shown in FIG. 11. The foregoing is not intended to be limiting and the HMD 605 can be implemented as any kind of electronic or computing device that can be configured to provide access to one or more interfaces for enabling users to view and interact with the content within environment 630 and author policies using a part of or all the techniques disclosed herein.

The subsystems/services 610 includes an artificial intelligence engine 650 and a policy manager 655. The subsystems/services 610 can include one or more special-purpose or general-purpose processors. Such special-purpose processors can include processors that are specifically designed to perform the functions of the artificial intelligence engine 650 and the policy manager 655. Additionally, the artificial intelligence engine 650 and the policy manager 655 can include one or more special-purpose or general-purpose processors that are specifically designed to perform the functions of those units. Such special-purpose processors may be application-specific integrated circuits (ASICs), field-programmable gate arrays (FPGAs), programmable logic devices (PLDs), and graphic processing units (GPUs), which are general-purpose components that are physically and electrically configured to perform the functions detailed herein. Such general-purpose processors can execute special-purpose software that is stored using one or more non-transitory processor-readable mediums, such as random-access memory (RAM), flash memory, a hard disk drive (HDD), or a solid-state drive (SSD). Further, the functions of the artificial intelligence engine 650 and the policy manager 655 can be implemented using a cloud-computing platform, which is operated by a separate cloud-service provider that executes code and provides storage for clients.

The artificial intelligence engine 650 is configured to receive information about the user 635, one or more objects 640, one or more events 645, environment 630, IoT or smart home devices, and remote systems from the HMD 605 and provide inferences (e.g., object detection or context prediction) concerning the user 635, one or more objects 640, one or more events 645, environment 630, IoT or smart home devices, and remote systems to the HMD 605, the policy manager 655, or another application for the generation and presentation of content to the user 635. In some embodiments, the content can be the extended reality content 225 described above with respect to FIG. 2A. Other examples of content include audio, images, video, graphics, Internet-based content (e.g., webpages and application data), and the like. The subsystems/services 610 is configured to provide an interface (e.g., a graphical user interface) that enables the user 635 to use the HMD 605 to view and interact with the content and within the environment 630 and in some instances author policies using a part of or all the techniques disclosed herein based on the content.

Figure 7:
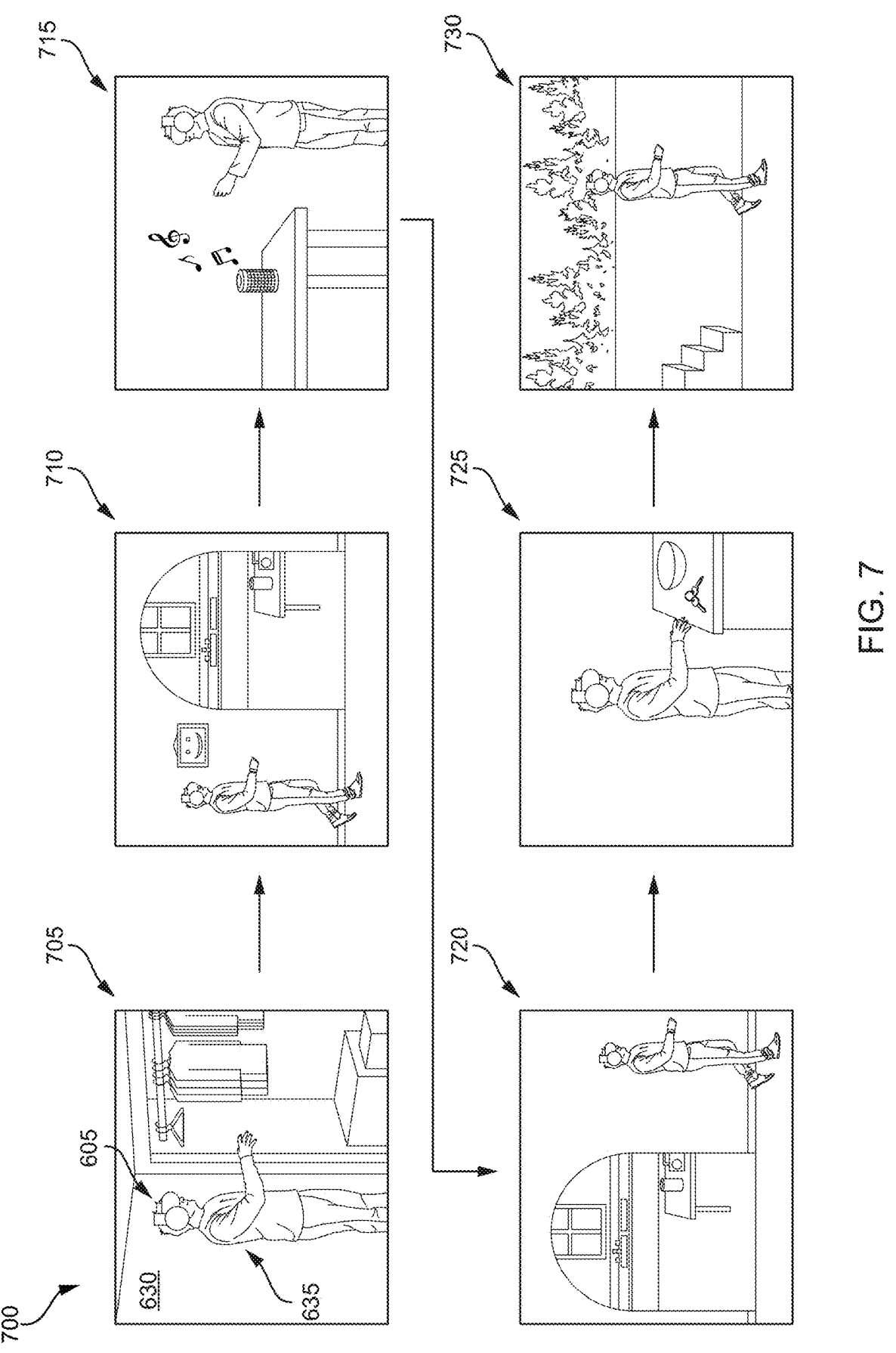
FIG. 7 is an illustration of an exemplary scenario of a user performing an activity in an extended reality environment in accordance with various embodiments.

Policy manager 655 includes an acquisition unit 660, an execution unit 665, and an authoring unit 670. The acquisition unit 660 is configured to acquire context concerning an event 645 or activity within the environment 630. The context is the circumstances that form the setting for an event or activity (e.g., what is the time of day, who is present, what is the location of the event/activity, etc.). An event 645 generally includes anything that takes place or happens within the environment 630. An activity generally includes the user 635 performing an action or sequence of actions in the environment 630 while wearing HMD 605. For example, the user 635 walking along a path while wearing HMD 605. An activity can also generally include the user 635 performing an action or sequence of actions with respect to the one or more objects 640, the one or more events 645, and other users in the environments 530 while wearing HMD 605. For example, the user 635 standing from being seated in a chair and walking into another room while wearing HMD 605. An activity can also include the user 635 interacting with the one or more objects 640, the one or more events 645, other users in the environment 630 while wearing HMD 605. For example, the user 635 organizing books on shelf and talking to a nearby friend while wearing HMD 605. FIG. 7 illustrates an exemplary scenario of a user performing an activity in an environment. As shown in FIG. 7, a user 635 in environment 630 can start a sequence of actions in their bedroom by waking up, putting on HMD 605, and turning on the lights. The user 635 can then, at scene 705, pick out clothes from their closet and get dressed. The user 635 can then, at scenes 710 and 715, walk from their bedroom to the kitchen and turn on the lights and a media playback device (e.g., a stereo receiver, a smart speaker, a television) in the kitchen. The user 635 can then, at scenes 720, 725, and 730, walk from the kitchen to the entrance of their house, pick up their car keys, and leave their house. The context of these events 645 and activities acquired by the acquisition unit 660 may include bedroom, morning, lights, clothes, closet in bedroom, waking up, kitchen, lights, media player, car keys, leaving house, etc.

To recognize and acquire context for an event or activity, the acquisition unit 660 is configured to collect data from HMD 605 while the user is wearing HMD 605. The data can represent characteristics of the environment 630, user 635, one or more objects 640, one or more events 645, and other users. In some embodiments, the data can be collected using one or more sensors of HMD 605 such as the one or more sensors 215 as described with respect to FIG. 2A. For example, the one or more sensors 215 can capture images, video, and/or audio of the user 635, one or more objects 640, and one or more events 645 in the environment 630 and send image, video, and/or audio information corresponding to the images, video, and audio through the communication channel 620, 625 to the subsystems/services 610. The acquisition unit 660 can be configured to receive the image, video, and audio information and can format the information into one or more formats suitable for suitable for image recognition processing, video recognition processing, audio recognition processing, and the like.

The acquisition unit 660 can be configured to start collecting the data from HMD 605 when HMD 605 is powered on and when the user 635 puts HMD 605 on and stop collecting the data from HMD 605 when either HMD 605 is powered off or the user 635 takes HMD 605 off. For example, at the start of an activity, the user 635 can power on or put on HMD 605 and, at the end of an activity, the user 635 can power down or take off HMD 605. The acquisition unit 660 can also be configured to start collecting the data from HMD 605 and stop collecting the data from HMD 605 in response to one or more natural language statements, gazes, and/or gestures made by the user 635 while wearing HMD 605. In some embodiments, the acquisition unit 660 can monitor HMD 605 for one or more natural language statements, gazes, and/or gestures made by the user 635 while the user 635 is interacting within environment 630 that reflect a user's desire for data to be collected (e.g., when a new activity is being learned or recognized) and/or for data to stop being collected (e.g., after an activity has been or recognized). For example, while the user 635 is interacting within environment 630, the user 635 can utter the phrase "I'm going to start my morning weekday routine" and "My morning weekday policy has been demonstrated" and HMD 605 can respectively start and/or stop the collecting the data in response thereto.

In some embodiments, the acquisition unit 660 is configured to determine whether the user 635 has permitted the acquisition unit 660 to collect data. For example, the acquisition unit 660 can be configured to present a data collection authorization message to the user 635 on HMD 605 and request the user's 635 permission for the acquisition unit 660 to collect the data. The data collection authorization message can serve to inform the user 635 of what types or kinds of data that can be collected, how and when that data will be collected, and how that data will be used by the policy authoring and execution system and/or third parties. In some embodiments, the user 635 can authorize data collection and/or deny data collection authorization using one or more natural language statements, gazes, and/or gestures made by the user 635. In some embodiments, the acquisition unit 660 can request the user's 635 authorization on a periodic basis (e.g., once a month, whenever software is updated, and the like).

The acquisition unit 660 is further configured to use the collected data to recognize an event 645 or activity performed by the user 635. To recognize an event or activity, the acquisition unit 660 is configured to recognize characteristics of the activity. The characteristics of the activity include but are not limited to: i. the actions or sequences of actions performed by the user 635 in the environment 630 while performing the activity; ii. the actions or sequences of actions performed by the user 635 with respect to the one or more objects 640, the one or more events 645, and other users in the environment 630 while performing the activity; and iii. the interactions between the user 635 and the one or more objects 640, the one or more events 645, and other users in the environment 630 while performing the activity. The characteristics of the activity can also include context of the activity such as times and/or time frames and a location and/or locations in which the activity was performed by the user 635.

In some embodiments, the acquisition unit 660 can be configured to recognize and acquire the characteristics or context of the activity using one or more recognition algorithms such as image recognition algorithms, video recognition algorithms, semantic segmentation algorithms, instance segmentation algorithms, human activity recognition algorithms, audio recognition algorithms, speech recognition algorithms, event recognition algorithms, and the like. Additionally, or alternatively, the acquisition unit 660 can be configured to recognize and acquire the characteristics or context of the activity using one or more machine learning models (e.g., neural networks, generative networks, discriminative networks, transformer networks, and the like) via the artificial intelligence engine 650. The one or more machine learning models may be trained to detect and recognize characteristics or context. In some embodiments, the one or more machine learning models include one or more pre-trained models such as models in the GluonCV and GluonNLP toolkits. In some embodiments, the one or more machine learning models can be trained based on unlabeled and/or labeled training data. For example, the training data can include data representing characteristics or context of previously recognized activities, the data used to recognize those activities, and labels identifying those characteristics or context. The one or more machine learning models can be trained and/or fine-tuned using one or more training and fine-tuning techniques such as unsupervised learning, semi-supervised learning, supervised learning, reinforcement learning, and the like. In some embodiments, training and fine-tuning the one or more machine learning models can include optimizing the one or more machine learning models using one or more optimization techniques such as back-propagation, Adam optimization, and the like. The foregoing implementations are not intended to be limiting and other arrangements are possible.

The acquisition unit 660 may be further configured to generate and store data structures for characteristics, context, events, and activities that have been acquired and/or recognized. The acquisition unit 660 can be configured to generate and store a data structure for the characteristics, context, events, and activities that have been acquired and/or recognized. A data structure for a characteristic, context, event, or activity can include an identifier that identifies the characteristic, context, event, or activity and information about the characteristic, context, event, or activity. In some embodiments, the data structure can be stored in a data store (not shown) of the subsystems/services 610. In some embodiments, the data structure can be organized in the data store by identifiers of the data structures stored in the data store. For example, the identifiers for the data structures stored in the data store can be included in a look-up table, which can point to the various locations where the data structures are stored in the data store. In this way, upon selection of an identifier in the look-up table, the data structure corresponding to the identifier can be retrieved, and the information stored in the activity data structure can be used for further processing such as for policy authoring and execution as described below.

The execution unit 665 is configured to execute policies based on the data acquired by the acquisition unit 660. The execution unit 665 may be configured to start executing policies when HMD 605 is powered on and when the user

635 puts HMD 605 on and stop executing policies when either HMD 605 is powered off or the user 635 takes HMD 605 off. For example, at the start of an activity or the day, the user 635 can power on or put on HMD 605 and, at the end of an activity or day, the user 635 can power down or take off HMD 605. The execution unit 665 can also be configured to start and stop executing policies in response to one or more natural language statements, gazes, and/or gestures made by the user 635 while wearing HMD 605. In some embodiments, the execution unit 665 can monitor HMD 605 for one or more natural language statements, gazes, and/or gestures made by the user 635 while the user 635 is interacting within environment 630 that reflect user's desire for the HMD 605 to start and stop executing policies (e.g., the user 635 performs a gesture that indicates the user's desire for HMD 605 to start executing policies and subsequent gesture at a later time that indicates the user's desire for HMD 605 to stop executing policies) and/or for a policy to stop being executed (e.g., the user 635 performs another gesture that indicates that the user 635 has just finished a routine).

The execution unit 665 is configured to execute policies by determining whether the current characteristics or context acquired by the acquisition unit 660 satisfies or match the one or more conditions of a policy or rule. For example, the execution unit 665 is configured to determine whether the current characteristics or context of activity performed by the user 635 in the environment 630 satisfy/match the one or more conditions of a CAP. In another example, the execution unit 665 is configured to determine whether the current characteristics or context of activity performed by the user 635 with respect to the one or more objects 640, the one or more events 645, and other users in the environment 630 satisfy/match the one or more conditions of a CAP. The satisfaction or match can be a complete satisfaction or match or a substantially complete satisfaction or match. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

Once it is determined that the characteristics or context acquired by the acquisition unit 660 satisfy or match the one or more conditions of a policy or rule, the execution unit 665 is further configured to cause the client system (e.g., virtual assistant) to execute one or more actions for the policy or rule in which one or more conditions have been satisfied or matched. For example, the execution unit 665 is configured to determine that one or more conditions of a policy have been satisfied or matched by characteristics acquired by the acquisition unit 660 and cause the client system to perform one or more actions of the policy. The execution unit 665 is configured to cause the client system to execute the one or more actions by communicating the one or more actions for execution to the client system. For example, the execution unit 665 can be configured to cause the client system to provide content to the user 635 using a display screen and/or one or more sensory devices of the HMD 605. In another example, and continuing with the exemplary scenario of FIG. 7, the execution unit 665 can determine that the user 635 has satisfied a condition of a CAP by entering and turning on the lights in the kitchen and causes the client system to provide an automation such as causing the HMD 605 to display a breakfast recipe to the user 635.

The authoring unit 670 is configured to allow for the authoring of policies or rules such as CAPs. The authoring unit 670 is configured to author policies by facilitating the creation of policies (e.g., via an extend reality or web-based interface), simulation of policy performance, evaluation of policy performance, and refinement of policies based on simulation and/or evaluation of policy performance. To evaluate policy performance, the authoring unit 670 is configured to collect feedback from the user 635 for policies executed by the execution unit 665 or simulated by the authoring unit 670. The feedback can be collected passively, actively, and/or a combination thereof. In some embodiments, the feedback can represent that the user 635 agrees with the automation and/or is otherwise satisfied with the policy (i.e., a true positive state). The feedback can also represent that the user 635 disagrees with the automation and/or is otherwise dissatisfied with the policy (i.e., a false positive state). The feedback can also represent that the automation is opposite of the user's 635 desire (i.e., a true negative state). The feedback can also represent that the user 635 agrees that an automation should not be performed (i.e., a false negative state).

The authoring unit 670 is configured to passively collect feedback by monitoring the user's 635 reaction or reactions to performance and/or non-performance of an automation of the policy by the client system during execution of the policy. For example, and continuing with the exemplary scenario of FIG. 7, the execution unit 665 can cause the HMD 605 to display a breakfast recipe to the user 635 in response to determining that the user 635 has entered and turned on the lights in the kitchen. In response, the user 635 can express dissatisfaction with the automation by canceling the display of the breakfast recipe, giving a negative facial expression when the breakfast recipe is displayed, and the like. In another example, the user 635 can express satisfaction with the automation by leaving the recipe displayed, uttering the phase "I like the recipe," and the like.

The authoring unit 670 is configured to actively collect feedback by requesting feedback from the user 635 while a policy is executing, or the execution is being simulated. The authoring unit 670 is configured to request feedback from the user 635 by generating a feedback user interface and presenting the feedback user interface on a display of HMD 605. In some embodiments, the feedback user interface can include a textual and/or visual description of the policy and one or more automations of the policy that have been performed by the client system and a set of selectable icons. In some embodiments, the set of selectable icons can include an icon which when selected by the user 635 represents that the user 635 agrees with the one or more automations of the policy (e.g., an icon depicting a face having a smiling facial expression), an icon which when selected by the user 635 represents that the user 635 neither agrees nor disagrees (i.e., neutral) with the one or more automations of the policy (e.g., an icon depicting a face having a neutral facial expression), and an icon which when selected by the user 635 represents that the user 635 disagrees with the one or more automations (e.g., an icon depicting a face having a negative facial expression). Upon presenting the feedback user interface on the display of the HMD 605, the authoring unit 670 can be configured to determine whether the user 635 has selected an icon by determining whether the user 635 has made one or more natural language utterances, gazes, and/or gestures that indicate the user's 635 sentiment towards one particular icon. For example, upon viewing the feedback user interface, the user 635 can perform a thumbs up gesture and the authoring unit 670 can determine that the user 635 has selected the icon which represents the user's 635 agreement with the one or more automations of the policy. In another example, upon viewing the feedback user interface, the user 635 may utter a phrase "ugh" and the authoring unit 670 can determine that the user 635 has selected the icon which represents that the user 635 neither agrees nor disagrees with the one or more automations.

The authoring unit 670 is configured to determine context (also referred to herein as context factors) associated with the feedback while the authoring unit 670 is collecting feedback from the user 635. A context factor, as used herein, generally refers to conditions and characteristics of the environment 630 and/or one or more objects 640, the one or more events 645, and other users that exist and/or occur in the environment 630 while a policy is executing. A context factor can also refer to a time and/or times frames and a location or locations in which the feedback is being collected from the user 635. For example, the context factors can include a time frame during which feedback was collected for a policy, a location where the user 635 was located when the feedback was collected, an indication of the automation performed, an indication of the user's 635 feedback, and an indication of whether the user's 635 feedback reflects an agreement and/or disagreement with the automation.

The authoring unit 670 is configured to generate a feedback table in a data store (not shown) of the subsystems/services 610 for policies executed or simulated by the execution unit 665 or authoring unit 670. The feedback table stored the context evaluated for execution or simulation of the policy, the action triggered by the execution or simulation of the policy, and the feedback provided by the user in reaction to the action triggered by the execution or simulation of the policy. More specifically, the feedback table can be generated to include rows representing instances when the policy was executed and columns representing the context, actions, and the feedback for each execution instance. For example, and continuing with the exemplary scenario of FIG. 7, for a policy that causes the HMD 605 to display information regarding the weather for the day to the user 635, the authoring unit 670 can store, for an execution instance of the policy, context that include a time frame between 8-10 AM or morning and a location that is the user's home or bedroom, an indication that the policy caused the HMD 605 to perform the action—display weather information, and feedback comprising an indication that the user 635 selected an icon representative of the user's agreement with the automation (e.g., an icon depicting a face having a smiling facial expression).

The authoring unit 670 is configured to evaluate performance of a policy based on the information (i.e., context, action, and feedback) in the feedback table. In some instances, the authoring unit 670 is configured to evaluate performance of a policy using an association rule learning algorithm. To evaluate performance of a policy, the authoring unit 670 is configured to calculate and compare the performance of a policy using the metrics of support and confidence. Support is the subset of the dataset within the feedback table where that the policy has been correct ((conditions→Action)=N(Factors, Action). The frequency that the rule has been correct. The confidence is the certainty that the context will lead to the correct action ((conditions→Action)=N(Factors, Action)/N(Factors)). To calculate the confidence, the authoring unit 670 is configured to: i. determine a number of execution instances of the policy; ii. determine a number of execution instances for the policy in which the context factors of the respective execution instances match the context factors of the execution instances of the policy included in the support set; iii. divide the first number i by the second number ii; and iv. express the results of the division as a percentage.

The authoring unit 670 is configured to determine that a policy is eligible for refinement when the confidence for the existing policy is below a predetermined confidence threshold. In some embodiments, the predetermined confidence threshold is any value between 50% and 100%. The authoring unit 670 is configured to refine the policy when the authoring unit 670 determines that the policy is eligible for refinement. A policy refinement, as used herein, refers to a modification of at least one condition or action of the policy.

To refine a policy, the authoring unit 670 is configured to generate a set of replacement policies for the policy and determine which replacement policy included in the set of replacement policies can serve as a candidate replacement policy for replacing the policy that is eligible for replacement. The authoring unit 670 is configured to generate a set of replacement policies for the policy by applying a set of policy refinements to the existing policy. The authoring unit 670 is configured to apply a set of policy refinements to the existing policy by selecting a refinement from a set of refinements and modifying the existing policy according to the selected refinement. The set of refinements can include but is not limited to changing an automation, changing a condition, changing an arrangement of conditions (e.g., first condition and second condition to first condition or second condition), adding a condition, and removing a condition. For example, for a policy that causes the client system to turn on the lights when the user 635 is at home at 12 PM (i.e., noon), the authoring unit 670 can generate a replacement policy that modifies the existing policy to cause the client system to turn off the lights rather than turn them on. In another example, for the same policy, the authoring unit 670 can generate a replacement policy that modifies the existing policy to cause the client system to turn on the lights when the user 635 is at home at night rather than at noon, turn on the lights when the user 635 is home at night or at noon, or turn on the lights when the user 635 is at home, in the kitchen, at noon, turn on the lights when the user 635 is simply at home, and the like. In a further example, for the same policy, the authoring unit 670 can generate a replacement policy that causes the client system to turn off the lights and a media playback device when the user 635 is not at home in the morning. In some embodiments, rather than applying a policy refinement to the existing policy, the authoring unit 670 can be configured to generate a new replacement policy and add the generated new replacement policy to the set of replacement policies. In some embodiments, at least one characteristic of the generated new replacement policy (e.g., a condition or automation) is the same as at least one characteristic of the existing policy. In some embodiments, rather than generating a set of replacement policies for the existing policy and determining which replacement policy of the set of replacement policies should replace the existing policy, the authoring unit 670 can be configured to remove and/or otherwise disable the policy (e.g., by deleting, erasing, overwriting, etc., the policy data structure for the policy stored in the data store).

The authoring unit 670 is configured to determine which replacement policy included in the set of replacement policies for an existing policy can serve as a candidate replacement policy for replacing the existing policy. The authoring unit 670 is configured to determine the candidate replacement policy by extracting a replacement support for each replacement policy included in the set of replacement policies from the feedback table for the existing policy and calculating a replacement confidence for each replacement support. The authoring unit 670 is configured to extract a replacement support for a replacement policy by identifying rows of the feedback table for the existing policy in which the user's 635 feedback indicates an agreement with an automation included in the replacement policy and extracting the context factors for each row that is identified. In some embodiments, the authoring unit 670 is configured to prune the replacement support for the replacement policy by comparing the replacement support to the extracted support for the existing policy (see discussion above) and removing any execution instances included in the replacement support that are not included in the support for the existing policy. To calculate a replacement confidence for a replacement support, the authoring unit 670 is configured to: i. determine a number of execution instances of the existing policy included in the respective replacement support (i.e., a first number); ii. determine a number of execution instances of the existing policy in which the context of the respective execution instances match the context of the execution instances of the policy included in the replacement support (i.e., a second number); iii. divide the first number by the second number; and iv. express the results of the division as a percentage. The authoring unit 670 is configured to determine that a replacement policy included in the set of replacement policies can serve as a candidate replacement policy if the replacement confidence for the respective replacement policy is greater than the confidence for the existing policy (see discussion above).

The authoring unit 670 is configured to determine a candidate replacement policy for each policy executed by the execution unit 528 and present the candidate replacement policies to the user 635. The authoring unit 670 is configured to present candidate replacement policies to the user 635 by generating a refinement user interface and presenting the refinement user interface on a display of HMD 605. In some embodiments, the refinement user interface can include a textual and/or visual description of the candidate replacement policies and an option to manually refine the policies. For example, for a policy that causes the extended reality system 500 to turn on the lights when the user 635 is at home at 12 PM (i.e., noon), the authoring unit 670 can determine a replacement policy that causes the client system to turn off the lights under the same conditions to be a suitable candidate replacement policy and can present the candidate replacement policy to the user 635 in a refinement user interface 700 using a textual and visual description 702 of the candidate replacement policy and an option 704 to manually refine the candidate replacement policy. Upon presenting the refinement user interface on the display of the HMD 605, the authoring unit 670 can be configured to determine whether the user 635 has accepted or approved the candidate replacement policy or indicated a desire manually refine the policy. For example, the authoring unit 670 can be configured to determine whether the user 635 has made one or more natural language utterances, gazes, and/or gestures that are indicative of the user sentiment towards candidate replacement policy and/or the option to manually refine the policy. In some embodiments, upon selecting the manual refinement option, the authoring unit 670 can be configured to generate a manual refinement user interface for manually refining the policy. The manual refinement user interface can include one or more selectable buttons representing options for manually refining the policy. In some embodiments, the authoring unit 670 can be configured to provide suggestions for refining the policy. In this case, the authoring unit 670 can derive the suggestions from characteristics of the replacement policies in the set of replacement policies for the existing policy. For example, a manual refinement user interface 706 can include a set of selectable buttons that represent options for modifying the policy and one or more suggestions for refining the candidate replacement policy. In some embodiments, the authoring unit 670 can be configured to present the refinement user interface on the display of the HMD 605 for a policy when the policy fails (e.g., by failing to detect the satisfaction of a condition and/or by failing to perform an automation). In other embodiments, the authoring unit 670 can be configured to present the refinement user interface on the display of the HMD 605 whenever a candidate replacement policy is determined for the existing policy. In some embodiments, rather than obtaining input from the user 635, the authoring unit 670 can be configured to automatically generate a replacement policy for an existing policy without input from the user 635.

The authoring unit 670 is configured to replace the existing policy with the candidate replacement policy approved, manually refined, and/or otherwise accepted by the user 635. The authoring unit 670 is configured to replace the existing policy by replacing the policy data structure for the existing policy stored in the data store with a replacement policy data structure for the replacement policy. In some embodiments, when a policy has been replaced, the authoring unit 670 is configured to discard the feedback table for the policy and store collected feedback for the replacement policy in a feedback table for the replacement policy. In this way, policies can continuously be refined based on collected feedback.

Using the techniques described herein, policies can be modified in real-time based on the users' experiences in dynamically changing environments. Rules and policies under which extended reality systems provide content and assist users with performing tasks are generally created prior to the content being provided and the tasks being performed. As such, the content provided and tasks performed do not always align with users' current environments and activities, which reduces performance and limits broader applicability of extended reality systems. Using the policy authoring techniques described herein, these challenges and others can be overcome.

CAP Authoring Architecture (Defining and Modifying)

Figure 8:
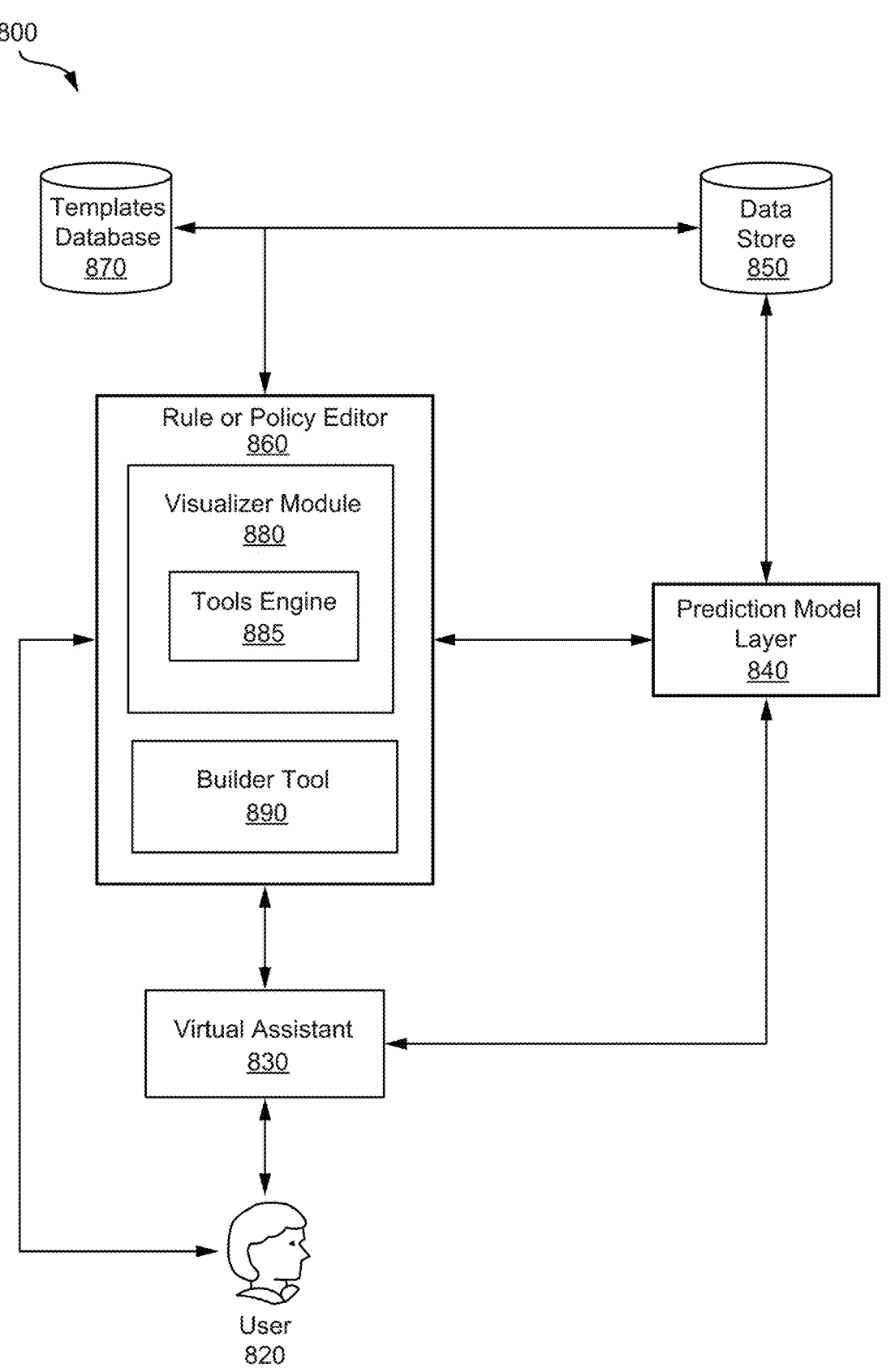
FIG. 8 is a simplified block diagram of an architecture for creating or modifying rules or policies in accordance with various embodiments.

FIG. 8 illustrates an example architecture 800 associated with an extended reality system in accordance with aspects of the present disclosure. In particular, the architecture 800 provides a combination of elements for viewing, creating, modifying, or deleting rules and policies (e.g., CAPs) that define the behavior of and make up the basis for different operations carried out by a virtual assistant. The architecture 800 provides the elements necessary to enable a user 820 to create, modify, or delete one or more rules or policies using an editing tool within an extended reality environment (the editing tool is part of the authoring unit 670 as described with respect to FIG. 6). The architecture 800 can be used to guide the user 820 through creating a rule or policy using a combination of templates, recommendations, and knowledge of the user 820. The architecture 800 can also be used to render graphical representations of predetermined rules and policies to the user 820 while allowing the renderings to be modified according to the preferences of the user 820. The graphical representations can be provided to the user 820 in a way in which the user 820 can combine, manipulate, update, etc. the rules or policies in an intuitive manner.

The extended reality environment of the present disclosure can be rendered, using the architecture 800 and can be rendered to a user 820 wearing and using any one of the extended reality systems 205, the augmented reality system 300, the virtual reality system 350, the HMD 465, and the augmented reality glasses 485. In some embodiments, the device(s) providing renderings, in environment 800, includes or otherwise is in communication with a virtual assistant 830, a prediction model layer 840, a data store 850, a rule or policy editor 860, and a template database 870. The combination of components can be provided using any combination of software and hardware within the client system 105, the virtual assistant engine 110, the remote system 115, or a combination thereof. For example, the virtual assistant 830 can be provided on the client system 105, the prediction model layer 840 and the data store 850 can be provided on the virtual assistant engine 110, and the rule or policy editor 860 and the template database 870 can be included on a remote system 115.

The virtual assistant 830 can include any combination of virtual assistant components, for example, the virtual assistant 830 can be the virtual assistant application 130, virtual assistant engine 110, or a combination thereof. The virtual assistant 830 can be configured to receive input from the user 820 and provide one or more functionalities based on the user input, as discussed in greater detail herein. Within the architecture 800, the virtual assistant 830 can be configured to identify requests from the user 820 to visualize, create, modify, or delete one or more rules or policies utilized by the extended reality system. For example, the virtual assistant 830 can listen (e.g., using natural language processing) for voice commands, track user inputs within the extended reality environment, or receive input from another component within the architecture 800 indicating a desire to visualize, create, modify, or delete one or more rules or policies.

In some embodiments, the virtual assistant 830 can be configured to listen to user vocal input, track user actions and record user input/actions (e.g., in data store 850) for future use. For example, the virtual assistant 830 can store data to be used for training artificial intelligence (AI) and/or machine learning (ML) for providing predictions (e.g., by prediction model layer 840), recommendations (e.g., by rule or policy editor 860), etc. by other components of the architecture 800.

In some embodiments, the virtual assistant 830 can communicate with the prediction model layer 840 to interpret what the user 820 is trying to convey. The prediction model layer 840 can provide logic and programming necessary to interpret actions and/or commands received from the user 820. The prediction model layer 840 can include a combination of logic and software to apply natural language processing, gesture analysis, AI and/or ML to user 820 verbal instructions, actions, behaviors, etc. to determine what a user is trying to convey or achieve. For example, the prediction model layer 840 can include or otherwise rely on the artificial intelligence systems 140 provided by the virtual assistant engine 110 and/or the artificial intelligence engine 650 discussed with respect to FIGS. 1 and/or 6. In some embodiments, the prediction model layer 840 can identify a command to activate, deactivate, visualize, create, modify, or delete one or more rules or policies. In some embodiments, the prediction model layer 840 can rely upon a combination of data for arriving at a prediction. The data can be provided by the data store 850. The data store 850 can include any combination of data storage for storing any combination of data necessary to implement the aspects of the present disclosure. For example, the data store 850 can include storage for user preferences, historical user data, AI/ML models, training data, pre-existing rules or policies, etc.

In some embodiments, the prediction model layer 840 can be configured to provide recommendations to the user. For example, if the user is trying to convey that they would like to access a rule or policy for modification, but it does not exactly match an existing command, the prediction model layer 840 can calculate a prediction for what the user desires. The prediction can use any combination of AI and ML while providing a confidence level for the prediction being provided to the user. The recommendations can be driven by a combination of data, including but not limited to historical data for the user, historical data for the environment, historical data for any referenced rule, policy, or object. The recommendations can also be refined and updated over time, for example, using training models.

The rule or policy editor 860 can include any combination of components for facilitating the viewing, creation, modification, or deletion of rules or policies utilized by the extended reality system. The rules or policies can include any combination of programming or logic for carrying out a combination of functionalities provided through the virtual assistant 830. The rules or policies can include rules or policies for interacting with other elements or objects within a home, place of business, etc. For example, interacting with audio/video devices, lighting devices, entertainment devices, utility devices, sensor devices, fixtures, furniture, other users, etc.

As described herein with respect to CAPs, the rules or policies can include a combination of conditions and actions such that when a rule or policy is enabled, a system will monitor for device statuses, context, or user activities (e.g., an event) that correspond to the conditions defined by the rules or policies. When all the conditions for that event are satisfied, then the action is triggered. For example, a rule can include a door opening event that requires the system to monitor a door open sensor in combination with a condition for a door opening between 12 AM and 6 AM that will cause an action for a notification to be sent to the homeowner. Continuing the example, if the door is opened after 6 AM then the condition would not be satisfied, and even through the contextual trigger of a door opening is satisfied, the action of a notification will not be triggered because the 12 AM-6 AM condition was not satisfied. A policy can be similarly formatted as the rule but may not be dependent on an action but rather will occur within predetermined periods of time. For example, a policy can be provided to turn on the living room light every day at 6 PM. Each of the conditions and an action can be elements of the rules or policies that can be viewed, modified, created, and/or deleted by a user.

In some embodiments, each of the base or generic rules and policies and specific rules and policies (e.g., rules and policies that have defined conditions and actions) can be stored in the data store 850. The rules or policies in the data store 850 can include rules and policies that are pre-programmed, for example, by a developer or they can be customized rules or policies programmed by a user. The user can create customized rules or policies using the pre-programmed rules or policies as a base or template or they can be completely created from scratch. Rules, policies, and/or elements can be associated with physical or virtual objects (e.g., a piece of furniture) or grouped or clustered together into moods, personality, or recipes for facilitating a defined style of living (including the control of multiple devices by the virtual assistant 830).

For viewing the rules or policies, the rule or policy editor 860 can be configured to provide a combination of displayable programing code and graphical representations (e.g., for display in a graphical user interface (GUI)) of the programing code for each of a plurality of previously created rules or policies. FIGS. 9A and 9B show an example of a GUI 900 comprising displayable programing code and graphical representations provided by the rule or policy editor 860 for authoring a rule or policy. The programing code can include code for any combination of computer programming language types, such as for example, procedural programming language, functional programming language, scripting programming language, logic programming language, and object-oriented programming language. The rule or policy editor 860 can access the code for stored templates, conditions, actions, rules, and policies (e.g., from data store 850) and provide the code to users in an editable format. Similarly, the rule or policy editor 860 can receive and store modified code edited by the user, as discussed in greater detail herein.

Continuing with FIG. 8, in some embodiments, the rule or policy editor 860 can include a visualizer module 880, a tools engine 885, and a builder tool 890. The visualizer module 880 can be configured to render code in a visual manner to the user. Visualizing the code can include rendering code text and/or graphical representations of the code to be displayed to the user in the appropriate extended reality environment device. The tools engine 885 can be configured to provide one or more tools to enable the user to create, delete, or modify the code or graphical representations of the code provided by the visualizer module 880. The tools provided by the tools engine 885 can also be rendered for viewing by a user, for example, in a tool user interface. The builder tool 890 can be configured to provide a platform for combining the code or graphical representations of the code provided by the visualizer module 880 and the tools provided by the tools engine 885 in a manner to enable a user to view, create or modify code.

In some embodiments, the visualizer module 880 of the rule or policy editor 860 can be configured to render the code or graphical representations of the code for a plurality of predetermined rules or policies. The rendering of code can be performed in any combination of manners. For example, the code can be written in such a way that sections of code include predetermined tags for the visual representations associated with the code. In another example, the visualized can read and parse the code and load graphical representations associated with the identified sections of code. Visualizing the code can include displaying text of raw code or text of pseudo code in a format that is readable by the user. Visualizing the graphical representations of the code can include rendering a combination of two-dimensional and three-dimension shapes for viewing by a user (e.g., via HMD). The two-dimensional and three-dimension shapes can include any combination of predetermined shapes, colors, text, etc. for particular actions and/or conditions of the code. In some embodiments, the shapes are designed to be linkable/couplable building blocks. The building blocks can represent subjects, objects, and relationships between the subjects and objects allowing for contextual triggers to be better understood and defined. Certain building blocks can be linked and/or designed to be specifically interconnected with other building blocks. For example, an 'if-then statement' can be graphically represented by a first shape whereas a 'while statement' can be graphically represented by a second shape, which is specifically designed to couple with the first shape. The interconnected building blocks can be preconfigured by a developer as a collection of various rules and policies.

In some embodiments, the graphical representations of the code can be simplified to predetermined conditions, actions, rules, policies, tasks, operations, criteria, etc. For example, there can be graphical representations for context trigger events, conditions, and actions. The graphical representations of the code can include predetermined shapes, colors, text, etc. for real world objects, virtual world objects, and/or particular actions and/or conditions associated with the objects. For example, a graphical representation for a lamp can include rules or actions for power status (e.g., on/off), illumination brightness, illumination color, timing, etc. The one or more graphical representations can include predetermined shapes, colors, text, etc. for objects that do not have actions and/or conditions associated therewith. For example, a graphical representation for a door, couch or room or floorplan within a domicile.

In some embodiments, the visualizer module 880 can obtain one or more rules or policies from storage (e.g., data store 850) and transform the basis for the rules or policies into a desired graphical representation of the code associated with the rules or policies. The transformation can include referencing predetermined shapes, colors, text, etc. associated with a type of rule or policy while modifying the predetermined shapes, colors, text, etc. and/or populating values for the particular rule or policy being rendered. For example, a rule involving a graphical representation of a lamp can include a generic image of a lamp, whereas the state of the lamp can include a modifying the lamp image to appear green (opposed to grey when off) when the policy indicates that the lamp should be turned on and a value of 0%-100% can be modified to reflect the percentage of illumination of the lamp according to the rule or policy. Therefore, the visualizer can modify the image of the lamp in a plurality of ways depending on the specifics of the rule or policy being viewed, edited, or created.

In some embodiments, the visualizer module 880 can render the code for the rules or policies according to predetermined visual characteristics to enable easy viewing and/or editing by a user. For example, the visualizer module 880 can transform the visualization of raw code for a rule or policy into pseudocode that is easier to understand by a user. The visualization of raw code to pseudo code can include associating predetermined rules or policies with predetermined pseudocode, for example, in a lookup table. In some embodiments, the visual characteristics can include modifying color, size, typographical emphasis, etc. of the text such that the user can quickly identify areas for modification. For example, the visualized pseudocode can be primarily black and white text with modifiable fields being represented by green bold text. These visualizations can be predetermined and/or can be adjusted according to user preference.

In some embodiments, the tools engine 885 of the rule or policy editor 860 can include a combination of tools for assisting the user in the visualization, creation, modification, or deletion of one or more rules or policies. The tools provided can be specific to the task that the user is trying to accomplish. For example, a code viewer may be a tool for adjusting the view, orientation, relationship, etc. between one or more rules or policies. In another example, a code modifier may be a tool enabling a user to edit the rules or policies themselves or elements of the rules or policies (e.g., parameter values). In some embodiments, the tools engine 885 can be configured to provide a user interface with selectable tools for visualizing, creating, modifying, or deleting one or more rules or policies, as provided by the visualizer module 880.

In some embodiments, the builder tool 890 of the rule or policy editor 860 can be configured to generate a graphical user interface (GUI), within an extended reality environment, for displaying code or graphical representations of the code for one or more rules or policies. The code or graphical representations of the code can be rendered, by the builder tool 890, within the extended reality environment for viewing and manipulation by the user operating within the extended reality environment. The builder tool 890 can provide the tools to be used by the user to manipulate the code or graphical representations within the GUI. Specifically, the builder tool 890 can generate a graphical user interface for displaying code or graphical representations of the code from the visualizer module 880 and tools for editing the code or graphical representations of the code by the tools engine 885. In some embodiments, the code or graphical representations of the code can be rendered as interconnected building block elements created and/or defined by an object-based programing language. For example, the builder tool 890 can generate an interactive canvas for loading one or more building blocks representing the rules or policies (or parts thereof such as conditions and actions).

In some embodiments, the builder tool 890 is configured to enable a user to visualize, create, modify, or delete one or more rules or policies while in the extended reality environment. For example, the builder tool 890 provides a canvas in which a user can view and select different building blocks, modify their values, combine building blocks together to create a rule or policy, etc. To interact with the rules or policies (or parts thereof), the builder tool 890 can enable interaction between the building blocks and the user by any combination of the user's hands, handheld controllers, voice interaction with the virtual assistant, a gaze or gesture of the user, etc. For example, when within the extended reality environment, the user can "grab" two or more graphical representations of code (e.g., building blocks) and connect them together to create a rule or policy. The user can use the builder tool 890 to modify rules or policies in any combination of ways. For example, the user can change input values in a building block, can swap out building blocks, remove building blocks, rearrange building blocks, change sizes, colors, rotations, etc. of the building blocks, etc. To compose a sequence of code to create a rule or policy, the user can connect different building block pieces together to fill out all of the essential elements. For example, a first building block piece can be a contextual trigger (condition) or action, a second building block piece can be an action, and a third building block piece can be a digital or physical object that is the target of the action. Depending on the rule or policy, the types and numbers of building blocks can vary.

In some embodiments, the builder tool 890 can be configured to assist the user during creating and/or modification of a rule or policy. The level of assistance can be provided depending on the sophistication level of the user and/or the complexity of the code. There are different levels of difficulty for authoring rules or policies. For example, the builder tool 890 can provide out of the box rules or policies that require minimal user interaction to complete (e.g., filing in inputs fields within a template), a user can download and modify an existing rule or policy, or the user can start from scratch and use a library of building blocks to create the rule or policy. Similarly, the user can create or modify rules without input or feedback from the builder tool 890, the builder tool 890 can provide step by step guided instructions for creating a rule or policy, or a hybrid of both. Guidance can also include brief or in-depth tutorials for modifying rules or policies. For example, the builder tool 890 can show a user how a change to one or more parts of a rule or policy or how changes to a part of a rule or policy may affect the other parts of the rule or policy. The builder tool 890 can use any combination of text, visual, or audio feedback to the user.

In some embodiments, the builder tool 890 can provide feedback to the user as to the quality, completeness, or functionality of their building block structure. The feedback can be provided in any combination of visual effects. For example, changes to elements of a building block can cause the building block to change colors. Similarly, changes to one building block that affects other blocks can cause a change in a color to the edited building block and changes in colors of building blocks that are directly or indirectly effected by the change. In some embodiments, to assist the user in debugging code, the builder tool 890 can emphasize (e.g., change to a red color for errors, yellow color for warning, etc.) elements that are creating an error. For example, if a user deletes an input value in a first building block that is required for a second building block (attached to the first building block), then the first building block may turn yellow and the second building block may turn red, to reflect the issues or potential issues.

In some embodiments, the builder tool 890 can provide suggestions for correcting and/or optimizing code using a combination of AI/ML while providing accuracy estimates (e.g., based on uncertainty) for each of the suggestions. For example, the builder tool 590 can track how a user is editing and arranging building blocks to determine what the user is trying to achieve and can identify areas that are inefficient and suggest changes. In some embodiments a user can also request an "optimal" policy for a special context/use case from expert policy developers. The user can request that the builder tool 890 automatically generate a rule or policy for a specific task or goal. The builder tool 890 generated rules or policies can include creating a rule for a particular task and/or setting parameters for a rule or policy. For example, a user can request the builder tool 890 (e.g., via virtual assistant 830) to make a rule for a welcome home policy or for setting an environment with ideal conditions for raising a particular plant. To generate such rules, policies, or rules and policy parameters, the builder tool 890 can refer to a library of variations of rules or policies (locally generated or generated over an entire network of users) and from Internet sources (e.g., ideal temperature, humidity, etc. for a plant). In some embodiments, builder tool 890 can update or reconfigure rules or policies that are currently being implemented by the user. The interconnected building blocks can be reconfigured by the AI based on its interaction with the user and learning of their preferences for the rules and policies. The reconfiguration is displayable to the user via the builder tool 890.

In some embodiments, the builder tool 890 can load rules or policies from templates, for example, from the templates database 870. The templates can provide a roadmap or building blocks foundation for the code for the rules or policies. The templates can be provided in a generic outline or shell that is an easy-to-understand and manipulate (e.g., change, add, remove, etc.) by a user. The template can be visual and intuitive to a user while being transformable into a programming language by the architecture 800 for implementation. In some embodiments, the templates can be visualized as a collection of interconnectable building blocks including actions and conditions associated therewith and the rule or policy can be defined using an object-oriented programing. Using object-oriented programing, the template can be a class with the rule or policy being an object or instance of that class with the actions, the conditions, the characteristics, the methods, and the connections being attributes of the object or instance and the one or more conditional statements can define a procedure or behavior of the object or instance.

The generic outline or shell of the templates can include initial contextual triggers (or contextual events), conditions, actions, or other programming to be used for building or modifying the generic rule or policy into a customized rule or policy fitting the task or goal desired by the user. For example, a template for turning on a light can have default values for context trigger events, conditions, and actions involving turning on a light source. Different templates can have different elements of the rules or policies that are editable and non-editable. For example, the action for the turn light policy might be locked (e.g., as turn on light instruction) but the context trigger event (e.g., user arrives home) and condition (e.g., after 6 PM) may be editable by the user. A user can utilize the templates loaded into the builder tool 890 user interface to select different rules or policies and edit the selected rules or policies to create new rules or policies.

In some embodiments, the builder tool 890 can be configured to automatically provide one or more templates based on the user or user activity and/or machine generated recommendations. The builder tool 890 can provide a recommendations tab or page that can be used to provide recommendations for a starting point to create or modify a rule or policy. The recommendations can be provided in response to a user inquiry or can be provided based on observed behavior of the user or other users. For example, if the user queries the virtual assistant "show me rules for lighting" or if the architecture receives a behavior that a user frequently manually turns on the lights when they arrive home at night. A user can choose to enable a recommended rule or policy without modification, or the user can use the builder tool 890 to customize one or more parts of the recommended rule or policy. For example, the user may want to add more devices to power on with the recommended 'lights on' rule. The additional devices may not have been part of the observed behavior because the user thought it was too manually effort. The additional devices can be added using the builder tool 890 using any combination of methods. For example, the user can add target object building blocks to the series of blocks in the recommended policy or the user can copy the recommended policy and change the target object from a light to a stereo. In another example, the builder tool 890 can recommend modifications to a user created or modified rule or policy. For example, if the user creates a policy for turning on a light when they arrive home, the builder tool 890 can recommend adding a policy for adjusting a temperature on the thermostat prior to the user arriving home.

In some embodiments, pre-existing and recommended rules or policies (or other pre-existing rules or policies) can be used to modify other rules or policies. To modify a rule or policy with another rule or policy, a user can select and drag a rule or policy (or some characteristics thereof) to another rule or policy to instill the selected portion into the target rule or policy. For example, if a user likes that the lights turn on when they arrive home, but they would also like music to play at the same time, the user can select the graphical representation for the 'lights on' rule and drag it onto a 'music on' rule to instill the context trigger and conditional requirements into the 'music on' rule. Builder tool 890 can evaluate which parts of a rule to modify when combining rules (e.g., through a drag and drop operation) such that the original rule does not entirely overwrite the target rule. For example, the builder tool 890 can recognize that the target objects of the 'lights on' rule and the 'music on' rule are different such that the drag and drop modification will not alter the action portion of the 'music on' rule so that the intended action will continue to operate. As would be appreciated by one skilled in the art, aspects of different rules and policies can be copied or otherwise transferred to other rules or policies using any combination of mechanisms and is not limited to dragging and dropping as provided in the above examples.

In some embodiments, the builder tool 890 can be configured to associate, cluster, or group objects, rules, and/or policies. Grouping objects, rules, and/or policies can be useful to combine a number of objects or interactions to trigger in response to the same contextual trigger. For example, when a user arrives home, it may be beneficial to have a group of rules or policies associated with one or more objects to trigger at substantially the same time. The associating, clustering, and grouping can be any combination of automatic process by the builder tool 809 and manual selection by a user through the builder tool 809. For example, automatic groups can be formed using AI based on user preference/learned behavior can and manual groups can be formed by the user pointing to a bunch of different Internet enabled objects within the extended reality environment. In some embodiments, objects, rules, and/or policies can be grouped to create a mood or other situational programming. For example, groupings can be created for a wake-up routine, a welcome home routine, etc. in which several objects or devices are modified according to one or more rules or policies.

In some embodiments, the builder tool 890 can be configured to enable a user to add cognitive states, tasks, and social context to a rule or policy. For example, a user can create a rule that launches a grocery shopping list whenever the user opens the fridge, which can be further modified with a social context to only open the list when the user alone, or only when the user is not rushing or distracted. In another example, if a wearable of the user is reading an increased temperature associated with increased heartrate, the rule or policy can cause a temperature of a thermostat to be slightly decreased. As discussed above, the builder tool 890 allows the user to easily add in cognitive states, tasks, and social context to a rule or policy, for example, as part of the conditions for the rule or policy. Cognitive states, tasks, and social context states can be added as part of a new rule or policy creation or to previously existing rules or policies. The cognitive states, tasks, and social context can be automatically detected from a combination of sensors, wearable devices, image capturing device, audio capturing devices, etc.

In some embodiments, the builder tool 890 can be configured to display all available predetermined rules or policies and previously created rules or policies that may be available for implementation as well as visualization, creation, modification, or deletion. The builder tool 890 can maintain a library of all the rules and policies, including different states (e.g., active or inactive) and variations for each of the rules or policies. For example, all the rules or policies can be stored in the data store 850. Additionally, the rules or policies can be sorted, filtered, categorized, grouped, etc. according to a number of criteria. The builder tool 890 can also manage a list of all of the rules or policies that are currently active for monitoring. A user can search the library for all of the objects that have pre-existing rules or policies associated therewith. For example, a door object could have three related rules or policies, "check the weather when I get out of the door", "turn on the security system when I get out of the door", "check the key when I get out of the door". When using the builder tool 890 to create these rules or policies, one of the rules or policies (i.e., the check the weather when I get out the door) can be dragged and dropped from object to object (i.e., from the door to refrigerator), and the object/wording will be automatically swapped when I change the object, for example, "check the weather when I get out of the door" will be changed to "check the temperature when I open the refrigerator".

The rule or policy editor 860, including the visualizer module 880, the tools engine 885, and the builder tool 890, can rely upon a combination of data for assisting the user 820 in creating new rules or policies. The data can be provided by a combination of the data store 850 and the templates database 870. The data store 850 and the templates database 870 can include any combination of data storage for storing any combination of data necessary to implement the aspects of the present disclosure. For example, the templates database 870 can include storage for pre-existing rules and policies as created by developers and rules and policies as created by users. Additionally, the templates database 870 can be a separate data store from the data store 850 or they can be part of the same storage unit.

In some embodiments, the virtual assistant 830 can coordinate with the rule or policy editor 860 to retrieve rules or policies for visualization, creation, modification, or deletion within the extended reality environment. Within the architecture 800, the virtual assistant 830 can be configured to identify requests from the user 820 to visualize, create, modify, or delete one or more rules or policies utilized by the extended reality system and the rule or policy editor 860 can facilitate the visualization, creation, modification, or deletion one or more rules or policies. The virtual assistant 830 can also work with the rule or policy editor 860 by providing input from the user and coordinating input from the prediction model layer 840. For example, the virtual assistant 830 can provide instructions to launch the visual rendering by requesting graphical representations of one or more rules or policies from the rule and policy editor 860. Thereafter, the rule or policy editor 860 can provide the graphical representations of one or more rules or policies for display and for interaction with the user 820 (e.g., an extended reality system 205, an augmented reality system 300, virtual reality system 350, HMD 465, and augmented reality glasses 485).

CAP Authoring (Defining and Modifying) Techniques

FIG. 10 illustrates a flow charting showing a process 1000 for defining and modifying behaviors implemented through a virtual assistant 830 with the rule or policy editor 860. The virtual assistant 830 can be provided as part of an extended reality environment being provided through an extended reality system 205, an augmented reality system 300, virtual reality system 350, HMD 465, augmented reality glasses 485, or a combination thereof. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain other embodiments, the steps may be performed in some different order, or some steps may also be performed in parallel. In some examples, the process 1000 is implemented by the client system 105, the policy authoring and execution system 600, and/or an electronic device, such as the electronic device 1100 as shown in FIGS. 1, 2A, 2B, 6, and 11. The process 1000 can be implemented in software or hardware or any combination thereof.

At step 1005, a user initiates an authoring session by launching an authoring system (e.g., policy authoring and execution system 600), which causes an authoring GUI to appear comprising a tab showing a list of currently authored policies (if any) and another to tab or button to create a new policy. In some instances, the authoring GUI is caused to appear by rendering a user interface in an extended reality environment on the display of a head-mounted device. The launching the authoring system may be received or triggered via a request from the user to visualize, create, modify, or delete a rule or policy for a given user or activity. The request can by caused by any combination of activities. For example, the request can be trigged by detecting a audio command or activation of a user interface element. The audio command can include any combination of predetermined keywords, such as "teach", "train", "learn" etc. The prediction model layer 840 can be used to assist in the interpretation of commands and determining whether the user is requesting access to the rule or policy editor 860 to visualize, create, modify, or delete a rule or policy. The rules or policies can include implementing functionality of the virtual assistant 830 itself, one or more devices that can interact with the virtual assistant 830 (e.g., smart devices), or a combination thereof.

At step 1010, the user selects one of the currently authored policies to view and edit the policy or selects the tab or button to create a new policy. In response to the selection, an initial structure for a rule or policy, based on (i) the user or the activity of the user, or (ii) a currently authored policy, is obtained. For example, an initial structure for a rule or policy can be obtained based on the user or data collected from user interactions in extended reality. The initial structure provides initial values for actions and context conditions to be used for building or modifying one or more rules or policies (e.g., CAPs). In some embodiments, the parameters can include contextual triggers, conditions, actions, or a combination thereof to be used for building or modifying the rules or policies. The initial values can include characteristics, methods, connections, or combinations thereof for the actions and the conditions. The initial structure can be selected based on the preference and/or sophistication of the user. For example, the initial structure can include anything ranging from a blank canvas with one or more components for creating a rule or policy to a completed rule or policy that can be edited according to the preferences of the user. Therefore, depending on the initial structure, there are different levels of difficulty for creating or modifying the rules or policies.

In some embodiments, the initial structure is a template and the rule or policy is defined using object-oriented programming. Using object-oriented programming, the template is a class, the rule or policy is an object or instance of the class. the actions, the conditions, the characteristics, the methods, and the connections are attributes of the object, and the one or more conditional statements define a procedure or behavior of the object.

At step 1015, a user interface is provided, which includes the initial structure and tools for editing the initial structure.

Figure 11A:
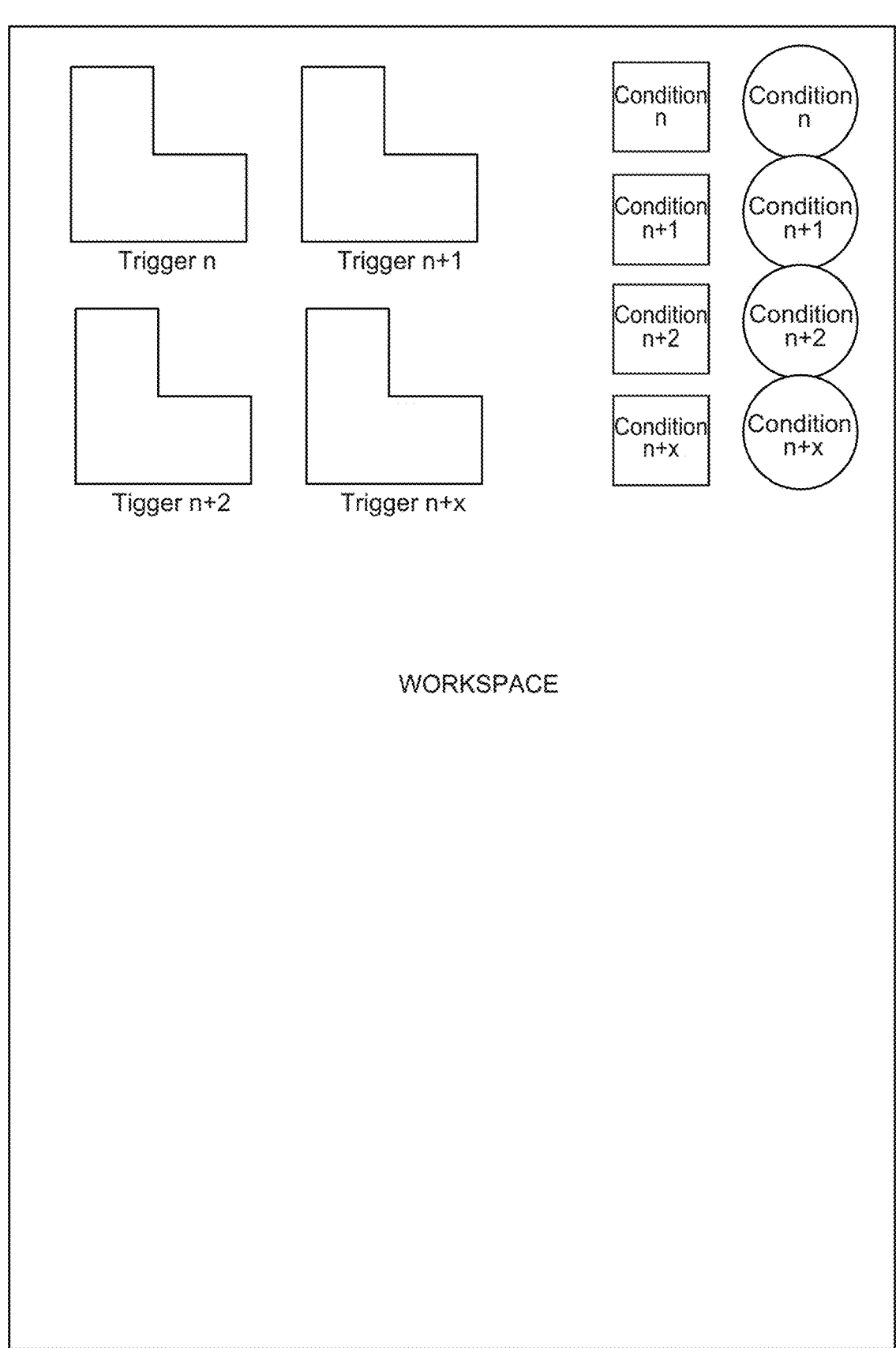
FIGS. 11A, 11B, and 11C are illustrations showing exemplary user interfaces for creating or modifying rules or policies in accordance with various embodiments.

In some embodiments, the user interface includes a visualization of a various windows, text, and interface elements such as drop down boxes comprising a collection of interconnectable building blocks for constraints and actions of a rule or policy, for example, as shown in FIGS. 9A and 9B. The user interface can additionally or alternatively include a visualization of various interface elements, text, and objects comprising a collection of interconnectable building blocks, for example, as shown in FIG. 11A. The building blocks can be part of the template including one or more of contextual triggers, conditions and action.

Figure 11B:
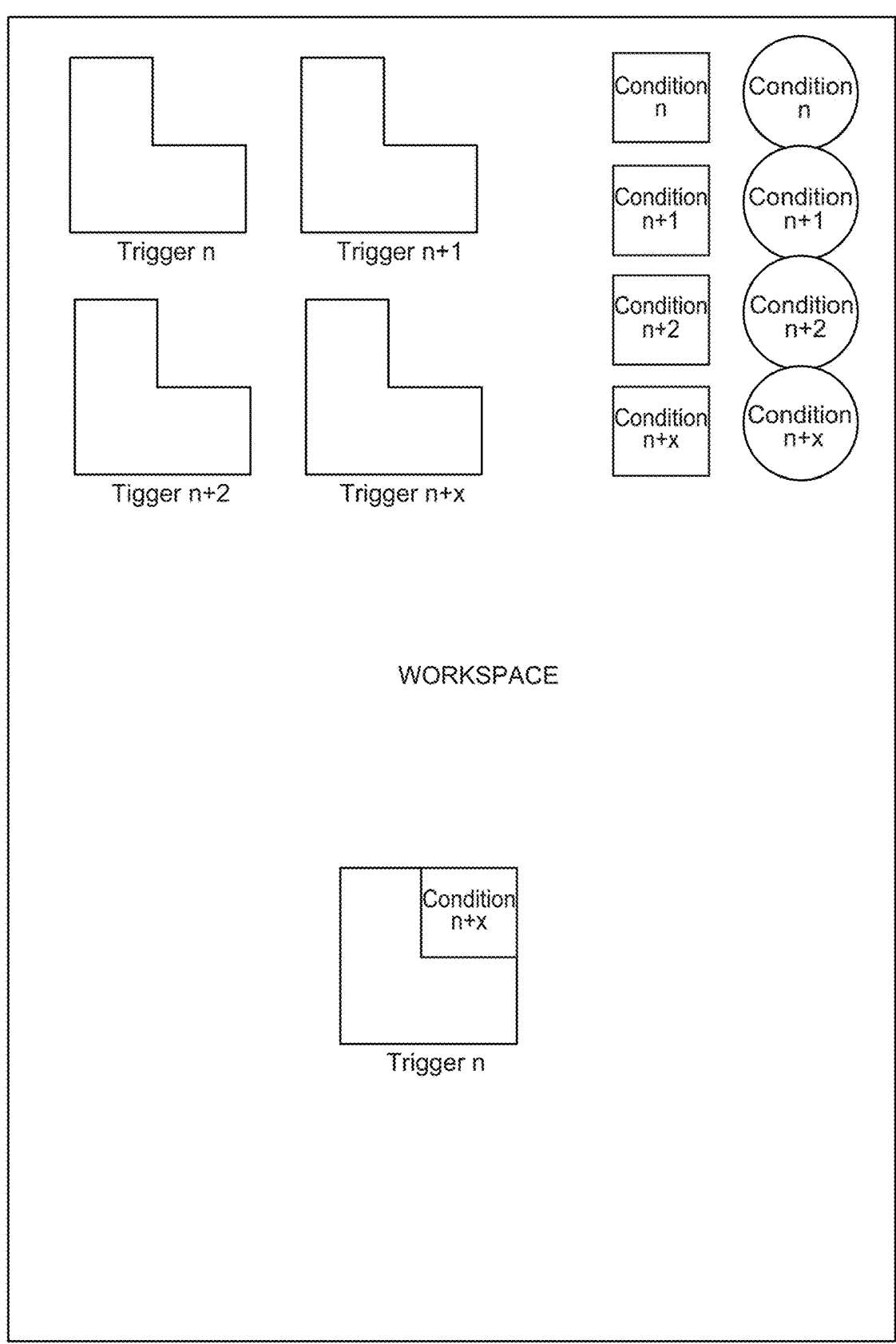

To compose a rule or policy, the user can select and interconnect compatible building block pieces together (e.g., one building block piece can be trigger or action, and the piece can be digital or physical object), the user can remove building blocks in a pre-existing structure, the user can re-arrange the building blocks, the user can change one or more input parameters for the building blocks (e.g., adjusting a value for a time condition), the user can change the color of one or more building blocks (e.g., small refinement in the action), etc. For example, as shown in FIGS. 11A and 11B, an L shape trigger block (trigger block n) can be combined with a square condition block (e.g., condition n+x) to create a rule or policy. The coupling of the blocks can be performed using any combination of mechanisms. For example, a user can drag the trigger block (trigger block n) into the workspace and then drag the condition block (e.g., condition n+x) next to the cutout in the trigger block (trigger block n). If there is a match the blocks may snap together. As would be appreciated by one skilled int eh art, any combination of the similarly shaped trigger blocks and condition blocks can be coupled together to create different rules or policies. Some block shapes may not be compatible with other block shapes. For example, the circular condition blocks n–n+x would not be compatible with the trigger blocks n–n+x because they are not designed to interconnect (e.g., a set of conditions are not meant to have a relationship with separate set of conditions or action, and are thus designed such that they are not connectable).

At step 1020, a modification to the initial structure or template is received via the user interacting with one or more tools of the user interface. In some embodiments, the modification can include changing an initial value for one or more of contextual triggers, conditions and actions provided in the initial structure or template. The one or more of contextual triggers, conditions and actions, and the initial values for the one or more of contextual triggers, conditions and actions for the template can be configured by a developer or inferred by a model from historical rules or policies, historical behavior of the user, or a combination thereof. In general the initial value can be changed using various modification operations such as the following:

Different action, e.g., light on versus light off, or music on versus light on.

Different condition, e.g., daytime versus evening or when holding nug versus when holding a toothbrush.

Parallel condition, e.g., when holding a toothbrush in the evening.

More condition, e.g., adding in a condition for when the indoor temperature is greater than 70 degrees.

Exception, e.g., turn on lights when holding book except between hours of 9 AM and 5 PM.

Less condition, e.g., removing a condition for when the outdoor temperature is less than 30 degrees.

In some embodiments, the modification can include a recommendation field that allows a user to "drag" certain characteristics from one rule or policy to the other. For example, a user can quickly "drag" a constraint from an afternoon rule or policy to an evening rule or policy to create a new rule or policy in a short period of time.

Figure 11C:
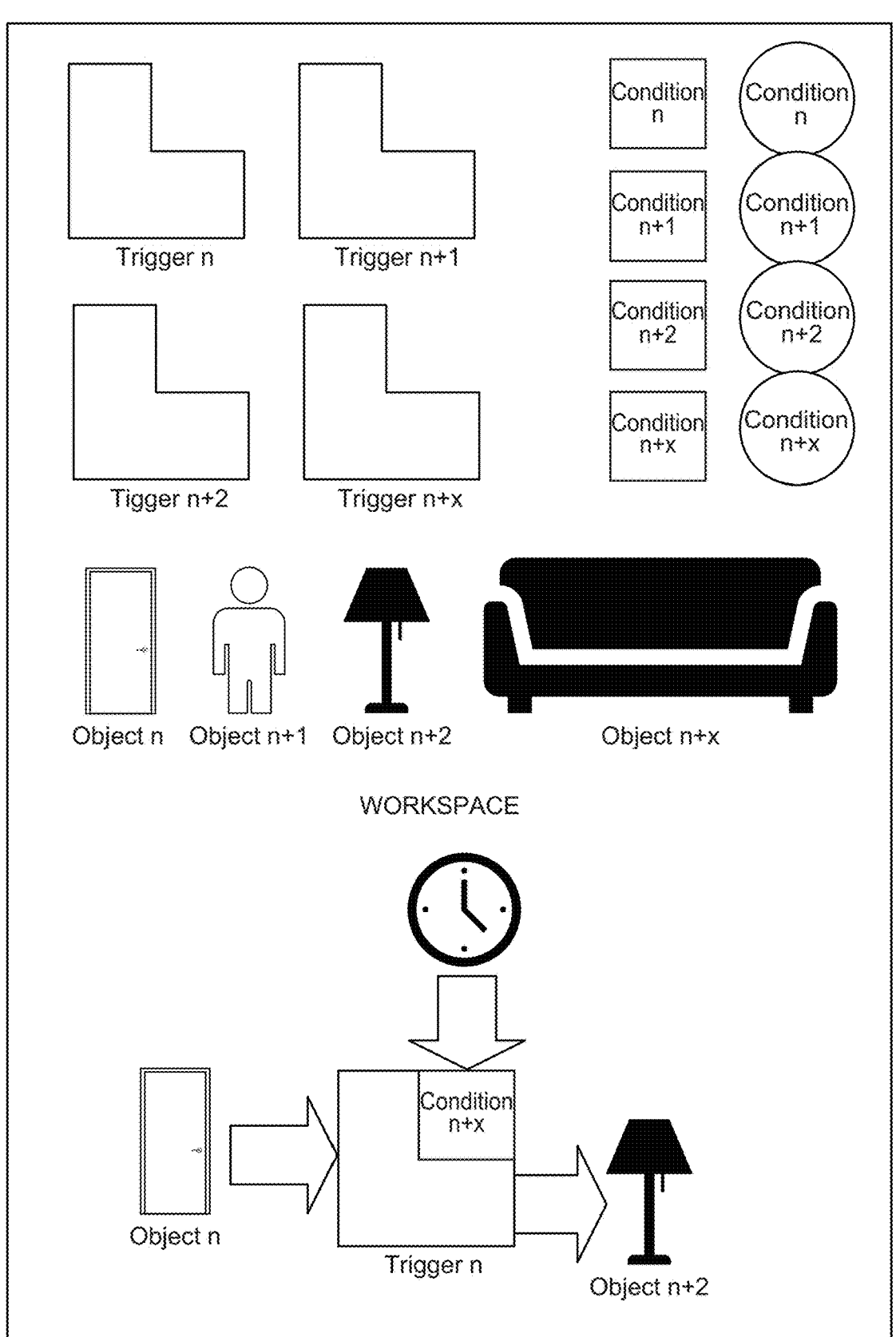

In some embodiments, the modification can include associating the rule or policy with one or more physical objects, virtual objects, or combinations thereof and identifying one or more additional rules or policies based on the association with the one or more physical objects, virtual objects, or combinations thereof. For example, building blocks can be linked to one or more objects to create a specific rule or policy for those objects. As depicted in FIG. 11C, a graphical representation of a door is linked to a trigger block, a graphical representation of a clock is linked to a condition block (that is coupled to the trigger block) and an action output is linked to a graphical representation of the lamp. Therefore, the newly created rule will cause an action of turning on the lamp (e.g., via smart control) when the door trigger (e.g., door open sensor) and clock (e.g., timer) condition as satisfied.

In some embodiments, the modification can include receiving an association for the rule or policy via the user interacting with the tools of the user interface, wherein the association incudes grouping the rule or policy with one or more additional rules or policies as a defined for a mood, theme, or style.

In some embodiments, the modification can include grouping the one or more additional rules or policies with the rule or policy as a defined for a mood, theme, or style. For example, grouping the rule or policy with one or more additional rules or policies into a mood, personality, or recipe for facilitating a defined style of living, wherein the grouping is performed based on similarities between the actions and the conditions.

At step 1025, the initial structure or template is modified based on the modification received for the rule or policy. The modification can include changing the initial value for the actions or the conditions of the template and saving the new rule or policy as a separate instance representative of the rule or policy in a data store comprising executable rules and policies. For example, when using a template, the modified template can be saved in the data store 850 as variation of the template (e.g., a new rule or policy), while the original template remains in the templates database 870.

Illustrative Device

Figure 12:
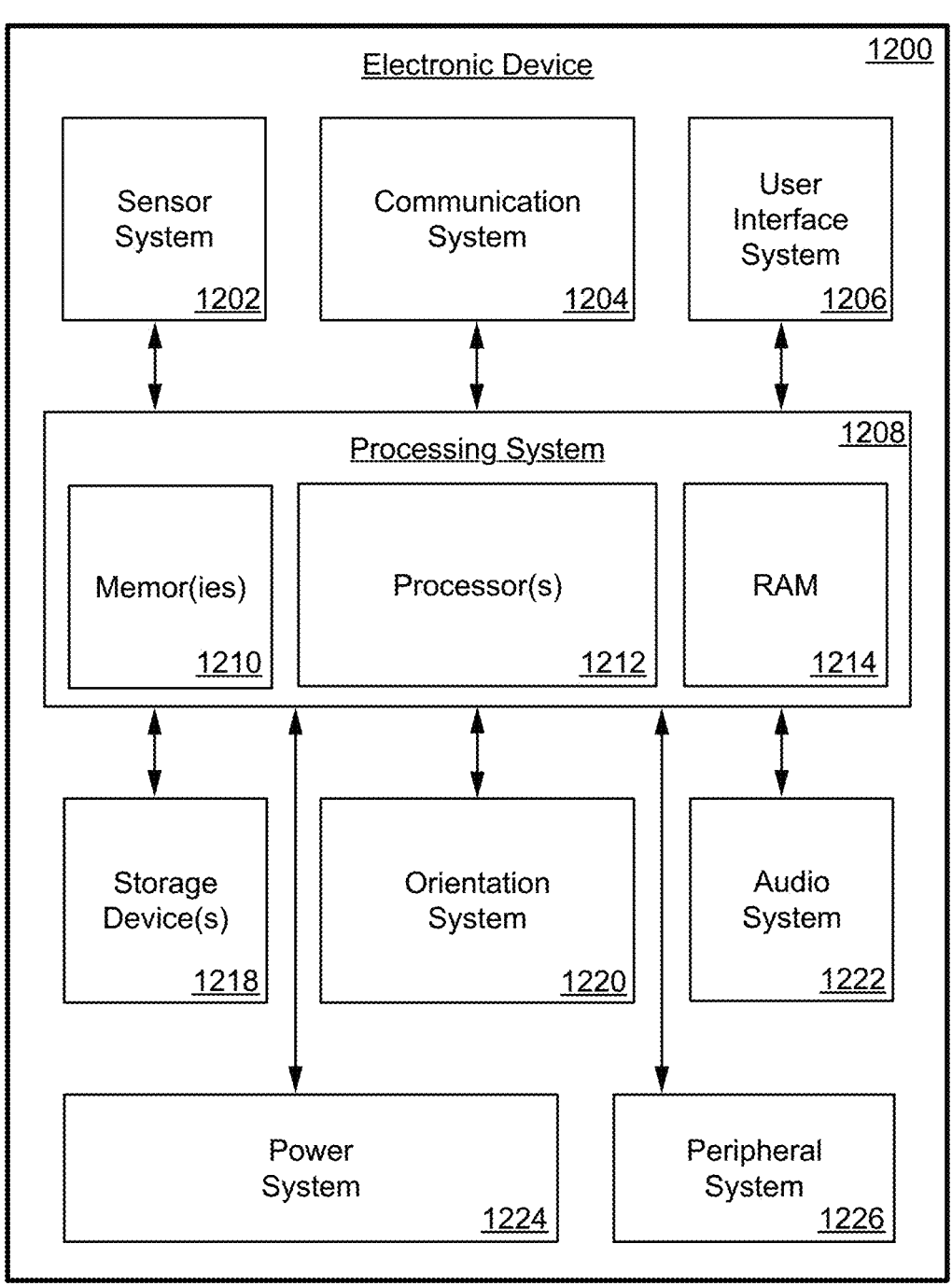
FIG. 12 is an illustration of an electronic device in accordance with various embodiments.

FIG. 12 illustrate an electronic device 1200 in accordance with various embodiments. The electronic device 1200 can be implemented in various configurations in order to provide various functionality to a user. For example, the electronic device 1200 can be implemented as a wearable device (e.g., a head-mounted device, smart eyeglasses, smart watch, and smart clothing); a communication device (e.g., a smart phone, cellular phone, mobile phone, wireless phone, portable phone, radio telephone, etc.); a home automation controller (e.g., controller for an alarm system, thermostat, lighting system, door lock, motorized doors, etc.); a gaming device (e.g., a gaming system, gaming controller, etc.); a vehicle (e.g., an autonomous vehicle); and/or other computing device (e.g., a tablet computer, phablet computer, notebook computer, laptop computer, etc.). The foregoing implementations are not intended to be limiting and the electronic device 1200 can be implemented as any kind of electronic or computing device that can be configured to provide an extended reality system using a part of or all the methods disclosed herein.

The electronic device 1200 includes processing system 1208. Processing system 1208 includes one or more memories 1210, one or more processors 1212, and RAM 1214. The one or more processors 1212 can read one or more programs from the one or more memories 1210 and execute them using RAM 1214. The one or more processors 1212 can be of any type including but not limited to a microprocessor, a microcontroller, a graphical processing unit, a digital signal processor, an ASIC, a FPGA, a PLD, or any combination thereof. In some embodiments, the one or more processors 1212 can include a plurality of cores, one or more coprocessors, and/or one or more layers of local cache memory. The one or more processors 1212 can execute the one or more programs stored in the one or more memories 1210 to perform the operations and/or methods, including parts thereof, disclosed herein.

The one or more memories 1210 can be non-volatile and can include any type of memory device that retains stored information when powered off. Non-limiting examples of memory include electrically erasable and programmable read-only memory (EEPROM), flash memory, or any other type of non-volatile memory. The one or more memories 1210 can include non-transitory computer-readable storage media from which the one or more processors 1212 can read instructions. A computer-readable storage medium can include electronic, optical, magnetic, or other storage devices capable of providing the one or more processors 1212 with computer-readable instructions or other program code. Non-limiting examples of a computer-readable storage medium include magnetic disks, memory chips, read-only memory (ROM), RAM, an ASIC, a configured processor, optical storage, or any other medium from which a computer processor can read the instructions.

The electronic device 1200 also includes one or more storage devices 1218. The one or more storage devices 1218 can be configured to store data received and/or generated by the electronic device 1200. The one or more storage devices 1218 can include removable storage devices, non-removable storage devices, or a combination thereof. Examples of removable storage and non-removable storage devices include magnetic disk devices such as flexible disk drives and HDDs, optical disk drives such as compact disk (CD) drives and digital versatile disk (DVD) drives, SSDs, and tape drives.

The electronic device 1200 also includes sensor system 1202. The sensor system 1202 can be configured to acquire information from an environment surrounding the electronic device 1200. Sensor system 1202 can include one or more devices that are configured to transmit and receive various signals (e.g., light, ultrasonic, radar, lidar, and the like) used for acquiring information from an environment surrounding the electronic device 1200. Examples of devices that can be included in the sensor system 1202 include digital and electronic cameras, light field cameras, 3D cameras, image sensors, imaging arrays, ultrasonic sensors, radar sensors, range sensors, LiDAR sensors, and the like.

The electronic device 1200 also includes communication system 1204. The communication system 1204 can include one or more devices that are configured to enable the electronic device 1200 to communicate with various wired or wireless networks and other systems and devices. Examples of devices included in communication system 1204 include wireless communication modules and chips, wired communication modules and chips, chips for communicating over local area networks, wide area networks, cellular networks, satellite networks, fiber optic networks, and the like, systems on chips, and other circuitry that enables the electronic device 120 to send and receive data.

The electronic device 1200 also includes user interface system 1206. User interface system 1206 can include one or more devices that are configured to display images, video, and other content and receive input from a user of the electronic device 1200. Examples of devices included in the user interface system 1206 include a liquid crystal display, a light emitting diode display, an organic light emitting diode display, a projector display, a touchscreen display, and the like.

The electronic device 1200 also includes orientation system 1220. The orientation system 1220 can include one or more devices that are configured to determine an orientation and posture of the electronic device 1200 and a user of the electronic device 1200. Examples of devices included orientation system 1220 include global positioning system (GPS) receivers, ultra-wideband (UWB) positioning devices, Wi-Fi positioning devices, accelerometers, gyroscopes, motion sensors, tilt sensors, inclinometers, angular velocity sensors, gravity sensors, and inertial measurement units, and the like.

The electronic device 1200 also includes audio system 1222. The audio system 1222 can include one or more devices that are configured to record sounds from an environment surrounding the electronic device 1200 and output sounds to the environment surrounding the electronic device 1200. Examples of devices included in audio system 1222 include microphones, speakers, and other audio/sound transducers for receiving and outputting audio signals and other sounds.

The electronic device 1200 also includes power system 1224. The power system 1224 can include one or more components configured to generate power, receive power, provide power, manage power, or a combination thereof. Examples of components included power system 1224 include batteries, power supplies, charging circuits, solar panels, power management circuits, transformers, power transfer circuits, and other components that can be configured to receive power from a source external to the electronic device 1200 and/or generate power and power the electronic device 1200 with the received or generated power.

The electronic device 1200 also includes a peripheral system 1226. The peripheral system 1226 can include one or more components configured to receive an input and/or provide an output. Examples of such input components can include a mouse, a keyboard, a trackball, a touch pad, a touchscreen display, a stylus, data gloves, and the like. Examples of such output components can include holographic displays, 3D displays, projectors, vibrators, actuators, and the like.

The foregoing configurations of the electronic device 1200 are not intended to be limiting and the electronic device 1200 can include other devices, systems, and components.

Additional Considerations

Although specific examples have been described, various modifications, alterations, alternative constructions, and equivalents are possible. Examples are not restricted to operation within certain specific data processing environments but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. An extended reality system comprising:

a head-mounted device comprising a display that displays content to a user and one or more cameras that capture images of a visual field of the user wearing the head-mounted device;

a processing system; and at least one memory storing instructions that, when executed by the processing system, cause the extended reality system to perform operations comprising:

in response to the user launching an authoring session to generate a context aware policy, rendering a user interface in extended reality on the display;

obtaining a template based on the user or data collected from user interactions in extended reality, wherein the template provides initial values for actions and context conditions to be used for building or modifying one or more context aware policies;

rendering the template and tools for editing the template in the user interface, wherein the template is visualized as a collection of interconnectable building blocks comprising the actions and context conditions;

receiving, via tools for editing the template in the user interface, a modification to the template, wherein the modification incudes a change to an initial value for the actions or the context conditions; and modifying the template based on the modification to generate the context aware policy, wherein the modification comprises changing the initial value for the actions or the context conditions of the template and saving the template as a separate instance representative of the context aware policy, and wherein the context aware policy defines an action to be triggered upon satisfaction of one or more context conditions within the extended reality.

2. The extended reality system of claim 1, wherein the operations further comprise executing the context aware policy, and wherein executing the context aware policy comprises: determining that the context conditions defined by the context aware policy have been satisfied and, in response to determining the context conditions have been satisfied, executing the action defined by the context aware policy.

3. The extended reality system of claim 1, wherein the initial value for the actions or the context conditions are configured by a developer or inferred by a model from historical rules or policies, historical behavior of the user, or a combination thereof.

4. The extended reality system of claim 1, wherein the operations further comprise:

associating the context aware policy with one or more physical objects, virtual objects, or combinations thereof;

identifying one or more additional context aware policies based on the association with the one or more physical objects, virtual objects, or combinations thereof; and grouping the one or more additional context aware policies with the rule or policy as a defined mood, theme, or style.

5. The extended reality system of claim 1, wherein the operations further comprise grouping the context aware policy with one or more additional context aware policies into a mood, theme, or style based on similarities between the actions and/or the context conditions.

6. The extended reality system of claim 1, wherein the operations further comprise receiving an association for the context aware policy via the user interacting with the tools, wherein the association incudes grouping the context aware policy with one or more additional context aware policies as a defined mood, theme, or style.

7. The extended reality system of claim 1, wherein:

the context aware policy is defined using object-oriented programming;

the template is a class;

the context aware policy is an object or instance of the class;

the actions, the context conditions, characteristics, methods, and connections are attributes of the object; and one or more conditional statements define a procedure or behavior of the object based on the attributes.

8. A computer-implemented method comprising:

receiving a request to build or modify a rule or policy for a given user or activity;

obtaining a template based on the user or the activity, wherein the template provides initial values for actions and conditions to be used for building or modifying the rule or policy, and the initial values comprise characteristics, methods, connections, or combinations thereof for the actions and the conditions;

displaying on the display a user interface that includes the template and tools for editing the template, wherein the template is visualized as a collection of interconnectable building blocks comprising the actions and conditions;

receiving a modification to the template via the user interacting with the tools of the user interface, wherein the modification incudes a change to an initial value for the actions or the conditions; and modifying the template based on the modification to generate the rule or policy, wherein the modification comprises changing the initial value for the actions or the conditions of the template and saving the template as a separate instance representative of the rule or policy, and the rule or policy comprises one or more conditional statements for executing one or more of the actions based on evaluation of one or more of the conditions.

9. The computer implemented method of claim 8, wherein the processing further comprises:

storing the rule or policy in a data store comprising executable rules and policies;

determining that at least one condition of the one or more conditional statements has been satisfied; and in response to determining that the at least one condition has been satisfied, executing at least part of the rule or policy.

10. The extended reality system of claim 8, wherein the actions, the conditions, and the initial values for the actions and the conditions for the template are configured by a developer or inferred by a model from historical rules or policies, historical behavior of the user, or a combination thereof.

11. The computer implemented method of claim 8, wherein the processing further comprises:

associating the rule or policy with one or more physical objects, virtual objects, or combinations thereof;

identifying one or more additional rules or policies based on the association with the one or more physical objects, virtual objects, or combinations thereof, and grouping the one or more additional rules or policies with the rule or policy as a defined style of living.

12. The computer implemented method of claim 8, wherein the processing further comprises grouping the rule or policy with one or more additional rules or policies into a mood, personality, or recipe for facilitating a defined style of living, wherein the grouping is performed based on similarities between the actions and the conditions.

13. The computer implemented method of claim 8, wherein the processing further comprises receiving an association for the rule or policy via the user interacting with the tools of the user interface, wherein the association incudes grouping the rule or policy with one or more additional rules or policies as a defined style of living.

14. The computer implemented method of claim 8, wherein:

the rule or policy is defined using object-oriented programming;

the template is a class;

the rule or policy is an object or instance of the class;

the actions, the conditions, the characteristics, the methods, and the connections are attributes of the object; and the one or more conditional statements define a procedure or behavior of the object.

15. One or more non-transitory computer-readable media storing computer-readable instructions that, when executed by at least one processing system, cause a system to execute operations comprising:

receiving a request to build or modify a rule or policy for a given user or activity;

obtaining a template based on the user or the activity, wherein the template provides initial values for actions and conditions to be used for building or modifying the rule or policy, and the initial values comprise characteristics, methods, connections, or combinations thereof for the actions and the conditions;

displaying on the display a user interface that includes the template and tools for editing the template, wherein the template is visualized as a collection of interconnectable building blocks comprising the actions and conditions;

receiving a modification to the template via the user interacting with the tools of the user interface, wherein the modification incudes a change to an initial value for the actions or the conditions; and modifying the template based on the modification to generate the rule or policy, wherein the modification comprises changing the initial value for the actions or the conditions of the template and saving the template as a separate instance representative of the rule or policy, and the rule or policy comprises one or more conditional statements for executing one or more of the actions based on evaluation of one or more of the conditions.

16. The one or more non-transitory computer-readable media of claim 15, wherein the operations further comprise:

storing the rule or policy in a data store comprising executable rules and policies;

determining that at least one condition of the one or more conditional statements has been satisfied; and in response to determining that the at least one condition has been satisfied, executing at least part of the rule or policy.

17. The one or more non-transitory computer-readable media of claim 15, wherein the actions, the conditions, and the initial values for the actions and the conditions for the template are configured by a developer or inferred by a model from historical rules or policies, historical behavior of the user, or a combination thereof.

18. The one or more non-transitory computer-readable media of claim 15, wherein the operations further comprise:

associating the rule or policy with one or more physical objects, virtual objects, or combinations thereof;

identifying one or more additional rules or policies based on the association with the one or more physical objects, virtual objects, or combinations thereof, and grouping the one or more additional rules or policies with the rule or policy as a defined style of living.

19. The one or more non-transitory computer-readable media of claim 15, wherein the operations further comprise grouping the rule or policy with one or more additional rules or policies into a mood, personality, or recipe for facilitating a defined style of living, wherein the grouping is performed based on similarities between the actions and the conditions.

20. The one or more non-transitory computer-readable media of claim 15, wherein the operations further comprise receiving an association for the rule or policy via the user interacting with the tools of the user interface, wherein the association incudes grouping the rule or policy with one or more additional rules or policies as a defined style of living.

* * * * *